US009246536B2

(12) United States Patent
Caron

(10) Patent No.: US 9,246,536 B2
(45) Date of Patent: Jan. 26, 2016

(54) DUPLEXER WITH ACTIVE TEMPERATURE COMPENSATION

(75) Inventor: Joshua J. Caron, Madison, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 44 days.

(21) Appl. No.: 13/372,080

(22) Filed: Feb. 13, 2012

(65) Prior Publication Data
US 2013/0039228 A1 Feb. 14, 2013

Related U.S. Application Data

(63) Continuation-in-part of application No. 12/959,512, filed on Dec. 3, 2010, now Pat. No. 8,838,045.

(60) Provisional application No. 61/441,865, filed on Feb. 11, 2011, provisional application No. 61/266,402, filed on Dec. 3, 2009, provisional application No. 61/297,172, filed on Jan. 21, 2010.

(51) Int. Cl.
H04B 7/005 (2006.01)
H04B 1/52 (2015.01)

(52) U.S. Cl.
CPC .......................................... H04B 1/52 (2013.01)

(58) Field of Classification Search
CPC ........ H04B 1/1036; H04B 1/123; H04B 1/48; H03H 11/344; H04L 25/08
See application file for complete search history.

(56) References Cited

U.S. PATENT DOCUMENTS

| 4,628,537 | A | 12/1986 | Shimakata et al. |
| 5,386,203 | A | 1/1995 | Ishihara |
| 5,768,691 | A | 6/1998 | Matero et al. |
| 7,142,884 | B2 | 11/2006 | Hagn |
| 7,570,973 | B1* | 8/2009 | Bienek et al. ................. 455/557 |
| 7,664,475 | B2 | 2/2010 | Ichihara |
| 8,072,297 | B2 | 12/2011 | Toncich et al. |
| 2007/0030096 | A1 | 2/2007 | Nishihara et al. |
| 2007/0058748 | A1 | 3/2007 | Kim et al. |
| 2009/0323856 | A1* | 12/2009 | McCallister ................. 375/296 |
| 2009/0325564 | A1 | 12/2009 | Bienek et al. |
| 2010/0144288 | A1* | 6/2010 | Walley et al. ................... 455/77 |

(Continued)

OTHER PUBLICATIONS

Lakin, K. M. et al., "Wide Bandwidth Thin Film BAW Filters," 2004 IEEE Ultrasonics Symposium Proceedings, Aug. 2004, vol. 1, pp. 407-410.

(Continued)

Primary Examiner — David Oveissi
(74) Attorney, Agent, or Firm — Withrow & Terranova, P.L.L.C.

(57) ABSTRACT

Embodiments disclosed herein relate to programmable duplexers. The frequency pass band of the programmable duplexer is changed according to a selection of a channel-pair to control or maximize the transition band between the receiver path and the transmitter path. The programmable duplexer permits selections of desired pass bands without the need for multiple duplexer filters.

Embodiments disclosed herein also relate to temperature compensating a programmable duplexer based upon one or more temperature indications. The one or more temperature indications may be based upon a temperature of a semiconductor circuit, a temperature of a substrate of a one-port resonator of the programmable duplexer, and/or a temperature of the one-port resonator. The resulting programmable duplexer has an added additional advantage of lessening the temperature variations of the programmable duplexer.

34 Claims, 31 Drawing Sheets

(56) References Cited

U.S. PATENT DOCUMENTS

2010/0231324 A1* 9/2010 Lee et al. .................. 333/135
2010/0321130 A1 12/2010 Kim et al.

OTHER PUBLICATIONS

Non-Final Office Action for U.S. Appl. No. 12/959,512, mailed Apr. 24, 2013, 14 pages.

Non-Final Office Action for U.S. Appl. No. 12/959,512, mailed Oct. 18, 2013, 16 pages.

Notice of Allowance for U.S. Appl. No. 12/843,574, mailed Nov. 21, 2013, 10 pages.

Notice of Allowance for U.S. Appl. No. 12/959,512, mailed May 7, 2014, 14 pages.

* cited by examiner

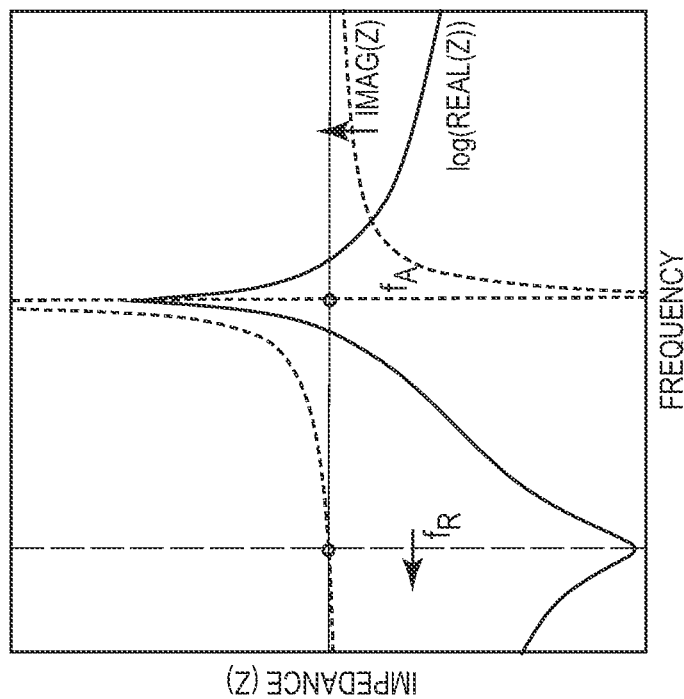
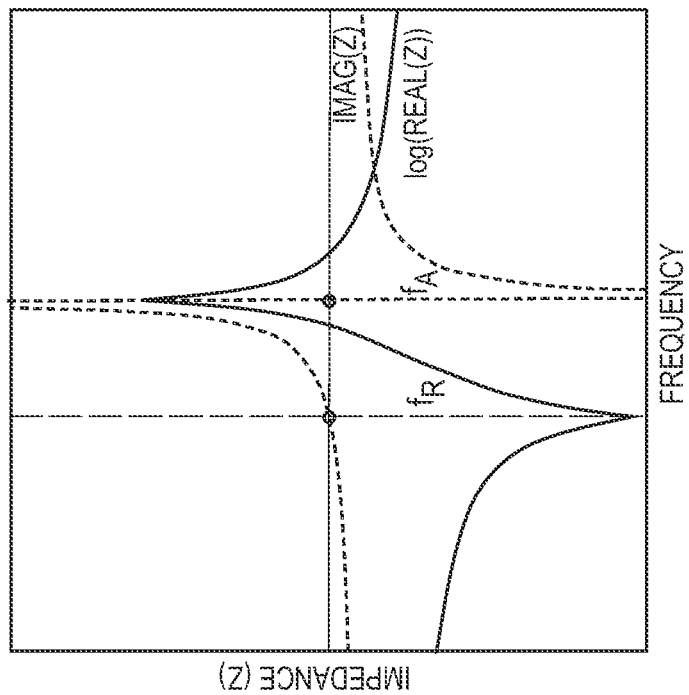
FIG. 4A
FIG. 4B

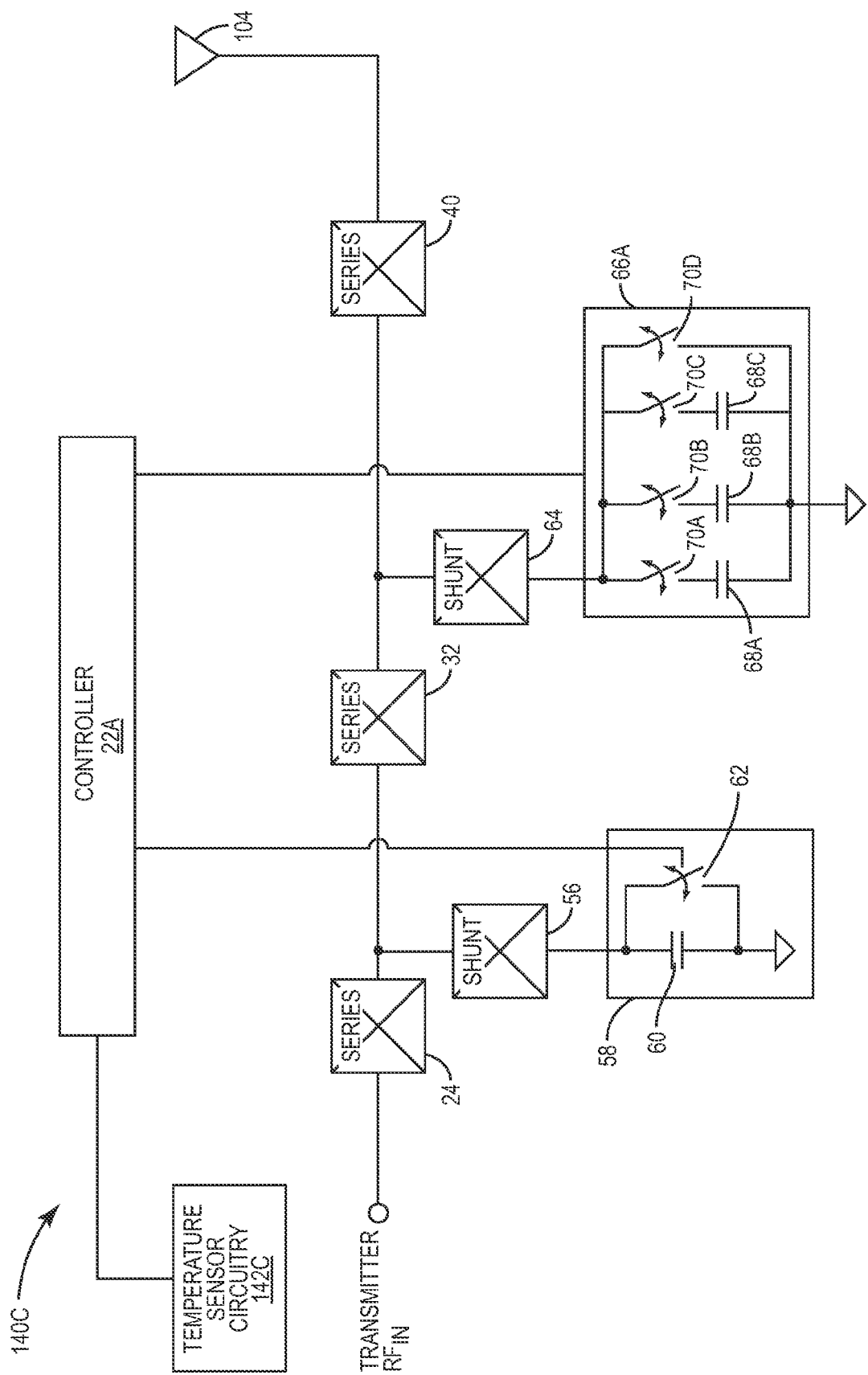

US 9,246,536 B2

DUPLEXER WITH ACTIVE TEMPERATURE COMPENSATION

RELATED APPLICATIONS

This application is a Continuation-in-Part of and claims the benefit of United States Non-Provisional patent application Ser. No. 12/959,512, filed Dec. 3, 2010, entitled "Sub-Band Duplexer With Active Frequency Tuning," now U.S. Pat. No. 8,838,045, which claimed the benefit of and incorporated by reference the provisional patent application No. 61/266,402, entitled "Sub-Band Duplexer With Active Frequency Tuning," filed Dec. 3, 2009, and the provisional patent application No. 61/297,172, entitled, "AIR INTERFACE DUPLEXER," filed Jan. 21, 2010.

This application is related to and claims the benefit of the U.S. Provisional Patent Application 61/441,865, filed Feb. 11, 2011, entitled "Duplexer With Active Temperature Compensation," the disclosure of which is incorporated herein by reference in its entirety.

This application is also related to the United States Non-Provisional patent application Ser. No. 12/843,574 entitled "Passive Multi-Band Duplexer," filed Jul. 26, 2010, now U.S. Pat. No. 8,680,947, which also claimed benefit of and incorporated by reference the provisional patent application No. 61/266,402, entitled "Sub-Band Duplexer With Active Frequency Tuning," filed Dec. 3, 2009, and the provisional patent application No. 61/297,172, entitled, "AIR INTERFACE DUPLEXER," filed Jan. 21, 2010.

This application hereby incorporates by reference all the applications listed above in their entirety.

FIELD OF THE DISCLOSURE

The embodiments described herein relate to duplexers used in the frontend circuitry of communication devices. More particularly, the embodiments relate to real-time programmable duplexers with active temperature compensation.

BACKGROUND

Duplexers are an essential part of 3G cellular communication handsets. The overall purpose of a duplexer is to allow both the transmit (TX) and receive (RX) portions of a cellular radio to share a common antenna (ANT). Typically, a duplexer is a passive device with three ports: (1) a transmit port that connects to the output of the power amplifier (PA) stage of the radio, (2) a receive port that connects to the input of the low-noise-amplifier (LNA) receive stage of the radio, and (3) an antenna port which connects directly to the handset's antenna.

At present, most duplexers for cellular handset applications are made using surface acoustic wave (SAW) technology. However, the requirements for some communications standards (notably the third generation partnership project (3GPP) bands 2, 3, and 8) are extremely difficult or impossible to achieve with standard SAW devices. The problem with respect to these bands is the very narrow frequency separation between the transmission and receiver bands. This separation in frequency is usually referred to as the "transition band." The steepness of the filters in this region is proportional to their quality factor (Q). Even SAW filter having Qs in the neighborhood of 300-500 cannot meet the rigorous requirements of the aforementioned 3GPP bands. Not only do those bands require very narrow transition bands, the problem is exacerbated by the necessary addition of margins for manufacturing and temperature variations. As an example, temperature variations may cause the pass bands of the SAW devices to shift in frequency in an undesirable fashion.

Thus, there is a need for an improved duplexer that can meet the requirements of the 3GPP bands and provide improved performance by minimizing temperature related variations.

SUMMARY

Embodiments disclosed in the detailed description relate to a temperature compensated programmable duplexer, where the programmable duplexer includes a programmable receiver filter and a programmable transmitter filter. In some exemplary embodiments of the programmable duplexer, the frequency pass bands of the duplexer are changed according to an operating temperature of the programmable duplexer in order to maintain an acceptable transition band between the receiver path and the transmitter path.

As an example, the programmable duplexer may independently adjust the frequency pass band of a programmable receiver filter and a transmitter filter of the duplexer based upon one or more temperature indications. In other embodiments of the programmable duplexer, the frequency pass band of the programmable receiver filter and the programmable transmitter filter may be based upon both the operating temperature of the programmable duplexer and a channel pair selection to control or maximize the transition band between the receiver path and the transmitter path.

Alternatively, or in addition, a controller may be configured to receive temperature indications and adjust the frequency pass band of a duplexer based upon the one or more temperature indications. The frequency pass band of the duplexer is changed according to a selection of a channel pair to control or maximize the transition band between the receiver path and the transmitter path. The programmable duplexer permits selections of desired pass bands without the need for multiple duplexer filters. As an additional advantage, the transition band requirements become less sensitive to manufacturing tolerances and temperature variations.

An exemplary embodiment of a duplexer of a communication device may include a receiver filter, a transmitter filter, and temperature sensor circuitry. The receiver filter may include a radio frequency receiver input and a radio frequency receiver output. The receiver filter may further include a receiver pass band having a programmable receiver pass band edge. The transmitter filter may be configured to have a radio frequency transmitter input and a radio frequency transmitter output coupled to the radio frequency receiver input. The transmitter filter may be configured to include a transmitter pass band having a programmable transmitter pass band edge. The temperature sensor circuitry may be configured to generate one or more temperature indications associated with the duplexer, where the duplexer is configured to adjust at least one of the programmable receiver pass band edge and the programmable transmitter pass band edge based upon at least one or more temperature indications.

Another exemplary duplexer for a communication device includes a receiver, a transmitter filter, a temperature dependent capacitor, and a controller. The receiver filter may include a programmable pass band edge, where the receiver filter of the duplexer includes a one-port resonator arranged in series or shunt with a coupled resonator filter. Alternatively, the receiver filter may include a programmable pass band edge, where the receiver filter of the duplexer may include a plurality of one-port resonators arranged in series and shunt to form a ladder filter where each or at least one of the series one-port resonator may be coupled in parallel with one or more switchable reactive components and each or at least one shunt one-port resonator may be coupled in series with one or more switchable reactive components. In some embodiments, a plurality of shunt one-port resonators may be coupled in series with the same one or more switchable reactive components. The transmitter filter may include a programmable pass band edge, where the transmitter filter includes a plurality of one-port resonators arranged in series and in shunt to form a ladder filter. The temperature dependent capacitor may be in series or coupled in parallel with one of the one-port resonator of the receiver filter and the plurality of one-port resonators of the transmitter filter. The controller may be configured to identify a channel pair selection provided for communication between the communication device and a base station. The controller may be further configured to adjust at least one of the programmable pass band edge of the transmitter filter, the programmable pass band edge of the receiver filter, and a combination thereof based upon the channel pair selection. An additional exemplary embodiment of a duplexer for a communication device includes a programmable receiver filter, a programmable transmitter filter and a controller. The programmable receiver filter may have a programmable pass band edge. The programmable receiver filter of the duplexer may also include a one-port resonator arranged in series or shunt with a coupled resonator filter. The programmable transmitter filter may have a programmable pass band edge. The transmitter filter may further have a plurality of one-port resonators arranged in series and in shunt to form a ladder filter and a temperature dependent capacitor in parallel or in series with one of the plurality of one-port resonators. The controller may be configure to identify a channel pair selection provided for communication between the communication device and a base station. The controller may be further configured to adjust at least one of the programmable pass band edge of the programmable transmitter filter, the programmable pass band edge of the programmable receiver filter, and a combination thereof based upon the channel pair selection.

Still another exemplary embodiment of a duplexer for a communication device may include a programmable receiver filter, a programmable transmitter filter, and a controller. The programmable receiver filter may include a programmable pass band edge. The programmable receiver filter of the duplexer may also have a one-port resonator arranged in series or shunt with a coupled resonator filter, and a temperature dependent capacitor in parallel or in series with the one-port resonator. The programmable transmitter filter may include a programmable pass band edge, where the transmitter filter includes a plurality of one-port resonators arranged in series and in shunt to form a ladder filter. The controller may be configured to identify a channel pair selection provided for communication between the communication device and a base station. The controller may be further configured to adjust at least one of the programmable pass band edges of the programmable transmitter filter, the programmable pass band edge of the programmable receiver filter, and a combination thereof based upon the channel pair selection.

An exemplary embodiment of a duplexer for a communication device includes a receiver path. The receiver path may include a programmable receiver filter that provides a programmable receiver pass band. In addition, the duplexer includes a transmitter path including a programmable transmitter filter that provides a programmable transmitter pass band. The programmable transmitter filter may be separated from the programmable receiver filter by a transition band, where the programmable receiver pass band has an edge adjacent to the transition band, and the programmable transmitter pass band has an edge adjacent to the transition band. A controller may be configured to identify a channel pair selection provided for communication between the communication device and a base station. Thereafter, the controller may adjust at least one of the edges of the programmable transmitter pass band, the edge of the programmable receiver pass band, and a combination thereof depending upon the channel pair selection.

Another exemplary embodiment includes a programmable duplexer of a communication device. The exemplary embodiment may include a receiver filter having a receiver input and a receiver output, the receiver filter having a programmable receiver pass band. The exemplary embodiment may further include a transmitter filter including a transmitter input and a transmitter output, where the transmitter output is coupled to the receiver input, and where the transmitter filter has a programmable transmitter pass band. A controller may be coupled to the receiver filter and the transmitter filter. The controller may be adapted to identify a receiver-transmitter channel pair provided for communication between a mobile terminal and a base station. The controller may be further adapted to control at least one of the programmable receiver pass band, the programmable transmitter pass band, and a combination thereof, to maintain at least a minimum transition band between the programmable receiver pass band and the programmable transmitter pass band based upon the receiver-transmitter channel pair.

Another exemplary embodiment of a duplexer includes a receiver filter. The receiver filter includes a radio frequency receiver input and a radio frequency receiver output. The receiver filter further includes a receiver pass band having a programmable receiver pass band edge. The exemplary duplexer further includes a transmitter filter. The transmitter filter includes a radio frequency transmitter input and a radio frequency transmitter output. The radio frequency transmitter output may be coupled to the radio frequency receiver input. The transmitter filter may further include a transmitter pass band having a programmable transmitter pass band edge. The duplexer may also include a controller coupled to the receiver filter and the transmitter filter. The controller may modify at least one of the programmable receiver pass band edge and the programmable transmitter pass band edge based upon selection of a channel pair of a transmit frequency band and a receiver frequency band.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 4A depicts a plot of the impedance of a typical one-port resonator, broken into its real part (resistance) and imaginary part (reactance).

FIG. 4B depicts a plot of the impedance of a typical one-port resonator having a series reactive element.

FIG. 16C depicts an embodiment of a programmable transmitter filter with active temperature compensation for a system where the pass band of the programmable transmitter filter is located below the pass band of the programmable transmitter filter.

DETAILED DESCRIPTION

Figure 1:
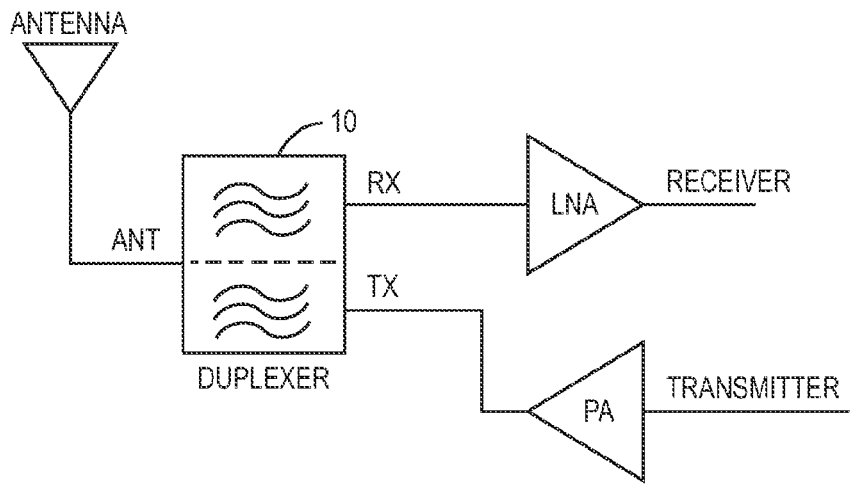
FIG. 1 depicts an example embodiment of a programmable duplexer in a radio frequency frontend transceiver circuit.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

The embodiments disclosed herein relate to programmable duplexers. The frequency pass band of the duplexer is changed according to a selection of a channel pair to control or maximize the transition band between the receiver path and the transmitter path. The programmable duplexer permits selections of desired pass bands without the need for multiple duplexer filters. As an additional advantage, the transition band requirements become less sensitive to manufacturing tolerances and temperature variations.

An exemplary embodiment of a duplexer for a communication device includes a receiver path. The receiver path may include a programmable receiver filter that provides a programmable receiver pass band. In addition, the duplexer includes a transmitter path including a programmable transmitter filter that provides a programmable transmitter pass band. The programmable transmitter filter may be separated from the programmable receiver filter by a transition band, where the programmable receiver pass band has an edge adjacent to the transition band, and the programmable transmitter pass band has an edge adjacent to the transition band. A controller may be configured to identify a channel pair selection provided for communication between the communication device and a base station. Thereafter, the controller may adjust at least one of the edges of the programmable transmitter pass band, the edge of the programmable receiver pass band, or a combination thereof, depending upon the channel pair selection.

Another exemplary embodiment includes a programmable duplexer of a communication device. The exemplary embodiment may include a receiver filter including a receiver input and a receiver output, the receiver filter having a programmable receiver pass band. The exemplary embodiment may further include a transmitter filter including a transmitter input and a transmitter output, where the transmitter output is coupled to the receiver input, and wherein the transmitter filter has a programmable transmitter pass band. A controller may be coupled to the receiver filter and the transmitter filter. The controller may be adapted to identify a receiver-transmitter channel pair provided for communication between a mobile terminal and a base station. The controller may be further adapted to control at least one of the programmable receiver pass band, the programmable transmitter pass band, or a combination thereof, to maintain at least a minimum transition band between the programmable receiver pass band and the programmable transmitter pass band based upon the receiver-transmitter channel pair.

Another exemplary embodiment of a duplexer includes a receiver filter. The receiver filter includes a radio frequency receiver input and a radio frequency receiver output. The receiver filter further includes a receiver pass band having a programmable receiver pass band edge. The exemplary duplexer further includes a transmitter filter. The transmitter filter includes a radio frequency transmitter input and a radio frequency transmitter output. The radio frequency transmitter output may be coupled to the radio frequency receiver input. The transmitter filter may further include a transmitter pass band having a programmable transmitter pass band edge. The duplexer may also include a controller coupled to the receiver filter and the transmitter filter. The controller may modify at least one of the programmable receiver pass band edge and the programmable transmitter pass band edge based upon selection of a channel pair of a transmit frequency band and a receiver frequency band. In some embodiments the transmitter filter includes a pass band having an upper programmable transmitter pass band edge and a lower programmable transmitter pass band edge to permit the controller to shift the pass band of the transmitter filter. In other embodiments, the receiver filter may include a pass band having an upper programmable receiver pass band edge and a lower programmable receiver pass band edge to permit the controller to shift the pass band of the receiver filter. In still other embodiments, the duplexer may include a receiver filter having an upper programmable receiver pass band edge and a transmitter filter having a lower programmable transmitter pass band edge. Alternatively, in other embodiments, the duplexer may include a receiver filter having a lower programmable receiver pass band edge and a transmitter filter having an upper programmable transmitter pass band edge.

FIG. 1 depicts a typical duplexer structure. The duplexer 10 includes a receive channel (RX) and a transmit channel (TX). The output of the transmit channel (TX) and the input of the receive channel (RX) are each in communication with an antenna (ANT). The output of the receive channel (RX) is in communication with a low noise amplifier (LNA), which provides an output to a receiver. The input of the transmit channel (TX) is configured to receive the output of a power amplifier (PA), which receives an input from the transmitter. As depicted in the figures and described herein, some embodiments of the duplexer 10 include a transmitter filter and a receiver filter. In some embodiments, the duplexer 10 may be a programmable duplexer. For example, in some embodiments, the duplexer 10 may include at least one of a receiver filter that is a programmable receiver filter and/or a transmitter filter that is a programmable transmitter filter.

In some embodiments, the pass band of the receiver filter may be located at a frequency band that is above the pass band of the transmitter filter. In other embodiments, the pass band of the transmitter filter may be located at a frequency that is higher than the pass band of the receiver filter. For example, the programmable transmitter filter may include a pass band located in a frequency band that is above the pass band of the programmable receiver filter. In other embodiments, the pass band of the programmable receiver filter may be located in a frequency band that is above the pass band of the programmable transmitter filter.

As will be described, in some embodiments, a duplexer 10 may be configured to adjust a location of a pass band or a pass band edge of the pass band of at least one of the programmable receiver filter and the programmable transmitter filter to maintain a desired or minimum transition band. In addition, as will be described, in some embodiments, the duplexer 10 may be configured to be a temperature compensated programmable duplexer or a temperature compensated duplexer. In some embodiments, a controller may configure the duplexer 10 to compensate for temperature drift in the pass band of the receiver filter, the transmitter filter, and/or a combination thereof. As an example, the duplexer 10 may adjust at least the pass band or one of the pass band edges of the pass band of at least one of the receiver filter and the transmitter filter based on at least a temperature indication or measurement provided by a temperature sensor. Additional embodiments of the duplexer 10 may be a temperature compensated programmable duplexer configured to adjust at least one of the pass band or the pass band edge of the pass band of at least one of the receiver filter and the transmitter filter to maintain a minimum or sufficient transition band over temperature based on a temperature measurement or indication and a channel-pair selection. In some embodiments, the pass band of the programmable transmitter filter may be located in a frequency band that is above the pass band of the temperature compensated programmable receiver filter. In other embodiments, the pass band of the temperature compensated programmable receiver filter may be located in a frequency band that is above the pass band of the transmitter filter.

Furthermore, in some embodiments, the duplexer 10 may include a receiver filter and a transmitter filter that include a temperature sensitive component. The temperature sensitive component may be configured to shift or adjust at least one of the edges of the pass band or the pass band of the receiver filter and/or the transmitter filter. The temperature sensitive component may be a temperature sensitive reactive element. For example, the temperature sensitive reactive element may be a capacitor. In other embodimens, the temperature sensitive reactive element may be an inductive element. As an example, the temperature sensitive reactive element may be a capacitor that includes a negative temperature coefficient such that that capacitance of the temperature sensitive capacitor decreases as the temperature of the capacitor increases and the capacitance of the temperature sensitive capacitance increases as the temperature of the capacitor decreases. Moreover, the temperature coefficient may be selected to provide a desired rate of change in the capacitance value versus temperature within a temperature range of interest. For example, the negative temperature coefficient may have a temperature sensitivity over a particular temperature range that offsets a temperature sensitivity of a one-port resonator. Some embodiments of the duplexer 10 may include more than one temperature sensitive capacitor where the negative temperature coefficient of each temperature sensitive capacitor is matched to offset a temperature sensitivity of a particular one-port resonator or more than one one-port resonator. In some embodiments, more than one temperature sensitive capacitor may be placed in parallel or series to provide an effective capacitance in series or in parallel with a one-port resonator. In some embodiments, the temperature coefficients of the more than one temperature sensitive capacitor may be placed in parallel or series where each of the temperature sensitive capacitors may not be equal. For example, in some embodiments, a first temperature sensitive capacitor may have a negative temperature coefficient while a second temperature sensitive capacitor has a positive temperature coefficient such that the overall temperature coefficient is negative. However, the multiple temperature sensitive capacitors may provide a more complex temperature sensitivity function that more closely matches the temperature sensitivity of the one-port resonator. In other embodiments, the multiple temperature sensitive capacitors may be placed in series with each other, in parallel with each other, or a combination thereof to offset the sensitivity of the receiver filter or the transmitter filter as a whole, one or more of the one-port resonators, a coupled resonator filter, or some combination thereof. Similarly, in some embodiments, the duplexer 10 may further include one or more switchable reactive elements in parallel or series with a temperature sensitive capacitor.

As an example, the temperature sensitive capacitors may provide temperature compensation while the one or more switchable reactive elements permit a controller or processor to control one or more of the edges of a pass band of at least one of the transmitter filter and/or the receiver filter. In some embodiments, the frequency pass band of the programmable transmitter filter may be above the frequency pass band of the programmable receiver filter, while in other embodiments, the frequency pass band of the programmable receiver filter may be above the frequency pass band of the transmitter filter. Moreover, in some embodiments of the duplexer depicted in FIG. 1, at least one of the programmable receiver filter and the programmable transmitter filter may include a temperature sensitive characteristic to substantially provide temperature compensation over a desired temperature range. In this case, either the edge of the frequency pass band or the pass band of at least one of the programmable receiver filter and the programmable transmitter filter may be further adjusted to maintain a desired transition band between the programmable receiver filter and the programmable transmitter filter.

Figure 2:
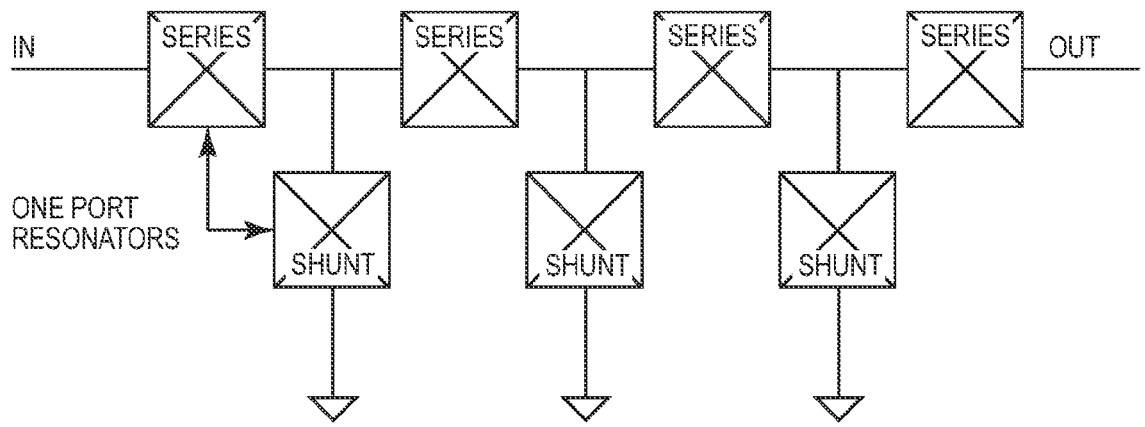
FIG. 2 depicts a ladder topology of a ladder filter topology.

In typical SAW duplexers, the receiver filters and transmitter filters each include a multiplicity of synchronous one-port resonators configured alternately in series and in shunt arrangements to form a ladder filter or ladder topology. FIG. 2 depicts an example ladder filter or ladder topology for either a receiver filter or a transmitter filter. In such a configuration, the frequency of the lower edge of each pass band is determined by the resonant frequencies, $f_R$, of the shunt resonators. In some embodiments, the shunt resonators may be one-port resonators.

The transmit signal and receiver signal are broadcast and received respectively within different frequency bands. The duplexer, therefore, is required to perform five primary functions. First, the duplexer permits TX-band signals to travel efficiently and with low insertion loss from the power amplifier (PA) to the antenna (ANT). Second, the duplexer allows RX-band signals to travel efficiently and with low insertion loss from the antenna (ANT) to the low noise amplifier (LNA). Third, the duplexer efficiently blocks TX-band signals at the antenna (ANT) port from getting through to the low noise amplifier (LNA). Fourth, the duplexer efficiently blocks spurious RX-band signals from the power amplifier (PA) from reaching the antenna (ANT) port. Fifth, the duplexer efficiently blocks any signals in either band from passing between the TX port and the RX port.

Figure 3:
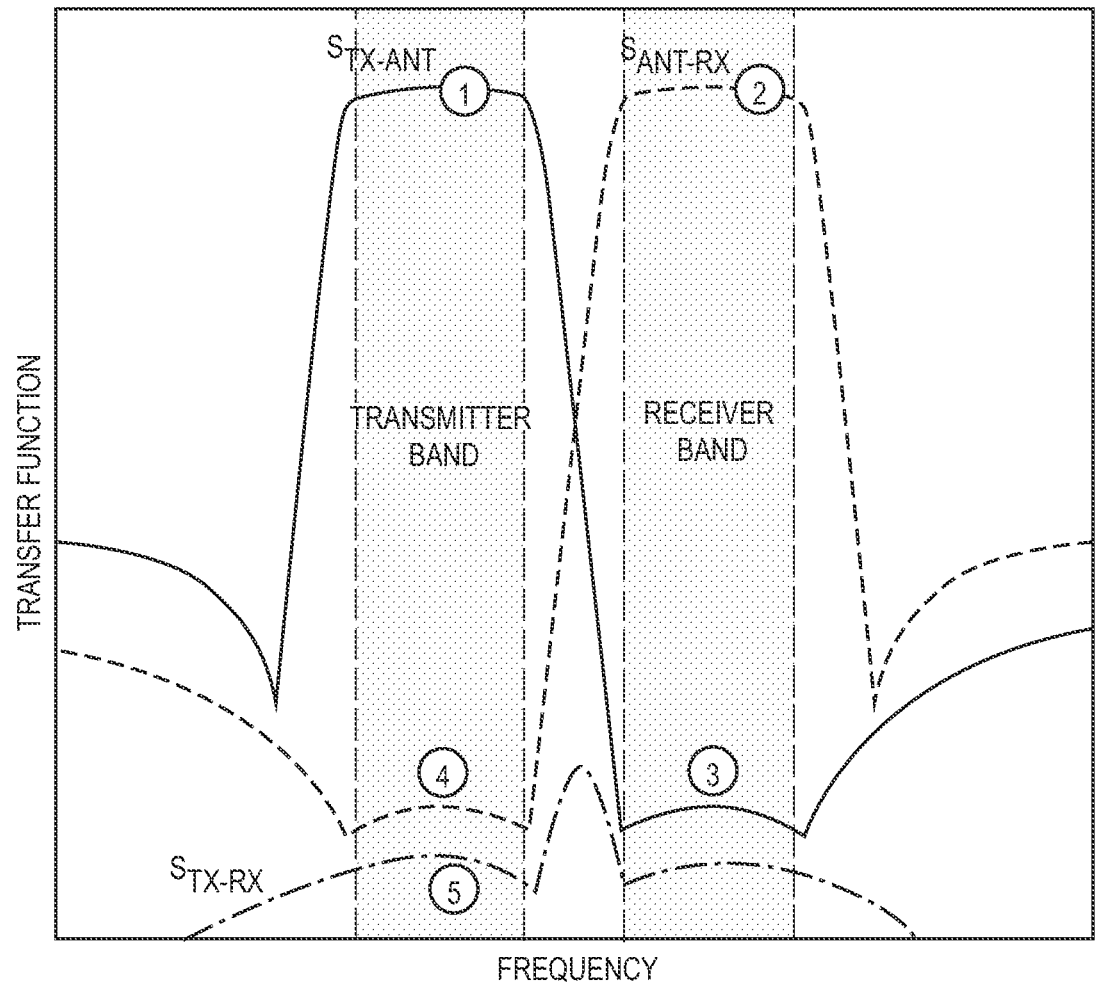
FIG. 3 depicts a transfer function of a duplexer where the transmitter band is located at a lower frequency than the receiver band.

FIG. 3 depicts the relative positions of the transmission band and the receiver band as well as the transition band between the transmission band and the receiver band. The transmission band and the receiver band respectively correspond to a transmitter channel and a receiver channel for a band of operation within a communication network. As depicted in FIG. 3, the frequency of the upper edge is determined by the anti-resonant frequencies, $f_A$, of the series resonators. There are five basic characteristics of a duplexer that should be considered. One characteristic of a duplexer is that there is (1) low transmitter to antenna (TX-ANT) attenuation in the transmitter band. Another characteristic of a duplexer is that there is (2) low antenna to receiver (ANT-RX) attenuation in the receiver band. Still another characteristic is that there is (3) high transmitter to antenna (TX-ANT) attenuation in the receiver band and (4) high antenna to receiver (ANT-RX) attenuation in the transmitter band. Furthermore, there is (5) high transmitter-receiver isolation between the receiver band and the transmitter band.

The resonant and anti-resonant frequencies of the one-port resonators are determined mostly by fixed fabrication parameters, such as mask layout, metal thickness, and photolithographic bias. However, the resonant and anti-resonant frequencies may be influenced by the addition of reactive elements in series or parallel with the resonators. Example reactive elements include capacitors or inductors.

FIG. 4A depicts a plot of the impedance of a typical one-port resonator, broken into its real part (resistance) and imaginary part (reactance). The resonant and anti-resonant frequencies correspond to the points where the reactance equals zero. As depicted in FIG. 4B, adding a reactive element shifts the resonant frequency, $f_R$, response without substantial impact to the anti-resonant, $f_A$, response. The reactive element may be an inductor or a capacitor added in series with the resonator. The reactive element may cause the imaginary part to shift up or down on the plot, which causes a left or right shift in the zero crossing at the resonant frequency. The shifting of the zero crossing thereby changes the resonant frequency of the resonator. At the anti-resonant frequency, however, the slope of the resonator reactance is extremely steep so very little left or right movement of the zero crossing will result.

Figure 5B:
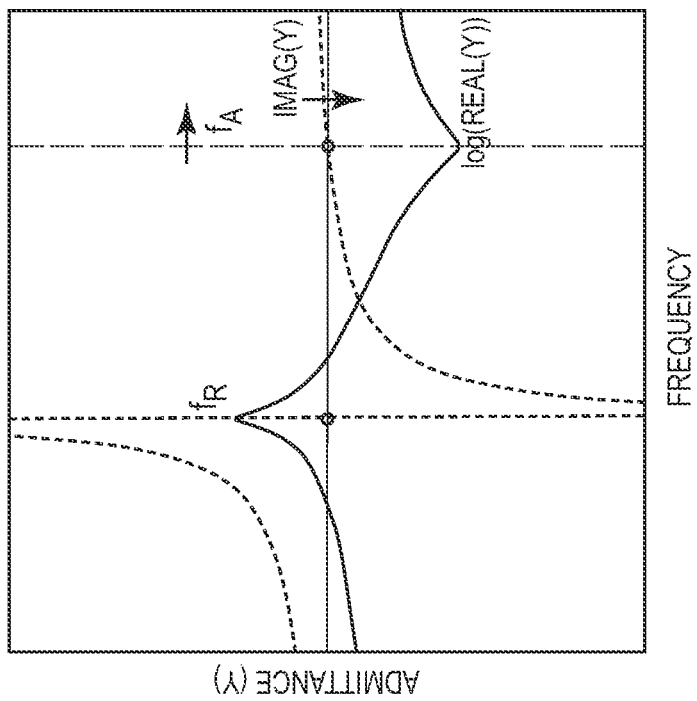
FIG. 5B depicts a plot of the real part of the admittance (conductance) and imaginary part (susceptance) for a typical one-port resonator achieved by adding a reactive element in parallel with the one-port resonator.
Figure 5A:
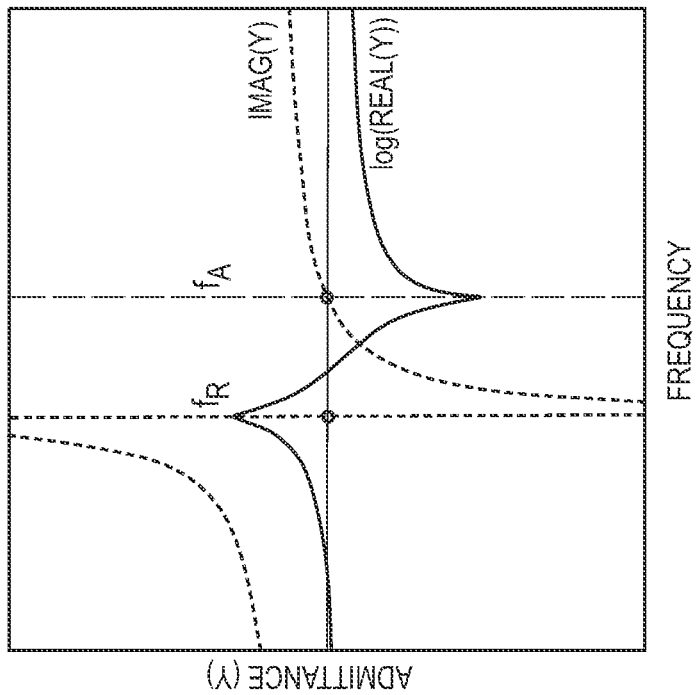
FIG. 5A depicts a plot of the real part of the admittance (conductance) for a typical one-port resonator, along with the imaginary part (susceptance).

In contrast, FIG. 5A depicts a plot of the real part of the admittance (conductance) for a typical resonator, along with the imaginary part (susceptance). Again, the resonant and anti-resonant frequencies correspond to the zero crossings of the imaginary curve. In this case, the imaginary part may be shifted up or down on the plot by adding a reactive element in parallel with the resonator. As further depicted in FIG. 5B, the addition of a parallel reactive element results in a left or right shift in the anti-resonant zero crossing and a corresponding shift in the anti-resonant frequency of the resonator. Because the slope is very steep at the resonant frequency, an up or down shift in the susceptance has almost no effect on the frequency of this zero crossing. Accordingly, by adding a reactive element in series with the resonator, the resonant frequency of the resonator may be shifted up or down. Likewise, a resonator's anti-resonant frequency may be shifted up or down by adding a reactive element in parallel.

Figure 6:
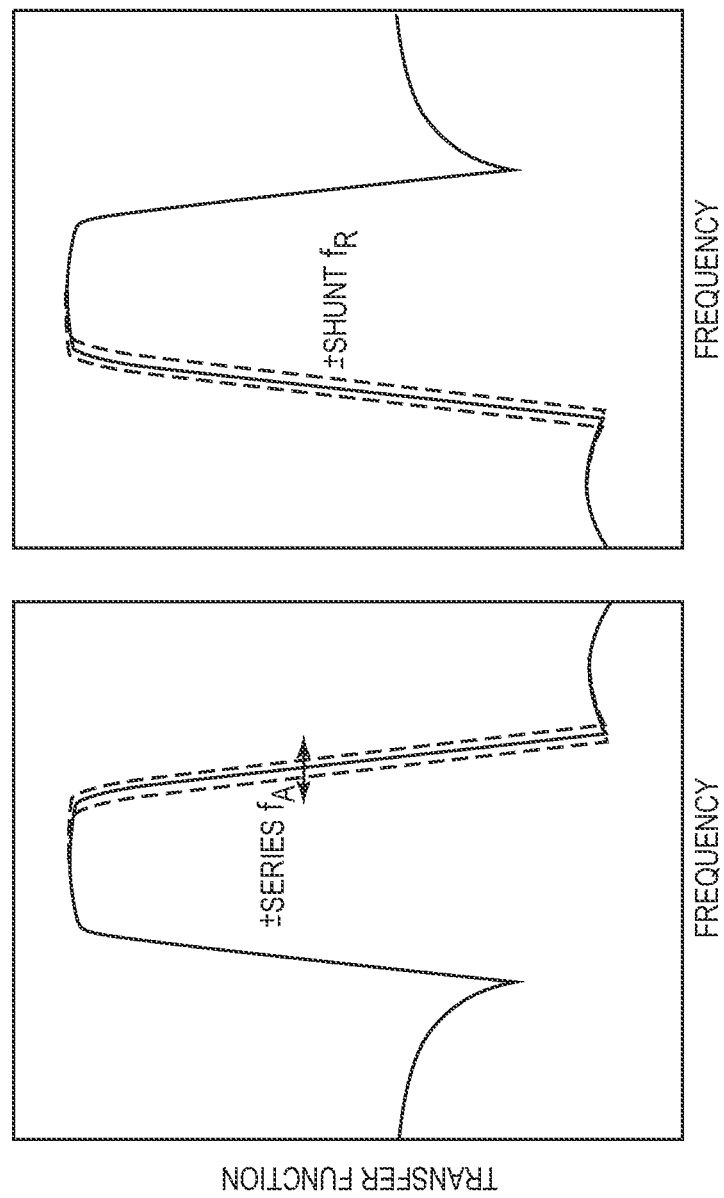
FIG. 6 depicts a frequency response of an example duplexer having a programmable transmitter filter and a programmable receiver filter.

As mentioned previously, the lower pass band edge of a ladder filter is determined primarily by the resonant frequencies of the shunt resonators, while the upper pass band edge is determined by the anti-resonant frequencies of the series resonators. Thus, as depicted in FIG. 6, the pass band edges of the filter can be shifted up or down slightly by judicious addition of reactive elements in series with the shunt elements, which control the lower pass band edge, or in parallel with the series elements, which control the upper pass band edge.

Figure 7:
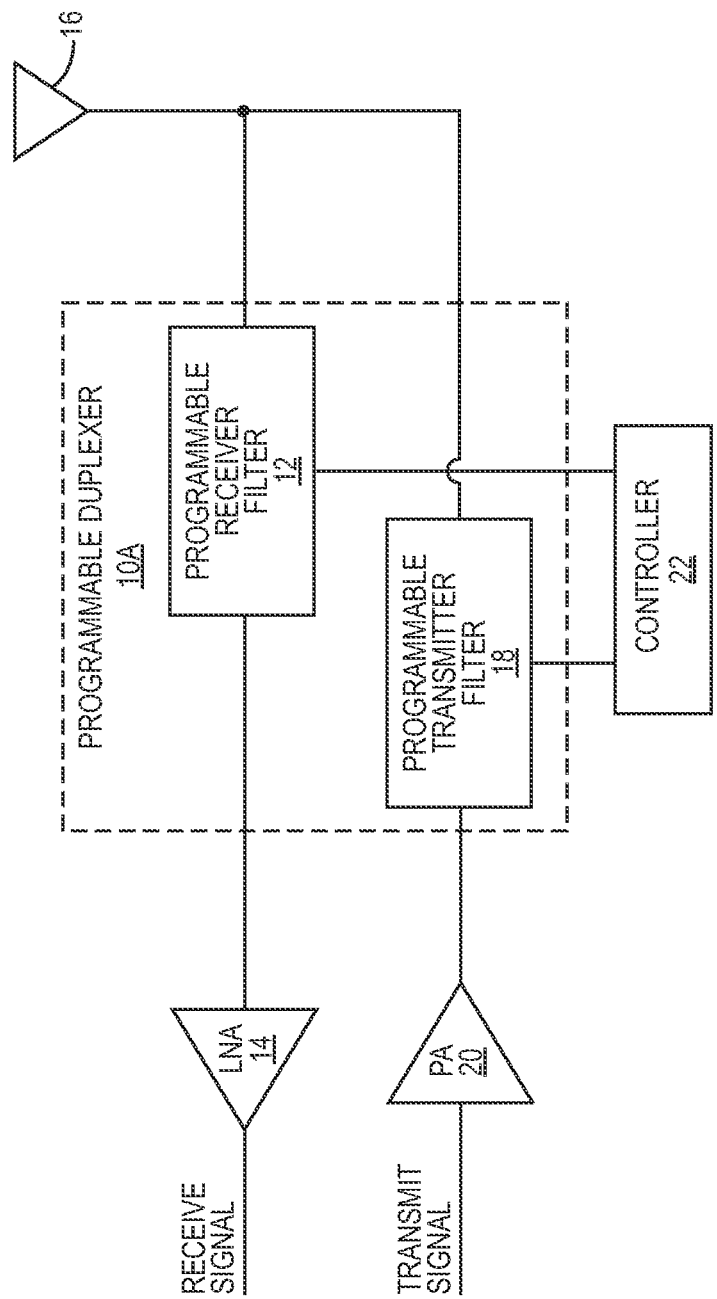
FIG. 7 depicts an example duplexer having an example programmable transmitter filter and an example programmable receiver filter.

As an exemplary embodiment of the duplexer 10 depicted in FIG. 1, FIG. 7 depicts an example embodiment of a programmable duplexer 10A. The programmable duplexer 10A may include a programmable transmitter filter 18. The programmable transmitter filter 18 may be coupled to an output of a power amplifier 20 and an antenna 16. The programmable duplexer 10A may further include a programmable receiver filter 12. The programmable receiver filter 12 may be coupled to a low noise amplifier 14 and the antenna 16. A controller 22 is coupled to the programmable receiver filter 12 and the programmable transmitter filter 18. The programmable transmitter filter 18 may include a programmable pass band. The programmable receiver filter 12 may also include a programmable pass band. The pass band of the programmable receiver filter 12 may be separated from the pass band of the programmable transmitter filter 18 by a transition band.

Figure 8:
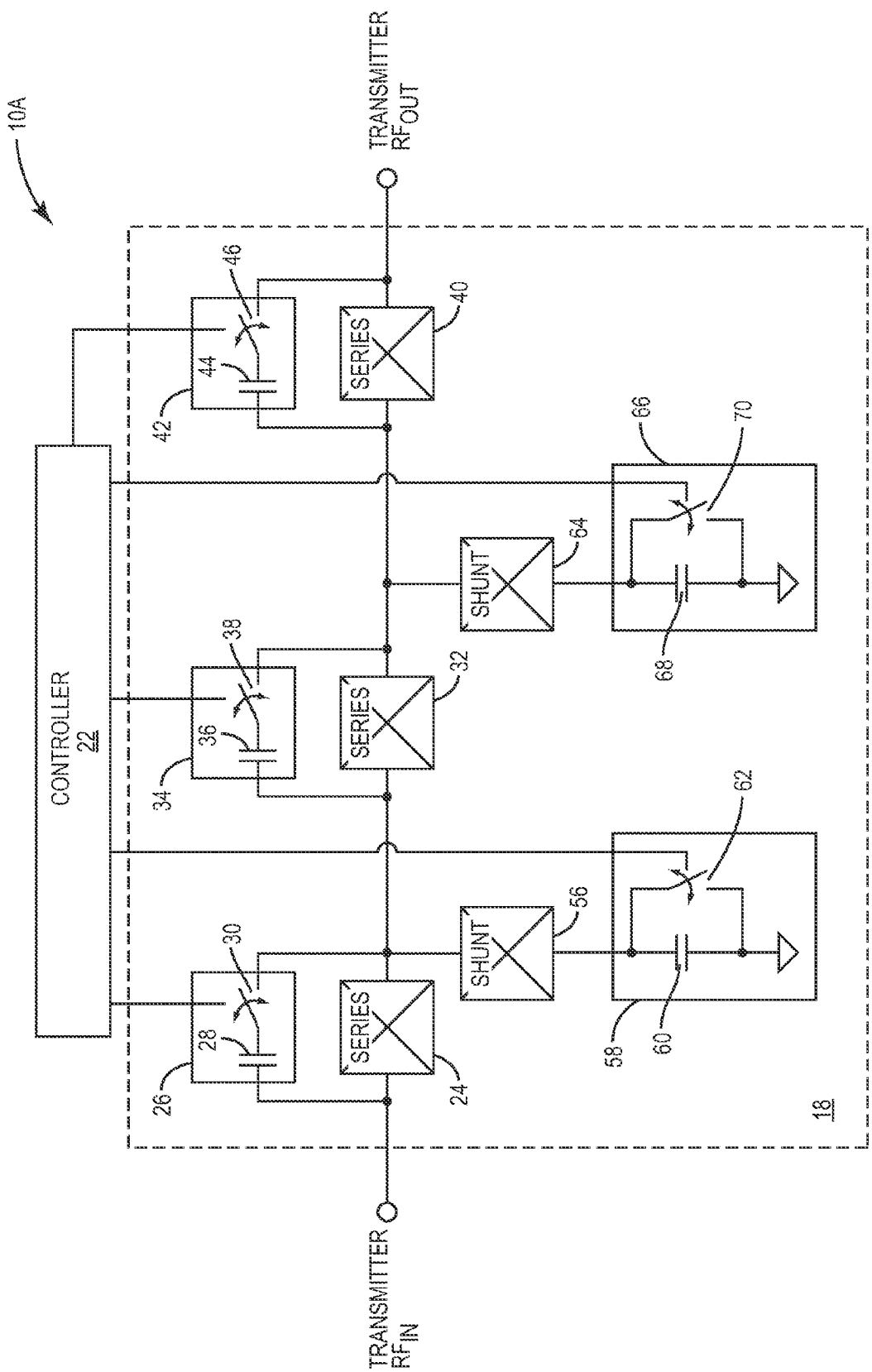
FIG. 8 depicts an example transmitter path having an example programmable transmitter filter, where the programmable transmitter filter includes arrays of resonant devices.

FIG. 8 depicts an example transmitter path having an example of the programmable transmitter filter 18. The programmable transmitter filter 18 may include a plurality of one-port resonators arranged in series and in parallel to form a ladder filter. Switch controlled series and parallel reactive elements are provided in parallel and in series with at least one of the plurality of resonators to provide a programmable pass band.

As further depicted in FIG. 8, the first series one-port resonator 24 includes a first switchable reactive element 26 in parallel with the first series one-port resonator 24. The first switchable reactive element 26 may include a capacitor 28 in series with a first switch 30. The first switch 30 is coupled to the controller 22. The first switch 30 has an enable state and a disable state. When the first switch 30 is enabled, the first switch 30 is closed and the capacitor 28 is in parallel with the first series one-port resonator 24. When the first switch 30 is in the disable state, the first switch 30 is open and capacitor 28 is not active in the circuit.

The second series one-port resonator 32 is coupled in series with the first series one-port resonator 24. The second series one-port resonator 32 further includes a second switchable reactive element 34 in parallel with the second series one-port resonator 32. The second series one-port resonator 32 is in parallel with a second switchable reactive element 34. The second switchable reactive element 34 may include a reactive device 36 in series with a second switch 38 coupled to the controller 22. The reactive device 36 may be either a capacitor or an inductor. As illustrated in FIG. 8, the reactive device 36 is a capacitor. The second switch 38 has an enable state and a disable state. When the second switch 38 is enabled, the second switch 38 is closed and reactive device 36 is in parallel with the second series one-port resonator 32. When the second switch 38 is in the disable state, the second switch 38 is open and the reactive device 36 is not active in the circuit.

The second series one-port resonator 32 may be coupled in series with a third series one-port resonator 40. The third series one-port resonator 40 further includes a third switchable reactive element 42 in parallel with the third series one-port resonator 40. The third series one-port resonator 40 is in parallel with a third switchable reactive element 42. The third switchable reactive element 42 may include a reactive device 44 in series with a third switch 46 that is coupled to the controller 22. The reactive device 44 may be either a capacitor or an inductor. As illustrated in FIG. 8, the reactive device 44 is a capacitor. The third switch 46 has an enable state and a disable state. When the third switch 46 is enabled, the third switch 46 is closed and reactive device 44 is in parallel with the third series one-port resonator 40. Otherwise, when the third switch 46 is in the disable state, the third switch 46 is open and the reactive device 44 is not active in the circuit.

The example programmable transmitter filter 18 of FIG. 8 may further include a first shunt one-port resonator 56. The first shunt one-port resonator 56 may be in series with a first switchable series reactive device 58, which is coupled to ground. The first shunt one-port resonator 56 may be further coupled to the first series one-port resonator 24 and the second series one-port resonator 32. The first switchable series reactive device 58 may include a reactive device 60 in parallel with a fourth switch 62. When the fourth switch 62 is enabled by the controller 22, the fourth switch 62 is closed and the reactive device 60 is bypassed. When the fourth switch 62 is disabled, the fourth switch 62 is open and the reactive device 60 is operative in the circuit.

The programmable transmitter filter 18 of FIG. 8 may further include a second shunt one-port resonator 64. The second shunt one-port resonator 64 may be in series with a second switchable series reactive device 66, which is coupled to ground. The second shunt one-port resonator 64 may be further coupled to the second series one-port resonator 32 and the third series one-port resonator 40. The second switchable series reactive device 66 may include a reactive device 68 in parallel with a fifth switch 70. When the fifth switch 70 is enabled by the controller 22, the fifth switch 70 is closed and the reactive device 68 is bypassed. When the fifth switch 70 is disabled, the fifth switch 70 is open and the reactive device 68 is operative in the circuit. Although the reactive devices depicted in FIG. 8 are capacitors, this is by way of illustration and not by limitation. Furthermore, while FIG. 8 describes a programmable transmitter filter 18, the same circuit topology may be used to form a programmable receiver filter 12. Although not depicted in FIG. 8 for the sake of convenience and not by way of limitation, additional series one-port resonators and shunt one-port resonators may be added to increase the order of the ladder filter.

As a non-limiting example, the circuit depicted in FIG. 8 may be used as a programmable transmitter filter 18. Operationally, the programmable transmitter filter 18 may be shifted upward or downward depending upon the switch positions of the first switch 30, the second switch 38, the third switch 46, the fourth switch 62 and the fifth switch 70. In the case where the first switch 30, the second switch 38, the third switch 46, the fourth switch 62 and the fifth switch 70 are each disabled, the pass band of the programmable transmitter filter 18 shifts up in frequency. In the case where the first switch 30, the second switch 38, the third switch 46, the fourth switch 62 and the fifth switch 70 are each enabled, the pass band of the programmable transmitter filter 18 shifts down in frequency.

In some embodiments, the controller 22 may shift only the upper edge of the pass band of the programmable transmitter filter 18 or only the lower edge of the pass band of the programmable transmitter filter 18. For example, in the case where the programmable duplexer 10A includes the programmable receiver filter 12 and the programmable transmitter filter 18, and the pass band of the programmable receiver filter 12 is positioned higher in frequency or above the pass band of the programmable transmitter filter 18, the controller 22 may only shift the upper edge of the programmable transmitter filter 18. To shift the upper edge of the programmable transmitter filter down in frequency, the controller 22 may enable the first switch 30, the second switch 38, and the third switch 46. In other words, the controller 22 increases the capacitance across the first series one-port resonator 24, the second series one-port resonator 32, and the third series one-port resonator 40. To shift the upper edge of the programmable transmitter filter up in frequency, the controller 22 may disable the first switch 30, the second switch 38, and the third switch 46. In other words, the controller 22 decreases the capacitance across the first series one-port resonator 24, the second series one-port resonator 32, and the third series one-port resonator 40.

In some embodiments, the controller 22 may toggle each of the first series one-port resonator 24, the second series one-port resonator 32, and the third series one-port resonator 40 simultaneously. However, in other embodiments, the controller 22 may toggle each of the first series one-port resonator 24, the second series one-port resonator 32, and the third series one-port resonator 40 independently or in combination to obtain the desired shift in the upper edge of the frequency pass band of the programmable transmitter filter 18. Moreover, in the case where the programmable duplexer 10A is only used in a communication system having a pass band of the programmable receiver filter 12 located higher in frequency than the pass band of the transmitter filter, the first switchable series reactive device 58 and the second switchable series reactive device 66 may be removed such that the first shunt on-port resonator 56 and the second shunt one-port resonator 64 are coupled to ground.

In some embodiments, the programmable duplexer 10A includes a programmable receiver filter 12 having a pass band located higher in frequency than the pass band of a programmable transmitter filter 18. In this case, because the pass band of the programmable receiver filter 12 is positioned higher in frequency or above the pass band of the programmable transmitter filter 18, one or both of the first switchable series reactive device 58 and the second switchable series reactive device 66 may be replace by a wire to couple the first shunt one-port resonator 56 and the second shunt one-port resonator 64 directly to ground.

Alternatively, in some embodiments, the programmable transmitter filter 18 may also be used in a communication system having a pass band located in a frequency band that is higher than the frequency band in which the pass band of the programmable receiver filter 12 is located. In this case, as a non-limiting example, the controller 22 may only shift the lower edge of the programmable transmitter filter 18. To shift the lower edge of the programmable transmitter filter down in frequency, the controller 22 may enable the fourth switch 62 and the fifth switch 70 to effectively short out the reactive device 60 and the reactive device 68. Assuming the reactive device 60 and the reactive device 68 are capacitors, closing the fourth switch 62 and the fifth switch 70 effectively place an infinite capacitance in series with the first shunt one-port resonator 56 and the second shunt one-port resonator 64 and ground. In other words, the controller 22 increases the capacitance in series with the first shunt one-port resonator 56 and the second shunt one-port resonator 64 to shift the lower edge of the programmable transmitter filter 18 down in frequency. To shift the lower edge of the pass band of the programmable transmitter filter upward in frequency, the controller 22 may disable the fourth switch 62 and the fifth switch 70. In other words, the controller 22 decreases the capacitance in series with the first shunt one-port resonator 56 and the second shunt one-port resonator 64 to shift the lower edge of the pass band of the programmable transmitter filter 18 up in frequency.

In some embodiments, the controller 22 may toggle each of the fourth switch 62 and the fifth switch 70. However, in other embodiments, the controller 22 may toggle each of the fourth switch 62 and the fifth switch 70 independently to obtain the desired shift in frequency of the lower edge of the pass band of the programmable transmitter filter 18. In addition, in some embodiments where the programmable duplexer 10A will only be used in a system having the pass band of the programmable transmitter filter 18 positioned higher in frequency or above the pass band of the programmable receiver filter 12, the first switchable reactive element 26, the second switchable reactive element 34, and the third switchable reactive element 42 may be removed from the programmable transmitter filter 18.

As discussed above, in some embodiments of the programmable duplexer 10A, the topology of the programmable transmitter filter 18 may be used to form a programmable receiver filter 12, which is not depicted in FIG. 8 for the sake of convenience and not by way of limitation. As a non-limiting example, in the case where the circuit depicted in FIG. 8 may be configured as a programmable receiver filter 12, depicted in FIG. 7, the functionality of the programmable filter circuit, depicted as the programmable transmitter filter 18 in FIG. 8, is substantially the same with respect to shifting either the pass band of the programmable filter circuit, the upper edge of the pass band of the programmable filter circuit, or the lower edge of the pass band of the programmable filter circuit. As an example embodiment where the pass band of the programmable filter circuit depicted as the programmable transmitter filter 18 is configured as a programmable receiver filter 12, depicted in FIG. 7, may be located lower in frequency or below the pass band of the programmable transmitter filter 18 of the programmable duplexer 10A, the controller 22 may be configured to control the first switch 30, the second switch 38, and the third switch 46 to shift the upper edge of the pass band of the programmable receiver filter 12, depicted in FIG. 7. As an example, to shift the lower edge of the pass band to a higher frequency, the controller 22 may disable or open one or more of the first switch 30, the second switch 38, the third switch 46, and/or some combination thereof. Alternatively, to shift the lower edge of the pass band to a lower frequency, the controller 22 may enable or close one or more of the first switch 30, the second switch 38, the third switch 46, and/or some combination thereof. In addition, in some embodiments, the first switchable series reactive device 58 and second switchable series reactive device 66 may be replace by a wire to couple the first shunt one-port resonator 56 and the second shunt one-port resonator 64 directly to ground.

As another example embodiment of a programmable receiver filter 12, which is not depicted for the sake of convenience and not by way of limitation, based on the topology of the circuit depicted in FIG. 8, the programmable receiver filter 12, not depicted for the sake of limitation and not by way of limitation, may be configured for the case where the pass band of the receiver filter is located higher in frequency or above the transmitter channel. In this case, the controller 22 may enable the fourth switch 62 and the fifth switch 70 to shift the lower edge of the pass band of the programmable receiver filter 12, depicted in FIG. 7, down in frequency. In a similar fashion, the controller 22 may disable or open the fourth switch 62 and the fifth switch 70 of the programmable receiver filter 12, depicted in FIG. 7, to shift the lower edge of the pass band of the programmable receiver filter 12, (depicted in FIG. 7, higher in frequency. Similarly, if desired, the upper edge of the pass band of the programmable receiver filter 12 may be shifted up in frequency by disabling the first switch 30, the second switch 38, and the third switch 46, and shifted down in frequency by enabling or closing the first switch 30, the second switch 38, and the third switch 46. In some embodiments of the programmable receiver filter 12, depicted in FIG. 7, based on the circuit of FIG. 8, the first switchable reactive element 26, the second switchable reactive element 34, and the third switchable reactive element 42 may not be present when the pass band of the programmable receiver filter 12 is located in a frequency band that is above a frequency band in which the pass band of the programmable transmitter filter 18 is located.

In addition, as discussed above, because the topology of the programmable transmitter filter 18 may be configured to move the entire pass band of the programmable transmitter filter 18, the pass band of the programmable transmitter filter 18 may be placed either above or below the frequency band in which the pass band of the programmable receiver filter 12. Similarly, for the alternative case where the topology of the programmable transmitter filter 18 is used to form the programmable receiver filter 12, which is not depicted for the sake of convenience and not by way of limitation, the pass band of the resulting programmable receiver filter 12 may be located in a frequency band that is either above or below the frequency band in which the pass band of the programmable transmitter filter 18 is located.

Figure 11:
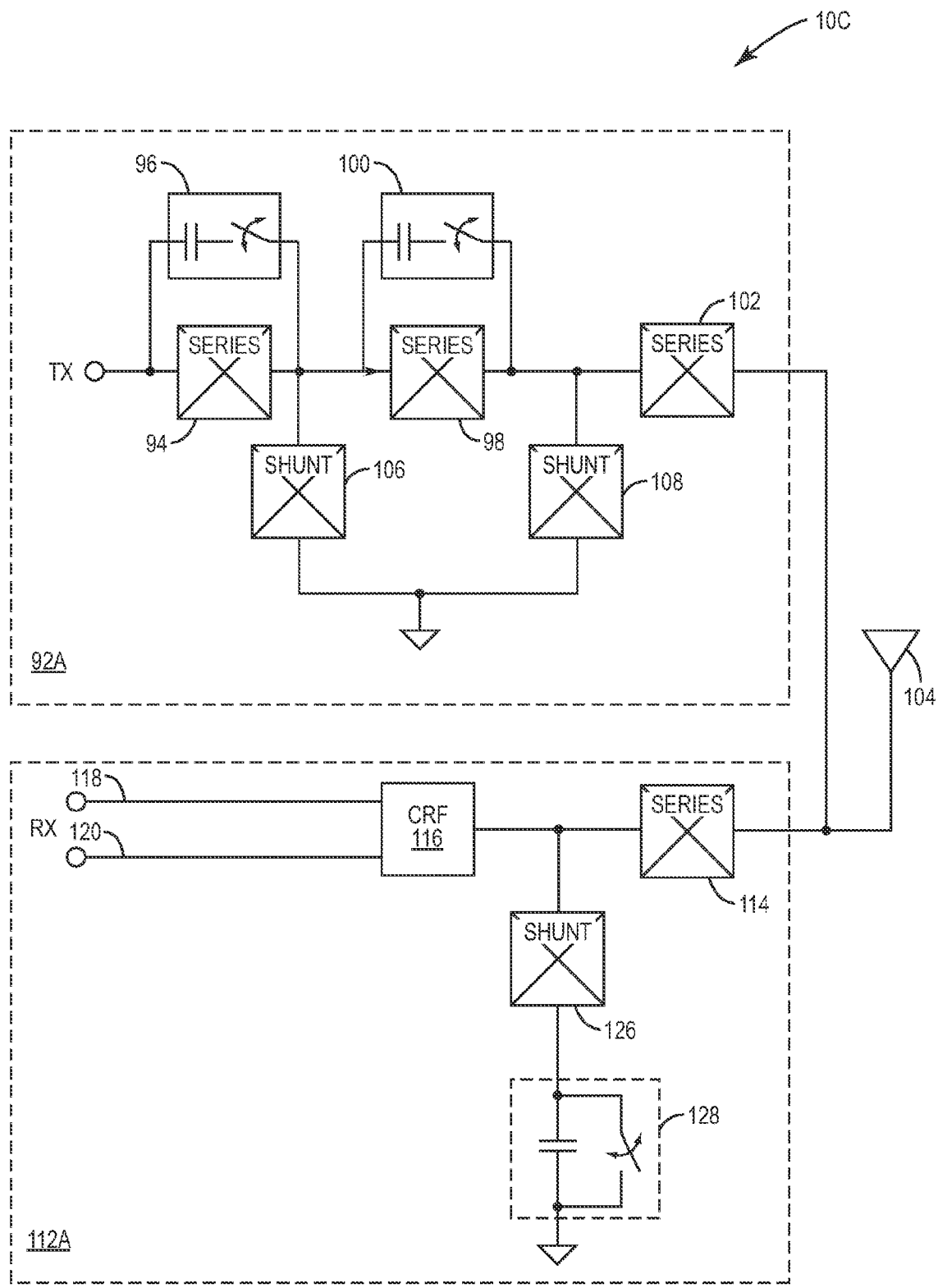
FIG. 11 depicts an alternative example programmable duplexer that provides a balanced differential output to a differential input.

Furthermore, as discussed in further detail with respect to FIG. 11, some alternative embodiments of a programmable duplexer 10A based on the topology of the programmable transmitter filter 18 may be configured to permit the controller 22 to swap the locations of the programmable transmitter pass band and the programmable receiver pass band. In other words, in a first case, the controller 22 may be configure the pass band of the programmable transmitter filter 18 and the pass band of the programmable receiver filter 12 such that the pass band of the programmable transmitter filter may be in a frequency band that is above a frequency band in which the pass band of the programmable receiver filter 12 is located. Alternativelly, in a second case, the controller 22 may be configure the pass band of the programmable transmitter filter 18 and the pass band of the programmable receiver filter 12 such that the pass band of the programmable transmitter filter may be at a frequency band that is below the frequency band in which the pass band of the programmable receiver filter 12 is located. In addition, the controller 22 may be further configured to adjust at least one of the edges of the pass bands of the programmable transmitter filter 18 and the programmable receiver filter 12 that are proximate to one another and form the transition band between the programmable transmitter filter 18 and the programmable receiver filter 12.

Figure 9:
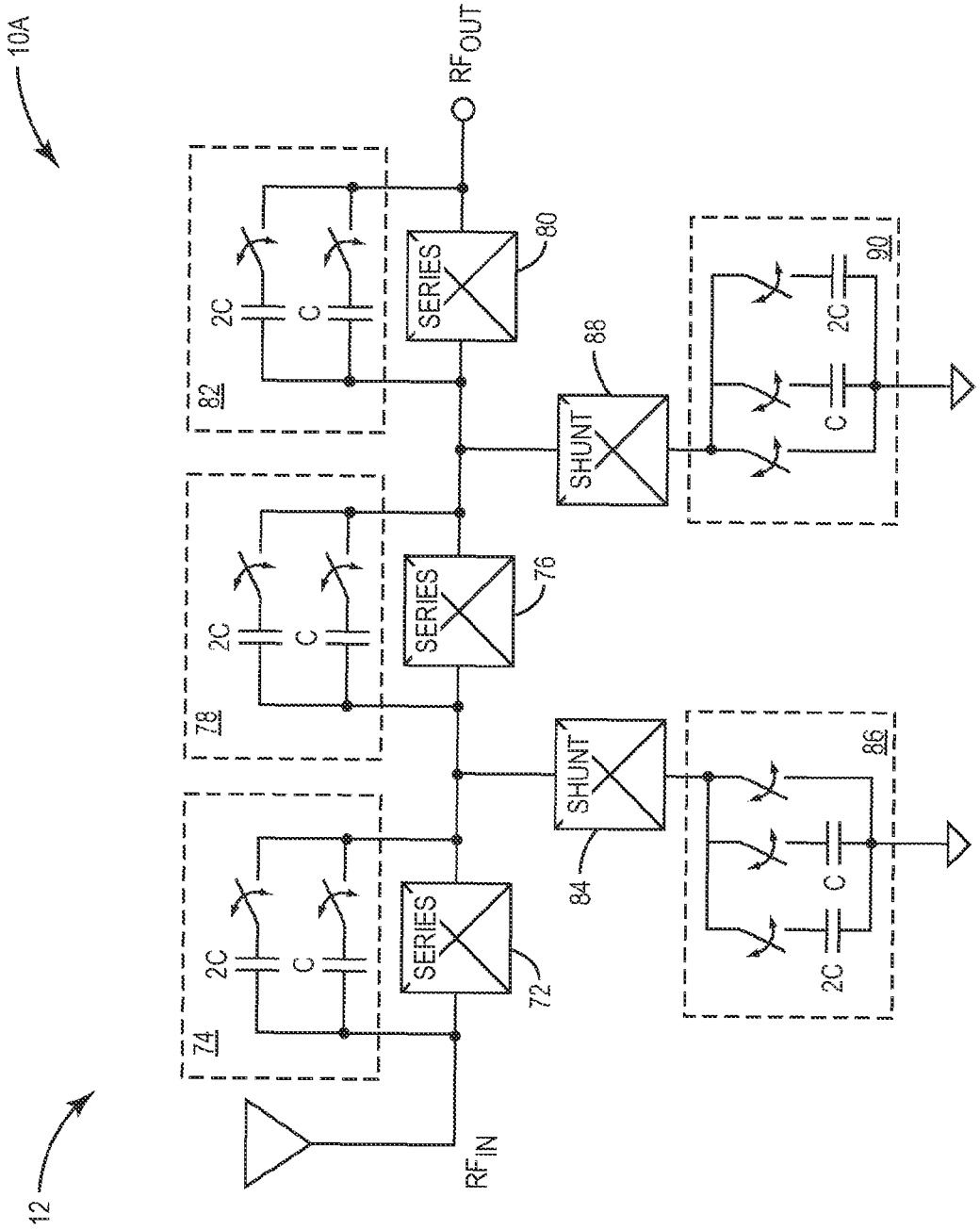
FIG. 9 depicts an example programmable receiver filter including arrays of reactive devices in parallel with series one-port resonators and in series with shunt one-port resonators.

As further depicted in FIG. 9, an example embodiment of the programmable receiver filter 12 may further include arrays of reactive devices in parallel with series one-port resonators and arrays of reactive devices in series with series one-port resonators. The capacitors may be thermally weighted or binary encoded capacitor arrays. As an example, a first series one-port resonator 72 may be in parallel with a first capacitor array 74. A second series one-port resonator 76 may be in parallel with a second capacitor array 78. A third series one-port resonator 80 may be in parallel with a third capacitor array 82. Additionally, a first shunt one-port resonator 84 may be placed in series with a fourth capacitor array 86. A second shunt one-port resonator 88 may be placed in series with a fifth capacitor array 90.

Although not depicted in FIG. 9 for the sake of convenience and not by way of limitation, the controller 22 may be configured to control each switch of each of the capacitor arrays, namely the first capacitor array 74, the second capacitor array 78, the third capacitor array 82, the fourth capacitor array 86, and the fifth capacitor array 90. Accordingly, it will be understood that the controller 22 may control the operation of the first capacitor array 74, the second capacitor array 78, the third capacitor array 82, the fourth capacitor array 86, and the fifth capacitor array 90 to control at least one of the edges of the pass band of the programmable receiver filter 12.

Notably, when all the switches of the first capacitor array 74, the second capacitor array 78, and the third capacitor array 82 are open, no capacitance is placed across the first a first series one-port resonator 72, the first series one-port resonator 76, and the third series one-port resonator 80. However, in order for the programmable receiver filter 12 to operate properly, at least one of the switches of the fourth capacitor array 86 and the fifth capacitor array 90 must be enabled or closed. In addition, the minimum capacitance of both the fourth capacitor array 86 and the fifth capacitor array 90 is equal to the capacitance "C." The maximum capacitance of the fourth capacitor array 86 and the fifth capacitor array 90 is obtained by directly tying the first shunt one-port resonator 84 and the second shunt one-port resonator 88 to ground, which is equivalent to providing an infinite capacitance between the tying the first shunt one-port resonator 84 and the second shunt one-port resonator 88 and ground. As discussed above, as the capacitance across the first series one-port resonator 72, the first series one-port resonator 76, and the third series one-port resonator 80 increases, the upper edge of the programmable receiver filter 12 goes down in frequency. Also, as discussed above, as the capacitance in series with the first shunt one-port resonator 84 and/or the second shunt one-port resonator 88 increases, the lower edge of the pass band of the programmable receiver filter 12 moves up in frequency. Similarly, as the capacitance in series with the first shunt one-port resonator 84 and/or the second shunt one-port resonator 88 increases, the lower edge of the pass band of the programmable receiver filter 12 moves down in frequency. Accordingly, in some embodiments, where the receiver channel is located higher in frequency or over the transmitter channel, the programmable receiver filter 12 depicted in FIG. 9 may be modified to only move the lower edge of the pass band of the programmable receiver filter. In this case, the first capacitor array 74, the second capacitor array 78, and the third capacitor array 82 may be eliminated. However, in those embodiments where the transmitter channel is located higher in frequency or over the receiver channel, the fourth capacitor array 86 and the fifth capacitor array 90 may be replaced by a wire that directly couples the first shunt one-port resonator 84 and the second shunt one-port resonator 88 to ground. Based upon a channel-pair selection, the controller 22 configures each respective capacitor to maximize the transition band between the receiver channel and the transmit channel. Referring to the programmable transmitter filter 18 depicted in FIG. 8, it will be understood that in some embodiments, the first switchable reactive element 26, the second switchable reactive element 34, the third switchable reactive element 42, the first switchable series reactive device 58, and the second switchable series reactive device 66 may be capacitor arrays.

Figure 10:
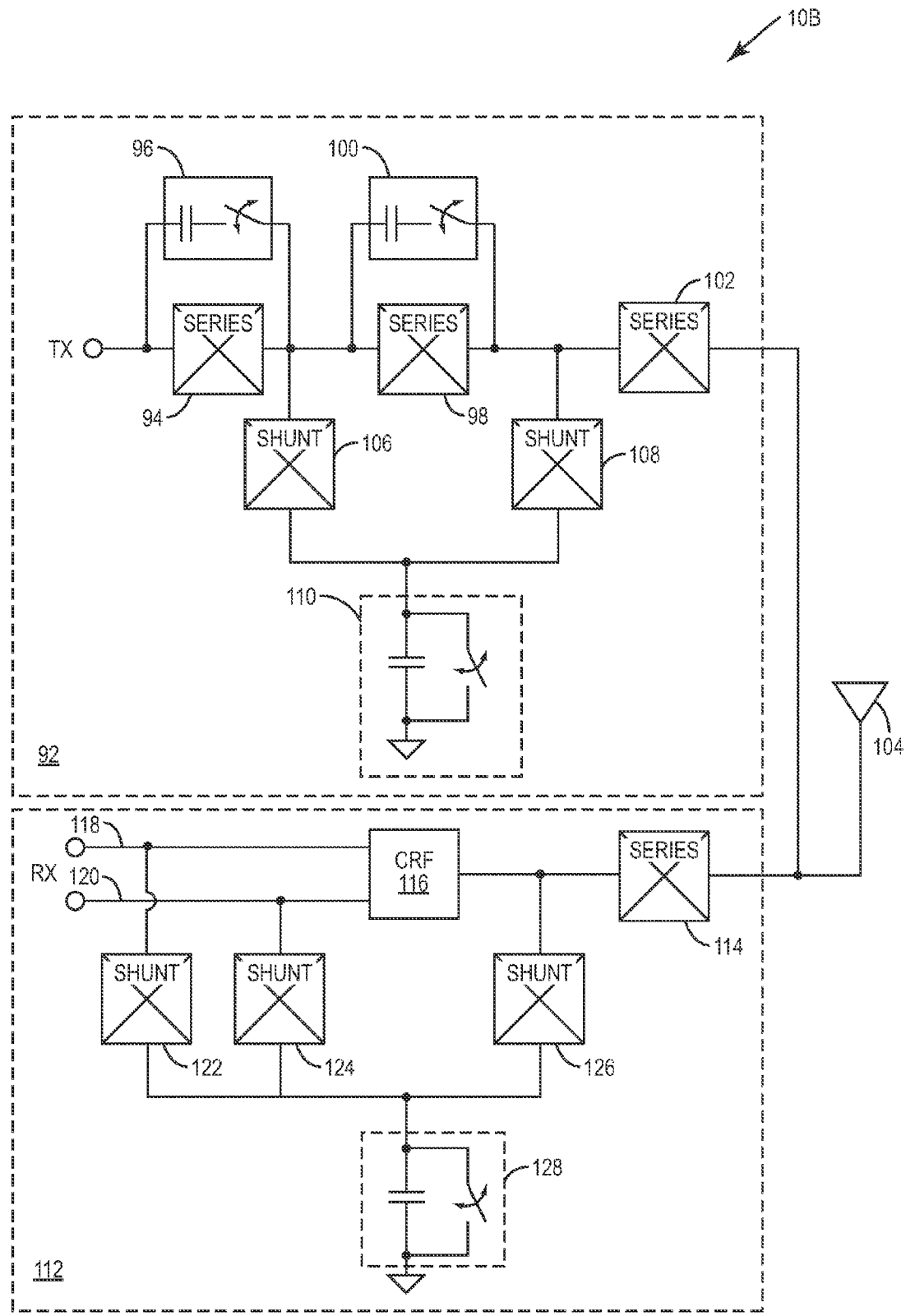
FIG. 10 depicts an example programmable duplexer that provides a balanced differential output to a differential receiver input.

As yet another embodiment of duplexer 10, depicted in FIG. 1, FIG. 10 depicts a non-liming example embodiment of the programmable duplexer 10B. The programmable duplexer 10B includes a programmable transmitter filter 92 and a programmable receiver filter 112. As depicted in FIG. 10, the programmable receiver filter 112 provides a balanced differential output to a differential receiver input. In addition, the programmable duplexer 10B is configured for a communication system where the pass band of the programmable receiver filter 112 is located in a frequency band above a frequency band where the pass band of the programmable transmitter filter 92 is located. In other words, the programmable duplexer 10B may be configured based upon the assumption that the transmitter pass band is located at a lower frequency than the receiver pass band frequency.

As an example embodiment, FIG. 10 depicts that programmable duplexer 10B includes the programmable transmitter filter 92. The programmable transmitter filter 92 may be configured as a ladder filter of one-port resonators. A first series one-port resonator 94 is coupled in parallel with a first switchable reactive element 96. A second series one-port resonator 98 is coupled in parallel with a second switchable reactive element 100. A third series one-port resonator 102 is coupled between a second series one-port resonator 98 and the antenna 104.

A first shunt one-port resonator 106 and the second shunt one-port resonator 108 are coupled in series with a third switchable reactive element 110. The controller 22, which is not depicted in FIG. 10 for the sake of convenience and not by limitation, may be configured to control the operation of the first switchable reactive element 96, the second switchable reactive element 100, and the fourth switchable reactive element 128 based upon the selected channel pair. This permits the controller 22 to govern the upper edge of the programmable transmitter pass band edge to compensate for drift into the transition band. As a non-limiting example, the controller 22 may enable each of the first switchable reactive element 96, the second switchable reactive element 100, and the third switchable reactive element 110 to shift the pass band of the programmable transmitter filter 92 down in frequency. Enabling the first switchable reactive element 96 and the second switchable reactive element 100 places a respective capacitance across the first series one-port resonator 94 and the second series one-port resonator 98, which shifts the upper edge of the pass band of the programmable transmitter filter 92 down in frequency. Enabling the third switchable reactive element 110 effectively couples the first shunt one-port resonator 106 and the second shunt one-port resonator 108 to ground, which is the equivalent of placing an infinite capacitor in series with the first shunt one-port resonator 106 and the second shunt one-port resonator 108. Increasing the capacitance in series with the first shunt one-port resonator 106 and the second shunt one-port resonator 108 results in the lower edge of the pass band of the programmable transmitter filter 92 moving lower in frequency. For example, closing the switch of the fourth switchable reactive element 128 to couple the first shunt one-port resonator 106 and the second shunt one-port resonator 108 to ground effectively increases the capacitance in series with the first shunt one-port resonator 122, the second shunt one-port resonator 124, and the third shunt one-port resonator 126. Similarly, the lower edge of the pass band of the programmable transmitter filter 92 may be moved up in frequency by disabling the third switchable reactive element 110. In other words, disabling the third switchable reactive element 110 opens the switch of the third switchable reactive element 110, which effectively decreases the capacitance in series with the first shunt one-port resonator 122, the second shunt one-port resonator 124, and the third shunt one-port resonator 126. As a result, depending upon the initial pass band of the programmable transmitter filter 92, the topology of the programmable transmitter filter 92 may be used in a programmable duplexer where the pass band of the programmable transmitter filter 92 is below the frequency band in which the pass band of the programmable transmitter filter 92 is located. Alternatively, because the controller 22 can configure either the upper edge and/or the lower edge of the pass band of the programmable transmitter filter 92 to be shifted either up or down in frequency, some alternative embodiments of the programmable transmitter filter 92 may be used in a programmable duplexer where the pass band of the programmable transmitter filter 92 is either above or below the pass band of the programmable receiver filter 112.

As an example, although not depicted in FIG. 10 for the sake of convenience and not by way of limitation, as will be described relative to the programmable duplexer 10E depicted in FIG. 14, in some embodiments of the programmable duplexer 10B, the first series one-port resonator 94, the second series one-port resonator 98, and the third series one-port resonator 102 of the programmable transmitter filter 92 and the first series one-port resonator 1124 of the programmable receiver filter 112 may be a configurable series one-port resonator element. Similarly, in some embodiments of the programmable duplexer 10B, the first shunt one-port resonator 106 and the second shunt one-port resonator 108 of the programmable transmitter filter 92 and the first shunt one-port resonator 122, the second shunt one-port resonator 124, and the third shunt one-port resonator 126 may be configurable shunt one-port resonators. Likewise, in some embodiments of the programmable duplexer 10B, the coupled resonator filter 116 may be a configurable coupled resonator filter 116. The controller 22 may be configured to configure each of the configurable series one-port resonators, each of the configurable shunt one-port resonators, and the configurable coupled resonator filter to shift the pass band of the programmable transmitter filter 92 in frequency relative to the location of the pass band of the programmable receiver filter 112. For example, in a first configuration, the pass band of the programmable transmitter filter 92 may be in a frequency band that is lower than the frequency band in which the pass band of the programmable receiver filter 112 is located. In a second configuration, the pass band of the programmable transmitter filter 92 may be in a frequency band that is higher than the frequency band in which the pass band of the programmable receiver filter 112 is located.

FIG. 10 further depicts that programmable duplexer 10B further includes a programmable receiver filter 112 that has a first one-port resonator 114 coupled in series with a coupled resonator filter (CRF) 116. The coupled resonator filter 116 may be configured to receive a single ended input and provide a balanced differential output to the receiver, (RX). The differential output may include a first receiver output 118 and a second receiver output 120. The programmable receiver filter 112 may further include a first shunt one-port resonator 122, a second shunt one-port resonator 124, and a third shunt one-port resonator 126 coupled in parallel.

The first shunt one-port resonator 122, the second shunt one-port resonator 124, and the third shunt one-port resonator 126 coupled in parallel may be coupled in series with a fourth switchable reactive element 128. The fourth switchable reactive element 128 may be configured by the controller 22, which is not depicted in FIG. 10 for the sake of convenience and not by way of limitation, based upon the selected channel pair. This permits the controller 22 to govern the lower edge of the programmable receiver pass band edge to compensate for drift into the transition band. Because the programmable receiver filter 112 may be configured to only shift the lower edge of the pass band of the programmable receiver filter 112, the programmable receiver filter may be configured for a system where the pass band of the programmable transmitter filter 92 is located in a frequency band below the frequency band in which the pass band of the programmable receiver filter 112 is located.

The output of the coupled resonator filter 116 is in cooperative function with the a fourth switchable reactive element 128 and the second shunt one-port resonator 124 to form the first receiver output 118 and the second receiver output 120, respectively. However, although not depicted in FIG. 10 and as will be discussed relative to FIG. 13B, in the case where the controller 22 may swap the relative locations of the pass band of the programmable transmitter filter 92 and the pass band of the programmable receiver filter 112, an additional switchable reactive element may be placed in parallel with the first series one-port resonator 114 to permit the controller 22 to configure the edge of the pass band of the programmable receiver 112 and the edge of the pass band of the programmable transmitter 92 proximate to the transition band based on the channel pair selection.

However, as will be discussed relative to FIG. 13B, some alternative embodiments of the programmable receiver filter 112 may further include an additional switchable reactive element, not depicted in FIG. 10, in parallel with or across the first one-port resonator 114 to permit the controller 22 to also shift the upper edge of the pass band of the programmable receiver filter 112 up or down. In those embodiments of the programmable duplexer 10B that may be configured to swap locations of the pass bands of the programmable transmitter filter 92 and the programmable receiver filter 112, additional switchable reactive elements may be placed in series with the first shunt one-port resonator 122, the second shunt one-port resonator 124, and the third shunt one-port resonator 126 and in parallel with the first one-port resonator 114 to permit the controller 22 to shift the entire pass band of the alternative embodiment of the programmable receiver filter 112 and the programmable transmitter filter 92. Depending upon the relative locations of the pass band of the programmable transmitter filter 92 and the pass band of the programmable receiver filter 112, the controller 22 may be further configured to control the edge of the pass band of the programmable transmitter filter 92 and the edge of the pass band of the programmable receiver filter 112 that impact the transition band between the programmable transmitter filter 92 and the programmable receiver filter 112. As an example, for the case where the programmable duplexer 10B may be configured such that the pass band of the programmable transmitter filter 92 is located above the pass band of the programmable receiver filter 112, the controller 22 may be further configured to move the upper edge of the pass band of the programmable receiver filter 112 in response to a channel pair selection. Similarly, the controller 22 may be further configured to move the lower edge of the pass band of the programmable transmitter filter in response to the channel pair selection.

As an alternative, for the case where the programmable duplexer 10B may be configured such that the pass band of the programmable transmitter filter 92 is located below the pass band of the programmable receiver filter 112, the controller 22 may be further configured to move the lower edge of the pass band of the programmable receiver filter 112 in response to a channel pair selection. Similarly, the controller 22 may be further configured to move the upper edge of the pass band of the programmable transmitter filter 92 in response to the channel pair selection.

Another alternative embodiment of the duplexer 10 depicted in FIG. 1, FIG. 11 depicts a programmable duplexer 10C that includes a programmable transmitter filter 92A and a programmable receiver filter 112A. The programmable duplexer 10C depicted in FIG. 11 is similar in form to the programmable duplexer 10B depicted in FIG. 10. However, in some embodiments of the programmable duplexer 10C, the third switchable reactive element 110, the first shunt one-port resonator 122, and the second shunt one-port resonator 124 of the programmable duplexer 10B depicted in FIG. 10 may be eliminated to form a simpler system. As an example, FIG. 11 depicts a programmable duplexer 10C that includes a programmable transmitter filter 92A without the third switchable reactive element 110. In addition, the programmable duplexer 10C includes the programmable receiver filter 112A without either the first shunt one-port resonator 122 or the second shunt one-port resonator 124. Similar to the programmable duplexer 10B depicted in FIG. 10, the controller 22, which is not depicted for by way of convenience and not by way of limitation, may configure the first switchable reactive element 96, the second switchable reactive element 100, and the fourth switchable reactive element 128 of the programmable duplexer 10C to shift the pass band or at least one edge of the pass band of the programmable transmitter filter 92A and the programmable receiver filter 112A.

As an example, the controller 22, which is not depicted in FIG. 11 for the sake of convenience for the sake of convenience and not by way of limitation, may be configured to enable the first switchable reactive element 96 and the second switchable reactive element 100 to move the upper edge of the pass band of the programmable transmitter filter 92A lower in frequency to accommodate a channel pair selection. Alternatively, the controller 22, which is not depicted for the sake of convenience and not by way of limitation, may disable the first switchable reactive element 96 and the second switchable reactive element 100 to move the upper edge of the pass band of the programmable transmitter filter 92A higher in frequency by removing the additional capacitance in the first switchable reactive element 96 and the second switchable reactive element 100 from being in parallel with the first series one-port resonator 94 and the second series one-port resonator 98, respectively. The controller 22, not depicted for the sake of convenience and not by way of limitation, may also enable and disable the fourth switchable reactive element 128 to decrease and increase the frequency location of the lower edge of the pass band of the programmable receiver filter 112A. In other words, the controller 22, which is not depicted for the sake of convenience and not by way of limitation, may enable the fourth switchable reactive element 128 to effectively couple the third shunt one-port resonator 126 to ground. This has the effect of placing an infinite capacitance in series with the third shunt one-port resonator 126, which decreases the frequency at which the lower edge of the pass band of the programmable receiver filter 112A is located. Accordingly, as depicted in FIG. 11, the programmable duplexer 10C may be configured such that the pass band of the programmable receiver filter 112A is located in a frequency band above the frequency band in which the programmable transmitter filter 92A filter is located.

Figure 12:
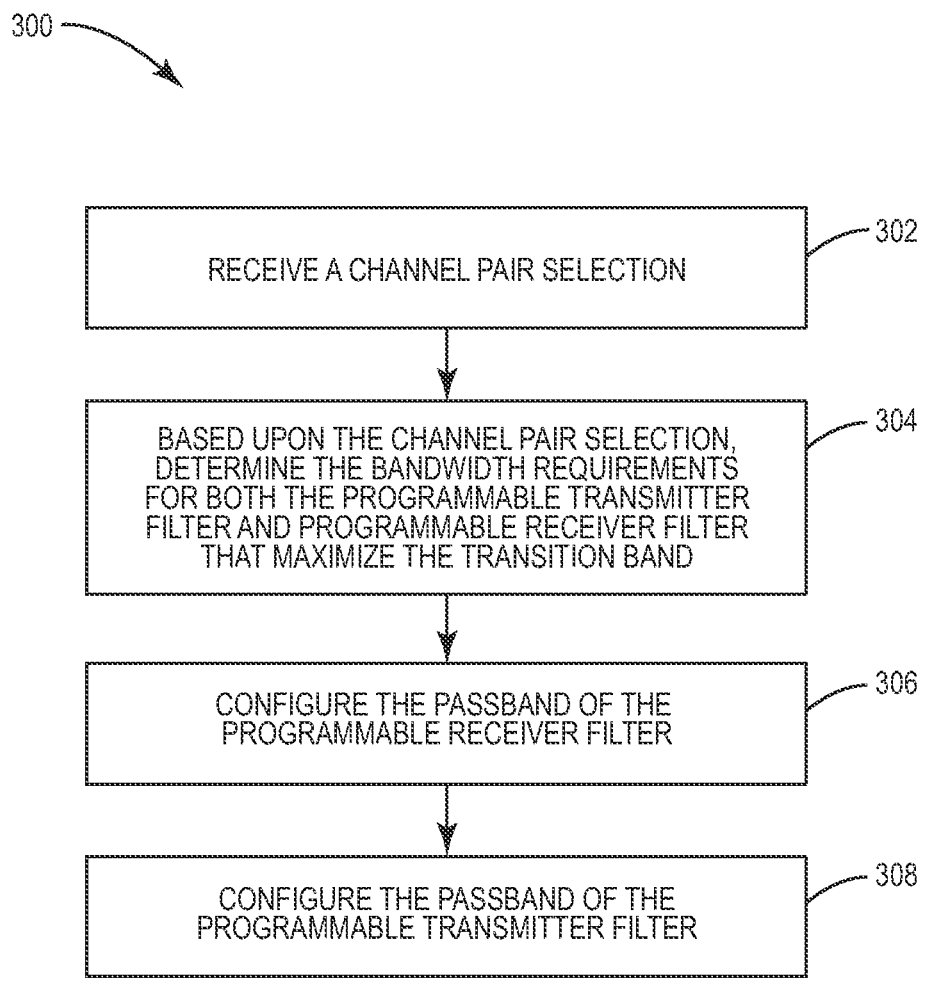
FIG. 12 depicts an operation for controlling the pass band of the programmable receiver filter and programmable transmitter filter.

FIG. 12 depicts an operation 300 for controlling the pass band of the programmable receiver filter and programmable transmitter filter. As discussed before, the controller 22 may be configured to identify a channel pair selection provided for communication between the communication device and a base station. Based upon the identified channel pair selection, the controller 22 may be further configured to adjust at least one of the pass band edges of the programmable transmitter pass band, the edge of the programmable receiver pass band, and a combination thereof based upon the identified channel pair selection.

An example operation 300 of the embodiments of duplexer 10 depicted in FIG. 1 will now be described with continuing reference to the programmable duplexer 10C depicted in FIG. 11. As an example operation 300, depicted in FIG. 12, the controller 22 may receive a channel pair selection, (Step 302). Based at least upon the channel pair selection, the controller 22 determines the bandwidth requirements for both the programmable transmitter filter 92A and the programmable receiver filter 112A that maximize the transition band, (Step 304).

Thereafter, referring to FIG. 11, based on the bandwidth requirements of at least one of the programmable transmitter filter 92A and the programmable receiver filter 112A, the controller 22 may configure the switchable reactive elements of the programmable receiver filter to provide the appropriate pass band by adjusting at least one edge of the programmable receiver pass band, (Step 306). The controller 22 may also further configure the switchable reactive elements of the programmable transmitter filter 92A to provide the appropriate pass band by adjusting at least one edge of the programmable transmitter pass band, (Step 308). However, in some alternative embodiments, the controller 22 may determine to adjust only one or both of the edges of only one of the programmable receiver filter 112A and the programmable transmitter filter 92B based on the channel pair selection. In still other embodiments, the controller 22 may determine to adjust the edge of the pass band of the programmable receiver filter 112A and the edge of the pass band of the programmable transmitter 92A that are proximate to the transition band of the programmable duplexer 10C of FIG. 11. In some embodiments, described below, the location of the pass band of the programmable transmitter filter 92A and the pass band of the programmable receiver filter 112A may be swapped depending upon the communications network into which a communication device is deployed or a band of operation to which a communication device is assigned to operate within the communication network. Accordingly, in some embodiments of the operation 300, the controller 22 may be further configured to configure the pass band of the programmable transmitter filter 92A relative to pass band of the programmable receiver filter 112A based on the communications network into which a communication device is deployed or a band of operation to which a communication device is assigned to operate within the communication network.

Although the operation 300 has been described relative to the programmable duplexer 10C of FIG. 11, this is by way of convenience and not by way of limitation. Accordingly, the various features and functions described with respect to each of the embodiments of the duplexer 10 of FIG. 1 may be applied to the various embodiments of the duplexer 10 as described herein.

An exemplary embodiment of a duplexer for a communication device includes a receiver path. The receiver path may include a programmable receiver filter that provides a programmable receiver pass band. In addition, the duplexer includes a transmitter path including a programmable transmitter filter that provides a programmable transmitter pass band. The programmable transmitter filter may be separated from the programmable receiver filter by a transition band, where the programmable receiver pass band has an edge adjacent to the transition band, and the programmable transmitter pass band has an edge adjacent to the transition band. A controller may be configured to identify a channel pair selection provided for communication between the communication device and a base station. Thereafter, the controller may adjust at least one of the edges of the programmable transmitter pass band, the edge of the programmable receiver pass band, and a combination thereof depending upon the channel pair selection.

Another exemplary embodiment of a programmable duplexer of a communication device may include a receiver filter having a receiver input and a receiver output, the receiver filter having a programmable receiver pass band. The exemplary embodiment may further include a transmitter filter including a transmitter input and a transmitter output, where the transmitter output is coupled to the receiver input, and wherein the transmitter filter has a programmable transmitter pass band. A controller may be coupled to the receiver filter and the transmitter filter. The controller may be adapted to identify a receiver-transmitter channel pair provided for communication between a mobile terminal and a base station. The controller may be further adapted to control at least one of the programmable receiver pass band, the programmable transmitter pass band, and a combination thereof, to maintain at least a minimum transition band between the programmable receiver pass band and the programmable transmitter pass band based upon the receiver-transmitter channel pair.

Another exemplary embodiment of a programmable duplexer includes a receiver filter. The receiver filter includes a radio frequency receiver input and a radio frequency receiver output. The receiver filter further includes a receiver pass band having a programmable receiver pass band edge. The exemplary duplexer further includes a transmitter filter. The transmitter filter includes a radio frequency transmitter input and a radio frequency transmitter output. The radio frequency transmitter output may be coupled to the radio frequency receiver input. The transmitter filter may further include a transmitter pass band having a programmable transmitter pass band edge. The duplexer may also include a controller coupled to the receiver filter and the transmitter filter. The controller may modify at least one of the programmable receiver pass band edge and the programmable transmitter pass band edge based upon selection of a channel pair of a transmit frequency band and a receiver frequency band.

Figure 13A:
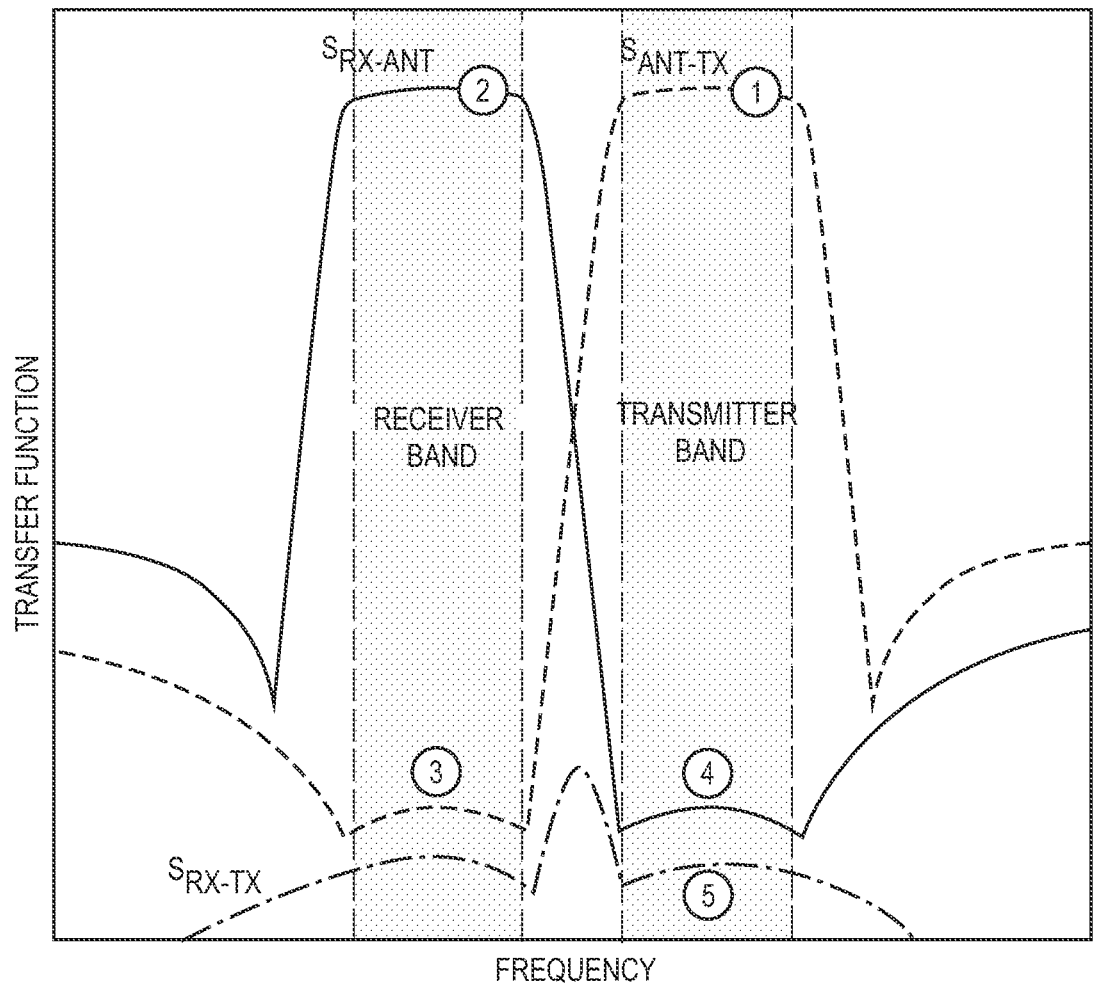
FIG. 13A depicts an example of an alternative duplexer transfer function, where the transmission band is higher in frequency than the receiver band.

FIG. 13A depicts an alternative arrangement of the transmitter pass band and receiver pass band. In contrast to the depiction of the transmitter pass band and receiver pass band of FIG. 3, FIG. 13A depicts that the receiver pass band is located in a frequency band below the transmitter band.

Accordingly, to control the transmission band of a duplexer that has these characteristics, the switchable reactive components must be configured to control at least the upper edge of the programmable receiver pass bass band edge and the lower edge of the programmable transmitter pass band edge. Similar to the transfer function of the duplexer depicted in FIG. 3, the alternative transfer function depicted in FIG. 13A depicts the relative positions of the transmission band and the receiver band as well as the transition band between the transmission band and the receiver band. Unlike FIG. 3, FIG. 13A depicts a communication network wherein the receiver band is located in a frequency band below the transmission band. In other words, the receiver channel is centered at a lower frequency or below the transmitter channel. The frequency of the upper edge of the receiver band and the transmitter band are each determined by the anti-resonant frequencies, $f_A$, of the series resonators in the respective receiver filter and transmitter filter of the duplexer. There are five basic characteristics of the duplexer depicted in FIG. 13A. One characteristic of the duplexer is that there is (1) a low transmitter to antenna (TX-ANT) attenuation in the transmitter band. Another characteristic of the duplexer depicted in FIG. 13A is that there is (2) a low antenna to receiver (ANT-RX) attenuation in the receiver band. Still another characteristic of the duplexer depicted in FIG. 13A is that there is (3) a high transmitter to antenna (TX-ANT) attenuation in the receiver band and (4) a high antenna to receiver (ANT-RX) attenuation in the transmitter band. Furthermore, the duplexer depicted in FIG. 13A includes (5) a high transmitter-receiver isolation between the receiver band and the transmitter band. As a result, the programmable pass band edge of the receiver band of the duplexer depicted in FIG. 13A is on the upper pass band edge of the receiver band, which may be determined primarily by the anti-resonant frequencies of the series resonators of a ladder filter, as depicted in FIG. 6. The programmable pass band edge of the transmitter band of the duplexer depicted in FIG. 13A is on the lower pass band edge of the transmitter band, which may be determined primarily by the resonant frequencies of the shunt resonators in a ladder filter design, as depicted in FIG. 6.

Figure 13B:
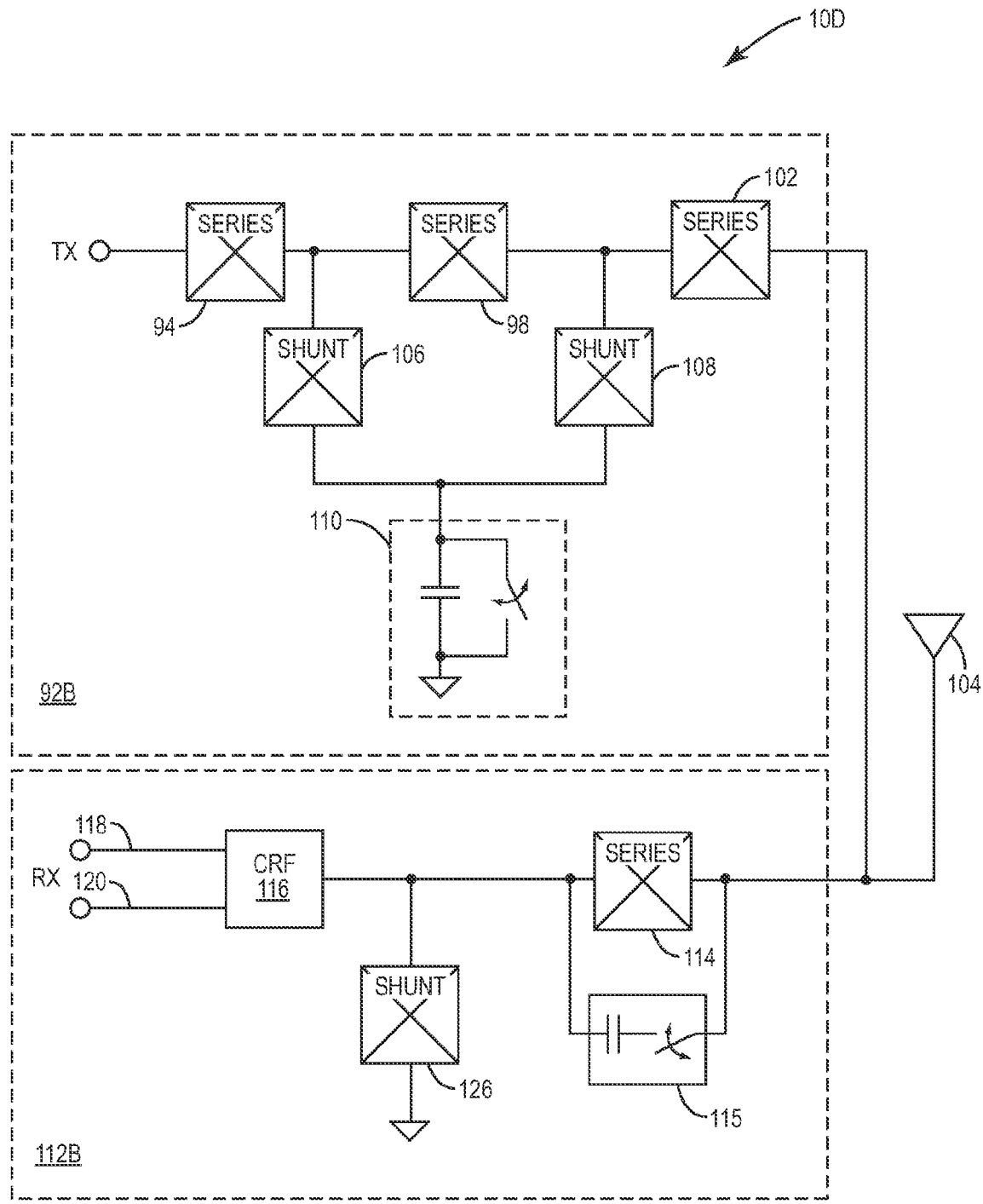
FIG. 13B depicts an example duplexer configured to operate where the transmission band is higher in frequency than the receive band.

As another non-limiting exemplary embodiment of duplexer 10 depicted in FIG. 1, FIG. 13B depicts an embodiment of a duplexer programmable duplexer 10D that includes a programmable transmitter filter 92B and a programmable receiver filter 112B. Unlike the programmable duplexer 10C depicted in FIG. 11, the programmable duplexer 10D depicted in FIG. 13B may be configured to operate in a system where the pass band of the transmitter filter is located in a frequency band that is above the frequency band in which the pass band of the receiver filter is located, as depicted in FIG. 13A.

As an example, unlike the programmable transmitter filter 92A, depicted in FIG. 11, FIG. 13B depicts that the programmable transmitter filter 92B that may be configured as a ladder filter similar to the programmable transmitter filter 92 of the programmable duplexer 10B, depicted in FIG. 10. However, unlike the programmable transmitter filter 92 of the programmable duplexer 10B depicted in FIG. 11, the programmable duplexer 10D depicted in FIG. 13B may eliminate the first switchable reactive element 96 and the second switchable reactive element 100. In addition, the programmable transmitter filter 92B includes the third switchable reactive element 110 located in series between the first shunt one-port resonator 106 and the second shunt one-port resonator 108 and ground. As a result, although not depicted in FIG. 13B for the sake of convenience and not by way of limitation, the controller 22 may configure the third switchable reactive element 110 to increase and decrease the frequency at which the lower edge of the pass band of the programmable transmitter filter 92B is located.

The programmable receiver filter 112B is similar to the programmable receiver filter 112A, depicted in FIG. 11; however, unlike the programmable receiver filter 112A, the programmable receiver filter 112B includes a fifth switchable element 115 in parallel with the first series one-port resonator. In addition, the programmable receiver filter 112B does not include the fourth switchable reactive element 128 of FIG. 11. As a result, operationally, the programmable receiver filter 112B is configured such that the controller 22, which is not depicted for the sake of limitation and not by way of limitation, may increase and decrease the frequency at which the upper edge of pass band of the programmable receiver filter 112B is located. Accordingly, the programmable duplexer 10D depicted in FIG. 13B may be a programmable duplexer where the frequency band in which the pass band of the programmable transmitter filter 92B is located is above the frequency band in which the pass band of the programmable receiver filter 112B is located. In addition, based on the channel pair selection, the controller 22 (not depicted for the sake of limitation and not by way of limitation) may control the frequency location of the upper edge of the pass band of the programmable receiver filter 112B and the frequency location of the lower edge of the pass band of the programmable transmitter filter 92B based on the channel pair selection to maintain a sufficiently large transition band.

Figure 14:
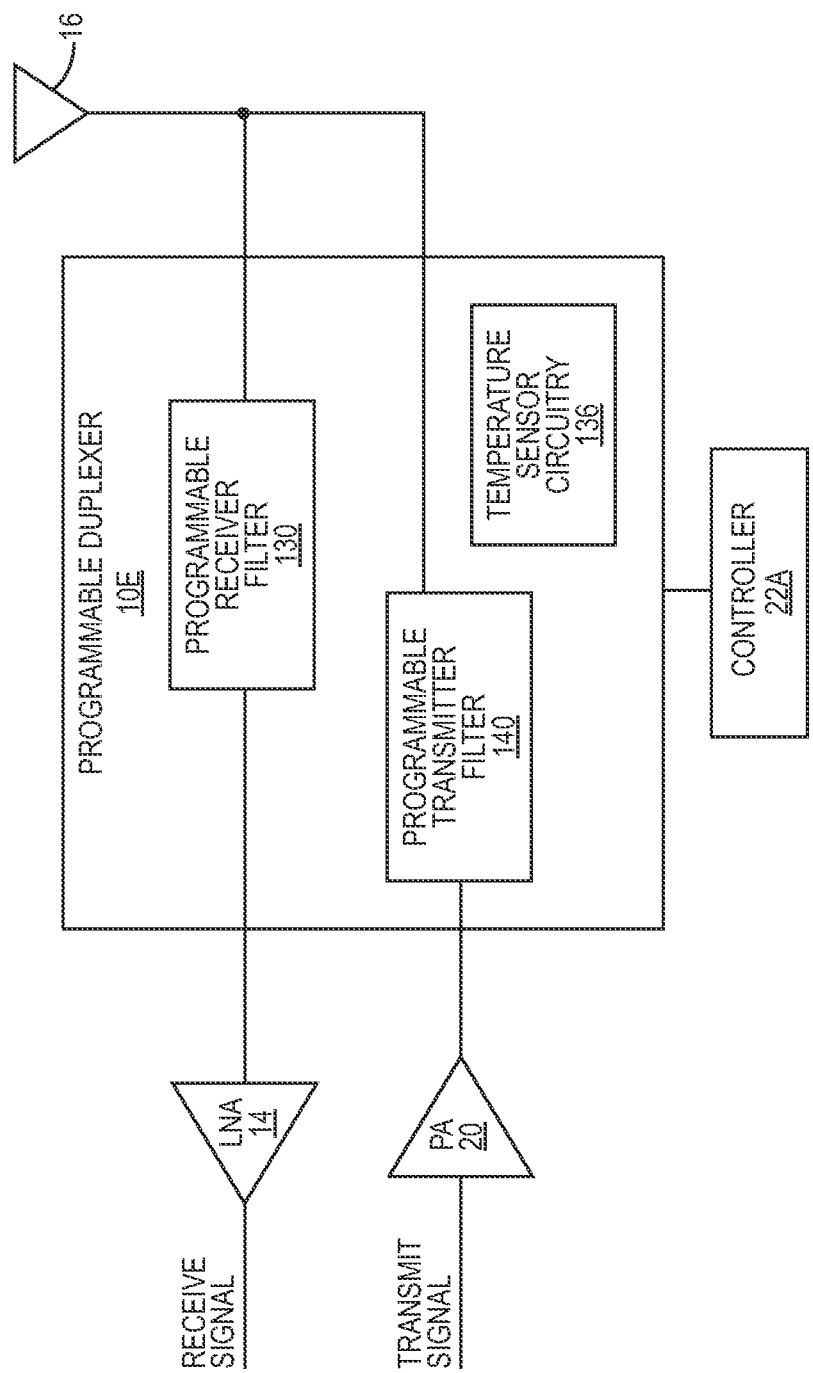
FIG. 14 depicts an example duplexer having an example programmable transmitter filter and an example programmable receiver filter with active temperature compensation.

As yet another embodiment of the duplexer 10 depicted in FIG. 1, FIG. 14 depicts a programmable duplexer 10E that includes active temperature compensation. The programmable duplexer 10E may include a programmable receiver filter 130 and a programmable transmitter filter 140. The programmable receiver filter 130 may be coupled to a low noise amplifier 14 and the antenna 16. The programmable transmitter filter 140 may be coupled to an output of a power amplifier 20 and an antenna 16. A controller 22A may be coupled to the programmable receiver filter 130 and the programmable transmitter filter 140. The programmable receiver filter 130 may also include a programmable pass band having a programmable receiver pass band edge. The programmable transmitter filter 140 may include a programmable pass band having a programmable transmitter pass band edge. The pass band of the programmable receiver filter 130 may be separated from the pass band of the programmable transmitter filter 140 by a transition band. In some embodiments, the programmable duplexer 10E may be configured such that the pass band of the programmable receiver filter 130 is located in a frequency band that is higher than the frequency band in which the pass band of the programmable transmitter filter 140 is located. Alternatively, in other embodiments, the programmable duplexer 10E may be configured such that the pass band of the programmable receiver filter 130 is located in a frequency band that is higher than the frequency band in which the pass band of the programmable transmitter filter 140 is located.

In still other embodiments, the programmable duplexer 10E may be configured such that the location of the frequency band in which the pass band of the programmable receiver filter 130 and the location of the frequency band in which the pass band of the programmable transmitter filter 140 are configurable with respect to their location in frequency relative to one another. In other words, the controller 22A may configure the relative locations of the frequency bands in which the pass bands of the programmable receiver filter 130 and the programmable transmitter filter 140 are located such that that pass band of the programmable transmitter filter 140 may be located above or below the pass band of the programmable receiver filter 130.

For example, in some embodiments, programmable duplexer 10E may include configurable series one-port resonator elements, configurable shunt one-port resonators elements, and configurable coupled resonator filter. As an example, a configurable series one-port resonator element may include or be equivalent to a pair of series one-port resonators placed in parallel where the controller 22A may select which of the series one-port resonators are to be used in the circuit in order to shift the location of the pass band of the programmable receiver filter 130 relative to the location of the pass band of the programmable transmitter filter 140, shift the location of the pass band of the programmable transmitter filter 140 relative to the location of the pass band of the programmable receiver filter 130, or shift both the pass band of the programmable receiver filter 130 and the pass band of the programmable transmitter filter 140 relative to each other.

For example, in some embodiments, the configurable series one-port resonator element may include a first series one-port resonator having a first node and a second node, a second series one-port resonator having a first node and a second node, a first switch having a first node, a second node, and a control node, and a second switch having a first node, a second node, and a control node. A first common node of the configurable series one-port resonator element may be formed by coupling the second node of the first switch to the second node of the first switch, where the first node of the first series one-port resonator to a first node of a first switch, coupling the first node of the second series one-port resonator to a first port of the second switch. In some embodiments, a second common node of the configurable series one-port resonator element may be formed by coupling the second node of the first one-port resonator to the second node of the second one-port resonator. The controller 22A may select to use the first one-port resonator of the configurable series one-port element by asserting the control node of the first switch to close the first switch while de-asserting the control node of the second switch to open the second switch. Alternatively, controller 22A may select to use the second one-port resonator of the configurable series one-port element by asserting the control node of the second switch to close the second switch while de-asserting the control node of the first switch to open the first switch. In some embodiments, the control node of the first switch is coupled via an inverter to the control node of the second switch to permit the controller 22A to toggle between selection of the first series one-port resonator and the second one-port resonator. Some embodiments of the configurable series one-port element may further include a third switch having a first node, a second node, and a control node and a fourth switch having a first node, a second node, and a control node. In this case, the second common node of the configurable series one-port resonator element may be formed by coupling the second node of the first node of the third switch to the first node of the forth switch, where the second node of the third switch is coupled to the second node of the first series one-port resonator and the second node of the fourth switch is coupled to the second node of the second series one-port resonator. The control node of the third switch is coupled to the control node of the first switch and the control node of the fourth switch is coupled to the control node of the second switch.

As another example, a configurable shunt one-port resonator element may include or be equivalent to a pair of series one-port resonators placed in parallel where the controller 22A may select which of the series one-port resonators are to be used in the circuit in order to shift the location of the pass band of the programmable receiver filter 130 relative to the location of the pass band of the programmable transmitter filter 140, shift the location of the pass band of the programmable transmitter filter 140 relative to the location of the pass band of the programmable receiver filter 130, or shift both the pass band of the programmable receiver filter 130 and the pass band of the programmable transmitter filter 140 relative to each other. As still another example, a configurable series one-port resonator element may include or be equivalent to a pair of series one-port resonators placed in parallel where the controller 22A may select which of the series one-port resonators are to be used in the circuit in order to shift the location of the pass band of the programmable receiver filter 130 relative to the location of the pass band of the programmable transmitter filter 140, shift the location of the pass band of the programmable transmitter filter 140 relative to the location of the pass band of the programmable receiver filter 130, or shift both the pass band of the programmable receiver filter 130 and the pass band of the programmable transmitter filter 140 relative to each other.

For example, in some embodiments, the configurable shunt one-port resonator element may include a first shunt one-port resonator having a first node and a second node, a second shunt one-port resonator having a first node and a second node, a first switch having a first node, a second node, and a control node, and a second switch having a first node, a second node, and a control node. A first common node of the configurable shunt one-port resonator element may be formed by coupling the second node of the first switch to the second node of the first switch, where the first node of the first shunt one-port resonator to a first node of a first switch, coupling the first node of the second shunt one-port resonator to a first port of the second switch. In some embodiments, a second common node of the configurable shunt one-port resonator element may be formed by coupling the second node of the first one-port resonator to the second node of the second one-port resonator. The controller 22A may select to use the first one-port resonator of the configurable shunt one-port element by asserting the control node of the first switch to close the first switch while de-asserting the control node of the second switch to open the second switch. Alternatively, controller 22A may select to use the second one-port resonator of the configurable shunt one-port element by asserting the control node of the second switch to close the second switch while de-asserting the control node of the first switch to open the first switch. In some embodiments, the control node of the first switch is coupled via an inverter to the control node of the second switch to permit the controller 22A to toggle between selection of the first shunt one-port resonator and the second one-port resonator. Some embodiments of the configurable shunt one-port element may further include a third switch having a first node, a second node, and a control node and a fourth switch having a first node, a second node, and a control node. In this case, the second common node of the configurable shunt one-port resonator element may be formed by coupling the second node of the first node of the third switch to the first node of the forth switch, where the second node of the third switch is coupled to the second node of the first shunt one-port resonator and the second node of the fourth switch is coupled to the second node of the second shunt one-port resonator. The control node of the third switch is coupled to the control node of the first switch and the control node of the fourth switch is coupled to the control node of the second switch.

In addition, a configurable coupled resonator filter element may include a pair of coupled resonator filters where each node of the each of the coupled resonator filters may be coupled via a switch into the circuit of the programmable duplexer 10E. For example the coupled resonator filter may include a single ended input and a balanced differential output having an inverted output and a non-inverted output. The configurable coupled resonator filter element may include a first coupled resonator filter, a second coupled resonator filter, a first switch having a first node, a second node, and a first control node, a second switch having a first node, a second node, and a second control node, a third switch having a first node, a second node, and a third control node, and a fourth switch having a first node, a second node, and a fourth control node. The first node of the first switch may be in communication with the inverted output of the first coupled resonator filter. The first node of the second switch may be in communication with the inverted output of the second coupled resonator filter. The second node of the first switch and the second node of the first switch may be in communication to form an inverted output of the configurable coupled resonator filter element. Similarly, the first node of the third switch may be in communication with the non-inverted output of the first coupled resonator filter. The first node of the fourth switch may be in communication with the non-inverted output of the second coupled resonator filter. The second node of the third switch and the second node of the fourth switch may be in communication to form a non-inverted output of the configurable coupled resonator filter element. The first control node and the third control node may be coupled to provide a first coupled resonator filter selection node. The second control node and the fourth control node may be coupled to provide a second coupled resonator filter selection node. Accordingly, the controller 22A may select to use the first coupled resonator filter by asserting the first coupled resonator filter selection node while de-asserting the second coupled resonator filter selection node. In some embodiments, the first coupled resonator filter selection node is coupled via an inverter to the second coupled resonator filter selection to provide a combined coupled resonator filter selection node. In this case, the controller 22A may select between using the first coupled resonator filter and the second coupled resonator filter by toggling the combined coupled resonator filter selection node. As described above, the single ended input of the first coupled resonator filter may be in communication with the single ended input of the second coupled resonator filter to form a combined single ended input for the configurable coupled resonator filter element. As an alternative embodiment, the configurable coupled resonator filter element may further include a fifth switch having a first node coupled to the single end input of the first coupled resonator filter, a second node, and a fifth control node in communication with the first control node and the third control node. The configurable coupled resonator filter element may further include a sixth switch having a first node coupled to the single end input of the second coupled resonator filter, a second node coupled to the second node of the fifth switch to form a combined single ended input of the configurable coupled resonator filter element, and a sixth control node in communication with the second control node and the fourth control node.

As an alternative embodiment, the configurable coupled resonator filter element may include a first coupled resonator filter, a second coupled resonator filter, a first switch and a second switch. The configurable coupled resonator filter element may include a common non-inverted output by coupling the non-inverted outputs of the first coupled resonator filter and the second coupled resonator filter. The configurable coupled resonator filter element may further form a common inverted output by coupling the inverted outputs of the first coupled resonator filter and the second coupled resonator filter. A common single ended input may be formed by coupling the second node of the first switch to the second node of the second switch, where the first node of the first switch is in communication with the single ended input of the first coupled resonator filter and the single ended input of the second coupled resonator filter is in communication with the single ended input of the first coupled resonator filter. Similar to before, the controller 22A may select to use the first coupled resonator filter by asserting a control node of the first switch to close the first switch while de-asserting a control node of the second switch to open the second switch. Alternatively, the controller 22A may select to use the second coupled resonator filter by asserting a control node of the second switch to close the second switch while de-asserting a control node of the second switch to open the first. In still other embodiments, the control node of the first switch may be in communication with the control node of the second switch to permit the controller 22 to toggle between using the first coupled resonator filter and the second coupled resonator filter.

For example, as depicted in FIG. 3, in a first configuration, the pass band of the programmable receiver filter 130 may be located above the pass band of the programmable transmitter filter. In this case, the controller 22A may be further configured to shift the edges of each of the programmable receiver filter 130 and the programmable transmitter filter 140 proximate to the transition band, in other words that delimit the transition band, based on a channel pair selection, a temperature of the programmable duplexer 10E, and/or a combination thereof. Alternatively, the controller 22A may be configured to shift only one of the edges of the programmable receiver filter 130 and the programmable transmitter filter 140 that delimit the transition band. In still other embodiments, the controller 22A may shift the pass band of at least one of the programmable receiver filter 130 and the programmable transmitter filter 140 to provide a sufficient transition band.

As another example, as depicted in FIG. 13A, in a second configuration, the pass band of the programmable receiver filter 130 may be located below the pass band of the programmable transmitter filter. In this case, the controller 22A may be further configured to shift the edges of each of the programmable receiver filter 130 and the programmable transmitter filter 140 proximate to the transition band, in other words that delimit the transition band, based on a channel pair selection, a temperature of the programmable duplexer 10E, and/or a combination thereof. Similar to before, the controller 22A may be further configured to shift the edges of each of the programmable receiver filter 130 and the programmable transmitter filter 140 proximate to the transition band, in other words that delimit the transition band, based on a channel pair selection, a temperature of the programmable duplexer 10E, and/or a combination thereof. Alternatively, the controller 22A may be configured to shift only one of the edges of the programmable receiver filter 130 and the programmable transmitter filter 140 that delimit the transition band. In still other embodiments, the controller 22A may shift the pass band of at least one of the programmable receiver filter 130 and the programmable transmitter filter 140 to provide a sufficient transition band.

In addition, the programmable duplexer 10E with active temperature compensation may further include temperature sensor circuitry 136 configured to provide one or more temperature indications. As an example embodiment, the programmable receiver filter 130 may receive one or more temperature indications. In response to receipt of the one or more temperature indications, the programmable receiver filter 130 may adjust the programmable receiver pass band edge based upon the one or more indications. Likewise, the programmable transmitter filter 140 may receive one or more temperature indications. In response to receipt of the one or more temperature indications, the programmable transmitter filter 140 may adjust the programmable transmitter pass band edge based upon the one or more temperature indications.

As another example embodiment, the controller 22A may receive one or more temperature indications from the temperature sensor circuitry 136 based upon temperature information associated with the programmable duplexer 10E. As an example, the temperature information may be gathered from temperature measuring devices co-located with the programmable receiver filter 130 and/or the programmable transmitter filter 140. Based upon the one or more temperature indication from the temperature sensor circuitry 136, the controller 22A may configure the pass band edges of the programmable receiver filter 130 and/or the programmable transmitter filter 140. In still another embodiment, the controller 22A may also base configuration of the programmable receiver filter 130 and the programmable transmitter filter 140 upon a combination of the indicated temperature and the channel pair selection. Furthermore, in some embodiments, the programmable duplexer 10E is a module having several components.

For example, the programmable duplexer 10E may include a substrate onto which the one-port resonators are built. Some of the one-port resonators may be associated with the programmable receiver filter 130. Other one-port resonators may be associated with the programmable transmitter filter 140. As an additional example, the programmable duplexer 10E may further include at least one integrated circuit having a plurality of switchable reactive circuits, the controller, and portions of the temperature sensor circuitry, where the switchable reactive elements are coupled to the plurality of one-port resonators on the substrate.

In general, as the temperature of the programmable duplexer 10E increases, the pass band of the programmable receiver filter 130 and the programmable transmitter filter 140 will shift higher in frequency. Likewise, as the temperature of the programmable duplexer 10E decreases, the pass band of the programmable receiver filter 130 and the programmable transmitter filter 140 will shift lower in frequency. To provide temperature compensation for the pass band of the programmable receiver filter 130 and the programmable transmitter filter 140, the controller 22A controls the one or more switchable reactive elements placed in series with the shunt one-port resonator elements and in parallel with the series one-port resonator elements of the programmable duplexer 10E to compensate for the change in temperature. As a non-limiting example, in some embodiments of the duplexer 10E where the pass band of the programmable receiver filter 130 is located in a frequency band that is lower than the frequency band in which the pass band of the transmitter 140 is located, as the temperature of the duplexer 10E increases, the controller 22A may be configured to decrease the capacitance in series with the shunt one-port resonator elements of the programmable transmitter filter 140 and the capacitance in parallel with the series one-port resonator elements of the programmable receiver filter 130 to cause the lower edge of the pass band of the programmable transmitter filter 140 and the upper edge of the pass band of the programmable receiver filter 130 to increase sufficiently to offset the effect of the temperature increase.

In some embodiments of the programmable duplexer 10E, as the temperature of the programmable duplexer 10E decreases, the controller 22A may be configured to increase the capacitance in parallel with the series one-port resonator elements in response to a decrease in the temperature of the programmable duplexer 10E such that the upper edge of the pass band of the programmable receiver filter 130 and the programmable transmitter filter 140 to decrease sufficiently to offset the effect of the temperature decrease. In some embodiments of the programmable duplexer 10E, where the pass band of the programmable receiver filter 130 is fixed relative to the pass band of the programmable transmitter filter 140, the controller 22A, the programmable receiver filter 130, and the programmable transmitter filter 140 may only temperature compensate the edge of the pass band of the programmable receiver filter 130, and the programmable transmitter filter 140 proximate to the transition band of the programmable duplexer 10E.

Thus, will be described, some embodiments of the programmable duplexer 10E may replace each of the series one-port resonator, the shunt one-port resonator, and the coupled resonator filter 116 with a configurable series one-port resonator element, a configurable shunt one-port resonator, and a configurable coupled resonator filter 116 to permit swapping of positions of the pass band of the programmable transmitter filter 140 and the pass band of the programmable receiver filter 130. However, other embodiments of the programmable duplexer 10E may not include the configurable series one-port resonator element, the configurable shunt one-port resonator, and the configurable coupled resonator filter 116.

Referring briefly back to FIG. 11, the programmable duplexer 10C may be configured such that the pass band of the programmable transmitter filter 92A is lower in frequency than the pass band of the programmable receiver filter 112A. A first switchable reactive element 96 may be placed in parallel with a first series one-port resonator 94 to control the upper edge of the programmable transmitter pass band. Similarly, a fourth switchable reactive element 128 may be placed in series with the third shunt one-port resonator 126 to control the lower edge of the programmable receiver pass band edge. Accordingly, to temperature compensate the upper edge of the pass band of the programmable transmitter filter 92A depicted in FIG. 11, the one or more switchable reactive elements that are controlled based on the temperature of the programmable duplexer 10C may be placed in parallel across the at least one of the first series one-port resonator 94, the second series one-port resonator 98, the third series one-port resonator 102, and/or some combination thereof. Alternatively, a temperature sensitive capacitor having a negative temperature coefficient may be placed in parallel across the at least one of the first series one-port resonator 94, the second series one-port resonator 98, the third series one-port resonator 102, and/or some combination thereof. Similarly, referring to the programmable receiver filter 112B depicted in FIG. 13B, a switchable reactive circuit that is controlled based on temperature may be placed in parallel with the first one-port resonator 114 to control the lower edge of the pass band of the programmable receiver filter 112B.

Alternatively, referring to the programmable duplexer 10D depicted in FIG. 13B, to temperature compensate the programmable transmitter filter 92B, where the pass band of the programmable transmitter filter 92B is higher in frequency than the pass band of the programmable receiver filter 112B, a switchable reactive element that is controlled based on temperature may be placed in series with at least one of the first shunt one-port resonator 106, the second shunt one-port resonator 108, and/or a combination thereof. Alternatively, a temperature sensitive capacitor having a negative temperature coefficient may be placed in series with the first shunt one-port resonator 106. Similarly, referring back to FIG. 11, to temperature compensate the programmable receiver filter 112A where the pass band of the programmable receiver filter 112A is in a frequency band that is higher than the pass band of the programmable transmitter filter 92A, a switchable reactive circuit that is temperature controlled may be placed in parallel with the third shunt one-port resonator 126 of the programmable receiver filter 112A to control the lower edge of the pass band of the programmable receiver filter 112A. Alternatively, a temperature sensitive capacitor having a negative temperature coefficient may be placed in series with the third shunt one-port resonator 126.

Accordingly, as will be discussed in greater detail below, one technique to generate a temperature indication may include using a band gap voltage source and one or more proportional to absolute zero voltage sources to generate one or more temperature indications, where each temperature indication is based upon a temperature threshold. Each temperature threshold may be based upon the temperature of the at least one integrated circuit.

Another technique may include using the resonant frequency of a one-port resonator as an indication of temperature. As the temperature of the one-port resonator increases, the resonant frequency of the resonator decreases. As a result, a temperature threshold may be based upon a selected frequency or frequencies at which to generate one or more temperature indications. In some embodiments, the temperature sensor circuitry may determine the resonant frequency of the one-port resonator to generate one or more temperature indications. In other embodiments the controller 22A may determine the resonator frequency Still another exemplary technique may include using a resistive thermal device to provide a temperature indication. An example resistive thermal device may include a thermistor or a metal trace, which has a resistance that varies with temperature. Thermistor may be mounted to the substrate onto which the one-port resonators are constructed. Alternatively, Thermistor may be part of the module that includes the programmable duplexer 10A. As an example, Thermistor may be mounted on a portion of a printed circuit board or ceramic circuit board of the module. The temperature sensor circuitry may be configured to provide a temperature indication of the one or more temperature indications to the controller based upon a resistance of the resistive thermal device. In some embodiments, Thermistor or metal trace may be fabricated onto or integrated into the substrate on which the one-port resonator devices are manufactured.

Yet another exemplary technique may include providing for a bimetallic device located in the module containing the programmable duplexer 10A. As an example, bimetallic traces may be placed upon the surface of the substrate on which the one-port resonators are formed. Alternatively, a bimetallic device may be placed upon a substrate or printed circuit board onto which the semiconductor portion is mounted.

As will be described, in some embodiments of the programmable duplexer 10E, the temperature sensor circuitry 136 may be configured to control the operation of the switchable reactive element to provide temperature compensation. In other embodiments of the programmable duplexer 10E, the controller 22A may be configured to control the operation of the switchable reactive element to provide temperature compensation. In still other embodiments of the programmable duplexer 10E, a combination of the controller 22 and the temperature sensor circuitry 136 may be configured to cooperatively provide temperature compensation for the programmable duplexer 10E. Furthermore, in various embodiments, the combination of the controller 22A and the temperature sensor circuitry may be configured to adjust the edges of the pass band or the pass band of the programmable receiver filter 130 and the programmable transmitter filter 140 based on both the channel pair selection and the temperature of the programmable duplexer 10E.

Figure 15A:
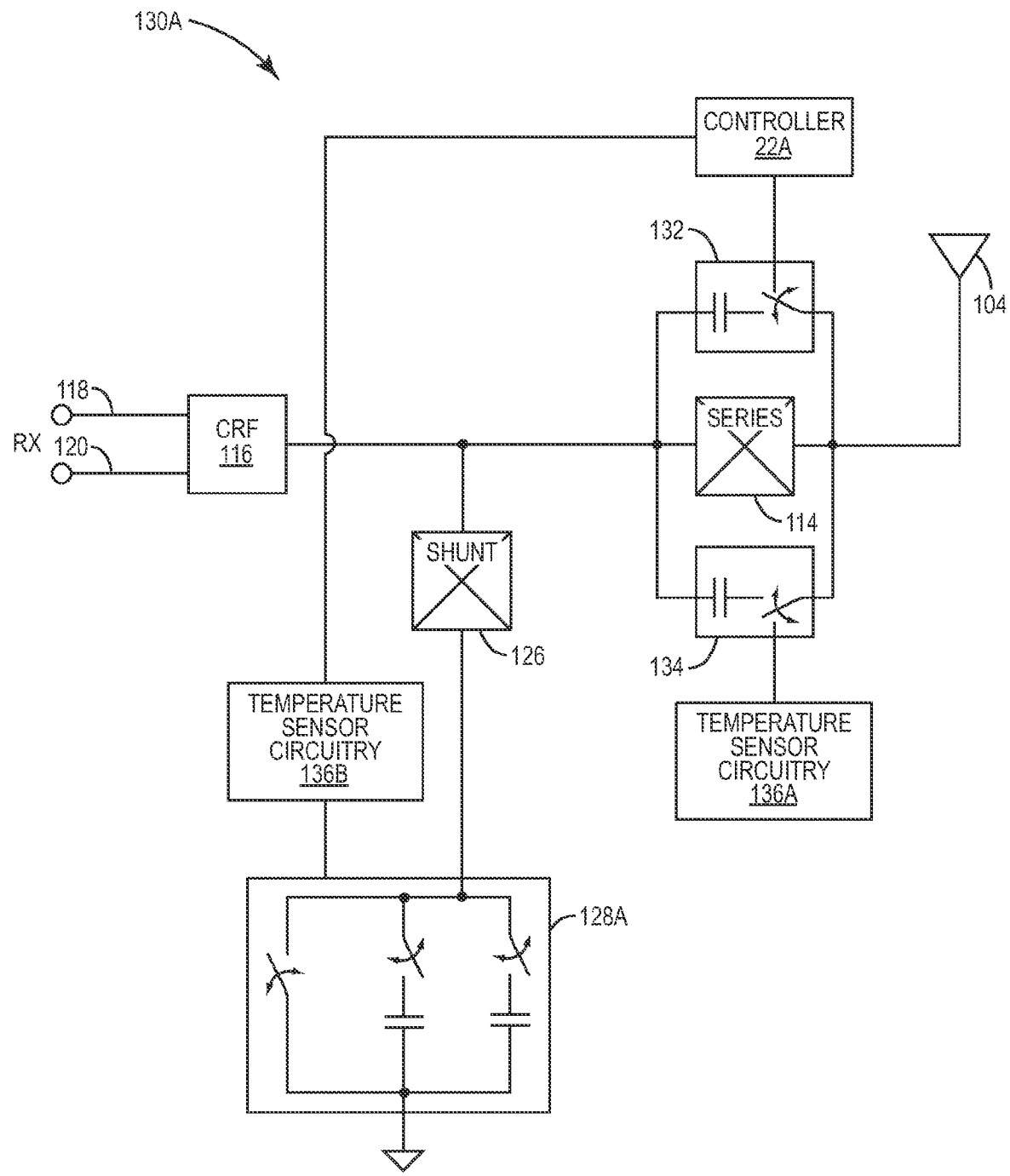
FIG. 15A depicts an example programmable receiver filter with active temperature compensation.

FIG. 15A depicts a programmable receiver filter 130A that includes active temperature compensation, which is similar to the programmable receiver filter 112 of FIG. 10 and the programmable receiver filter 130 of FIG. 14. Unlike the programmable receiver filter 112 of FIG. 10, the programmable receiver filter 130A with active temperature compensation further includes a first switchable reactive element 132 and a second switchable reactive element 134. In addition, the fourth switchable reactive element 128 of FIG. 10 is replaced with the fourth switchable reactive element 128A, which may be a capacitor array. The first switchable reactive element 132 is coupled in parallel with the first one-port resonator 114. The first switchable reactive element 132 is operably coupled to the controller 22A. Similar to the controller 22 of FIG. 7, controller 22A may be configured to govern the operation of the first switchable reactive element 132 to control the programmable receiver pass band edge of the programmable receiver filter 130A.

In contrast, as depicted in FIG. 15A, the second switchable reactive element 134 may be coupled to temperature sensor circuitry 136A configured to govern the operation of the first switchable reactive element 132 based upon a temperature of the programmable receiver filter 130A. The temperature of the programmable receiver filter 130A may be measured based on several different techniques.

In a first technique, the first temperature sensor circuitry 136A may be configured to measure a temperature associated with a substrate onto which one or more of the one-port resonators is built or the module of the module in which the one-port resonators are encapsulated. For example, the programmable receiver filter may include a substrate that includes the first one-port resonator 114, the third shunt one-port resonator 126, and the coupled resonator filter 116. The first temperature sensor circuitry 136A may be a standalone semiconductor device mounted on the substrate onto which one or more of the one-port resonators are built.

Alternatively, the first temperature sensor circuitry 136A may be part of the integrated circuit into which the controller 22A is incorporated. As yet another alternative, the first temperature sensor circuitry 136A may be incorporated into a module that includes the programmable receiver filter 130A with the active temperature compensation. The first temperature sensor circuitry 136A may be configured to directly control the second switchable reactive element 134. In some embodiments, the first temperature sensor circuitry 136A may be configured to close a switch element of the second switchable reactive element 134 when a temperature threshold is reached.

In other embodiments, the first temperature sensor circuitry 136A may be configured to open the switch of the second switchable reactive element 134 when a temperature threshold is reached. In contrast, the first switchable reactive element 132 may be controlled by the controller 22A. As an example, the controller 22A may configure the first switchable reactive element 132 based upon the bandwidth requirements of the programmable receiver filter 130A.

The programmable receiver pass band edge of the programmable receiver filter 130A may further include a fourth switchable reactive element 128A, which is similar to the fourth switchable reactive element 128 of FIG. 10, except the fourth switchable reactive element 128A may be a capacitor array. A second temperature sensor circuitry 136B may function similarly to the first temperature sensor circuitry 136A to control the various switches of the fourth switchable reactive element 128A. Alternatively, the second temperature sensor circuitry 136B may cooperatively operate with the controller 22A to control the states of the various switches of the fourth switchable reactive element 128A.

As an example, the second temperature sensor circuitry 136B may receive a desired switch state for the various switches of the fourth switchable reactive element 128A. The second temperature control circuitry 136B may be configured to control the states of the various switches of the fourth switchable reactive element 128A based on a combination of the desired programmable receiver pass band edge and measured temperature of the programmable receiver filter 130A.

As another example of an embodiment of the programmable receiver filter 130A, the second temperature sensor circuitry 136B may provide one or more temperature indications to the controller 22A. Based upon the one or more temperature indications, the controller 22A may be configured to selectively control the fourth switchable reactive element 128A. Alternatively, the controller may be configured to control the states of the various switches of the fourth switchable reactive element 128A based on a combination of the one or more temperature indications received from the second temperature sensor circuitry 136B and the channel pair selection, as described above with respect to the operations of the programmable receiver filter 112 of FIG. 10.

Figure 15B:
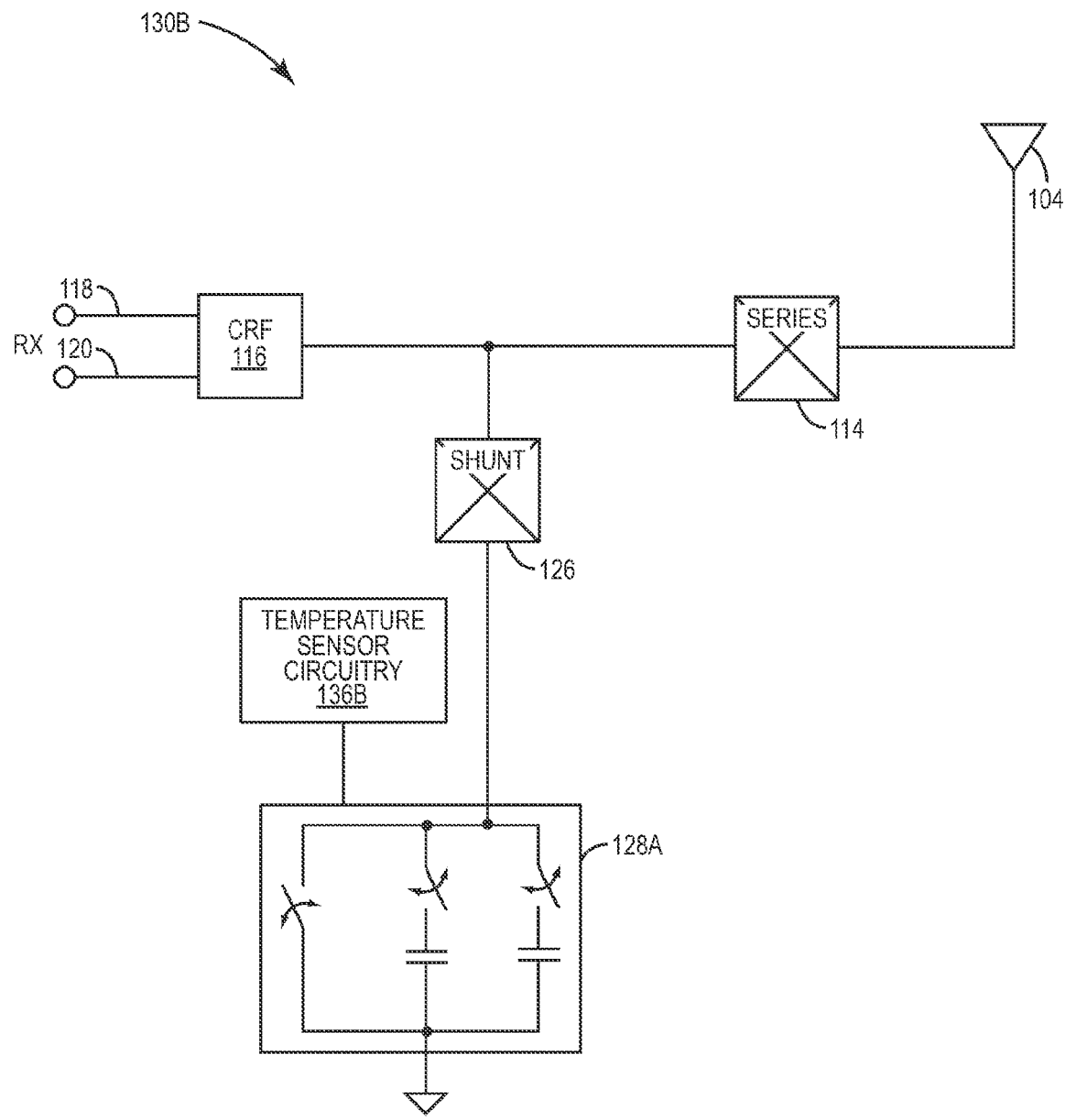
FIG. 15B depicts an embodiment of a programmable receiver filter with active temperature compensation for a system where the pass band of the programmable receiver filter is located above the pass band of the programmable transmitter filter.

FIG. 15B depicts an embodiment of a programmable receiver filter 130B with active temperature compensation for a system where the pass band of the programmable receiver filter is located above the pass band of the programmable transmitter filter. The programmable receiver filter 130B of FIG. 15B is similar to the programmable receiver filter 130A of FIG. 15A except the controller 22A, the first temperature sensor circuitry 136A, the first switchable reactive element 132, and a second switchable reactive element 134 are removed.

As an example of the operation of the programmable receiver filter 130B of FIG. 15B, as the temperature of the programmable receiver filter increases, the lower edge of the pass band of the programmable receiver filter 130B decreases in frequency. Thus, in order to compensate for increasing temperature, the second temperature sensor circuitry 136B may control the fourth switchable reactive element 128A to reduce the overall capacitance in series with the third shunt one-port resonator 126. As a result, as the overall capacitance in series with the third shunt one-port resonator 126 decreases, the lower edge of the pass band of the programmable receiver filter 130B increases in frequency to compensate for the temperature rise.

Figure 15C:
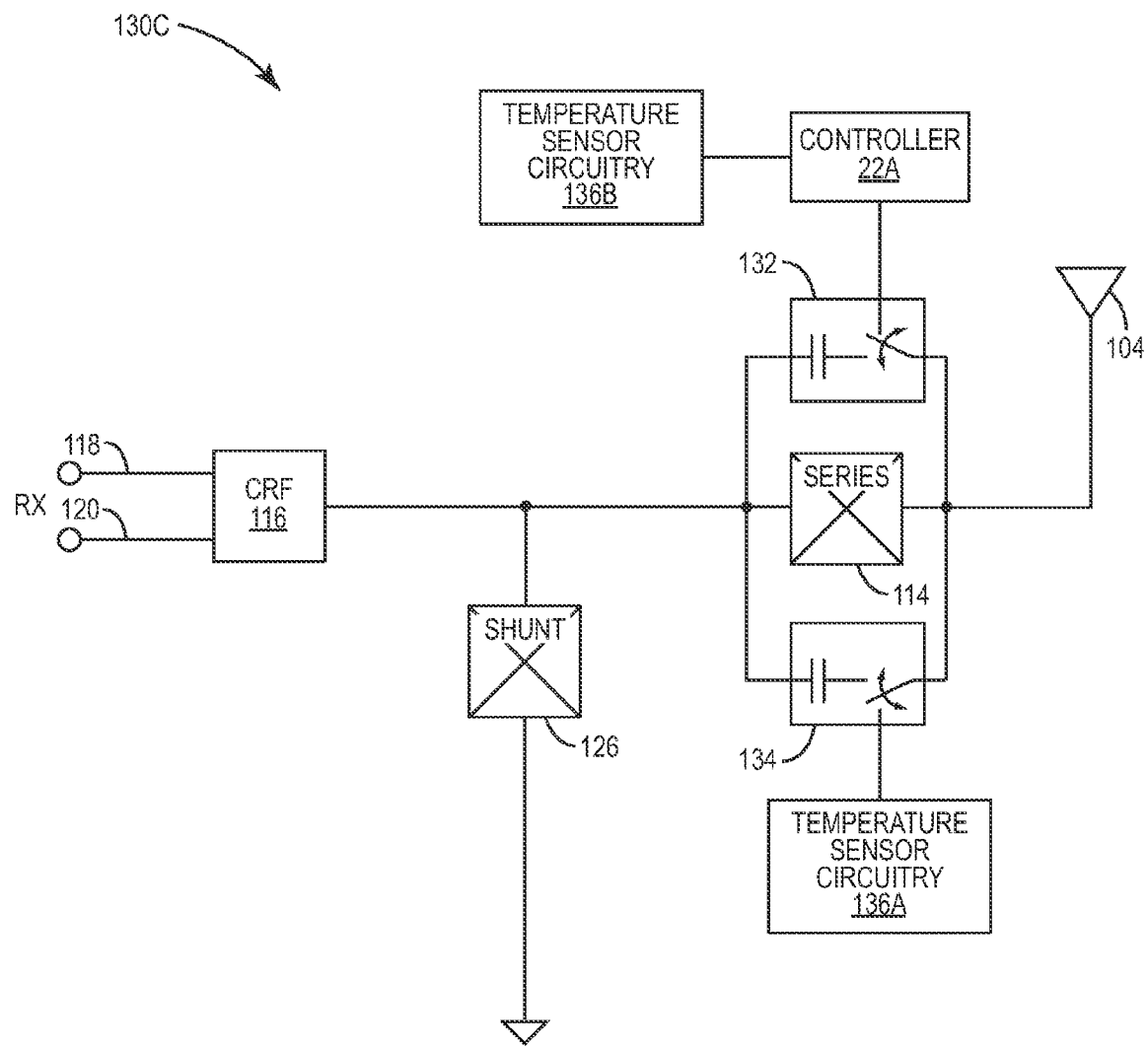
FIG. 15C depicts an embodiment of a programmable receiver filter with active temperature compensation for a system where the pass band of the programmable receiver filter is located below the pass band of the programmable transmitter filter.

FIG. 15C depicts an embodiment of a programmable receiver filter 130C with active temperature compensation for a system where the pass band of the programmable receiver filter is located below the pass band of the programmable transmitter filter. The programmable receiver filter 130C of FIG. 15C is similar to the programmable receiver filter 130A of FIG. 15A except that the fourth switchable reactive element 128 is removed.

As an example of the operation of the programmable receiver filter 130C of FIG. 15C, as the temperature of the programmable receiver filter increases, the upper edge of the pass band of the programmable receiver filter 130C decreases in frequency. Thus, in order to compensate for increasing temperature, the first temperature sensor circuitry 136A will control the second switchable reactive element 134 to reduce the overall capacitance in parallel with the first one-port resonator 114. As a result, the upper edge of the pass band of the programmable receiver filter 130C increases in frequency to compensate for the temperature rise.

Figure 15D:
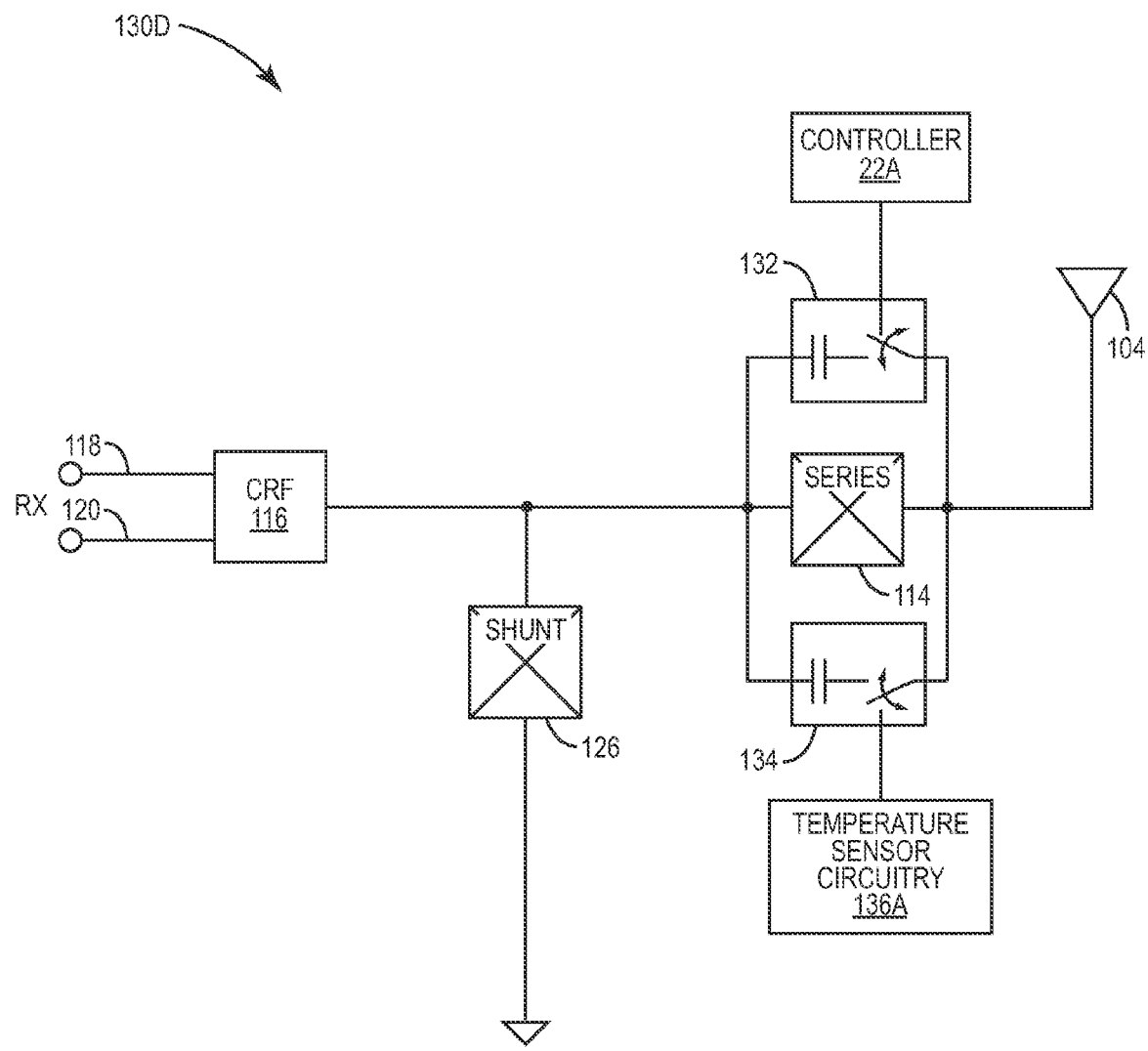
FIG. 15D depicts an embodiment of a programmable receiver filter with active temperature compensation for a system where the pass band of the programmable receiver filter is located below the pass band of the programmable transmitter filter.

As another exemplary embodiment of the programmable receiver filter 130 depicted in FIG. 14, FIG. 15D depicts a programmable receiver filter 130D that is similar to the programmable receiver filter 130C depicted in FIG. 15C except the second temperature sensor circuitry 136B is removed. Similar to the programmable receiver filter 130C depicted in FIG. 15C, the programmable receiver filter 130D depicted in FIG. 15D provides temperature compensation for the upper edge of the pass band of the programmable receiver filter. For example, as the temperature of the programmable receiver filter 130D changes, the first temperature sensor circuitry 136A may be configured to control the second switchable reactive element 134 to provide temperature compensation for the second switchable reactive element 134. In addition, the controller 22A is also configured to control the first switchable reactive element 132 based on the channel pair selection to maintain a minimum transition band. As depicted in FIG. 15D, the programmable receiver filter 130D may be configured such that the pass band of the programmable receiver filter 130D is located in a frequency band below a frequency band in which the programmable transmitter filter 140 is located.

Figure 15E:
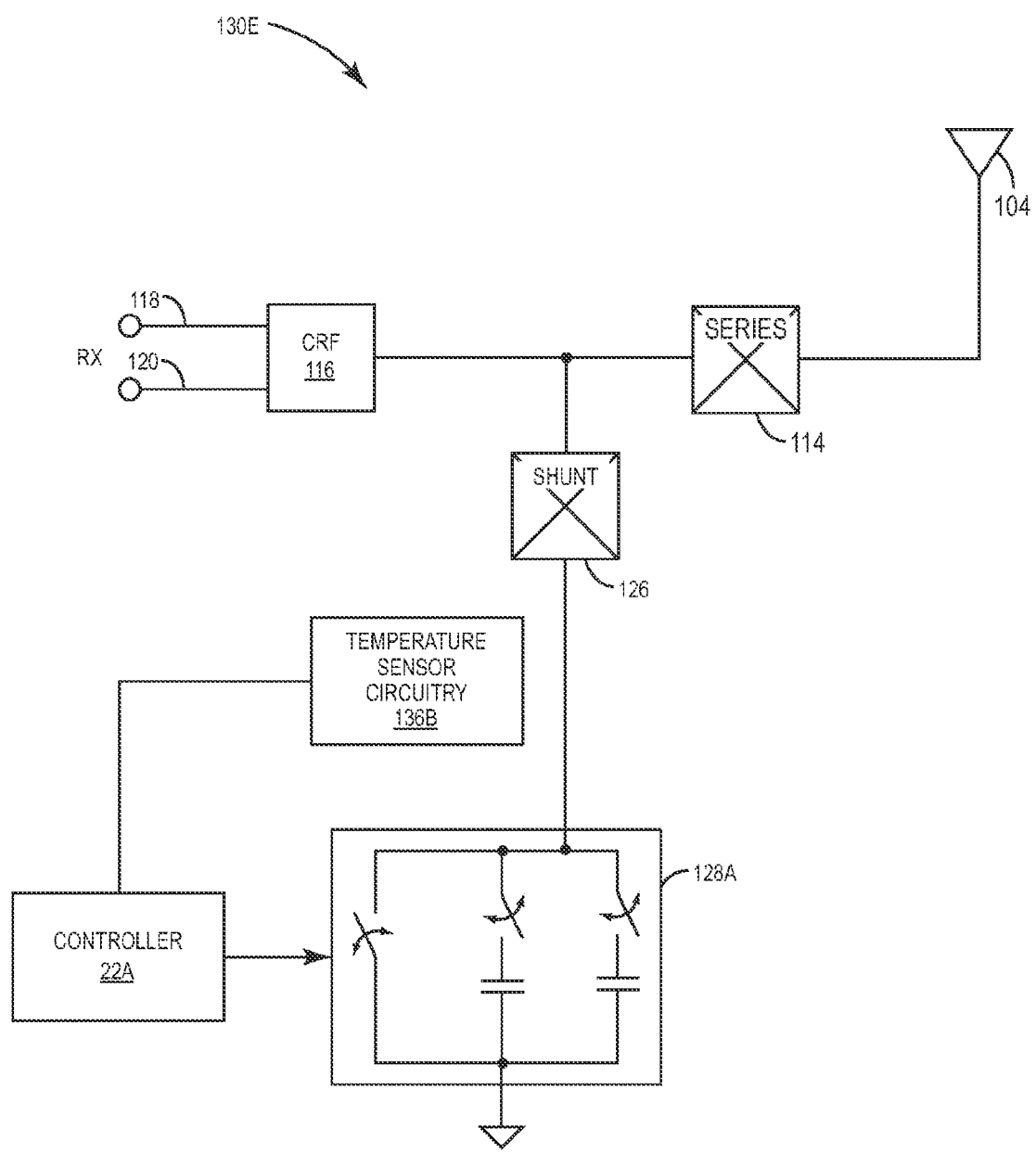
FIG. 15E depicts an embodiment of a programmable receiver filter with active temperature compensation for a system where the pass band of the programmable receiver filter is located above the pass band of the programmable transmitter filter.

As another exemplary embodiment of the programmable receiver filter 130 depicted in FIG. 14, FIG. 15E depicts a programmable receiver filter 130E that similar to the programmable receiver filter 130B depicted in FIG. 15B. However, unlike the programmable receiver filter 130B, the programmable receiver filter 130E may be configured such that the second temperature sensor circuitry 136B is in communication with the controller 22A. The controller 22A may be configured to control the fourth switchable reactive element 128A, which may be configured as a capacitor array. Based on the temperature measurement or indication provided by the second temperature sensor circuitry 136B, the controller 22A may configure the switches of the fourth switchable reactive element 128A to adjust for temperature drift in the third shunt one-port resonator 126. However, in some embodiments, the controller 22A may be further configured to enable and disable the fourth switchable reactive element 128A based on both the temperature measurement or indication provided by the second temperature sensor circuitry 136B and the channel pair selection.

Figure 16A:
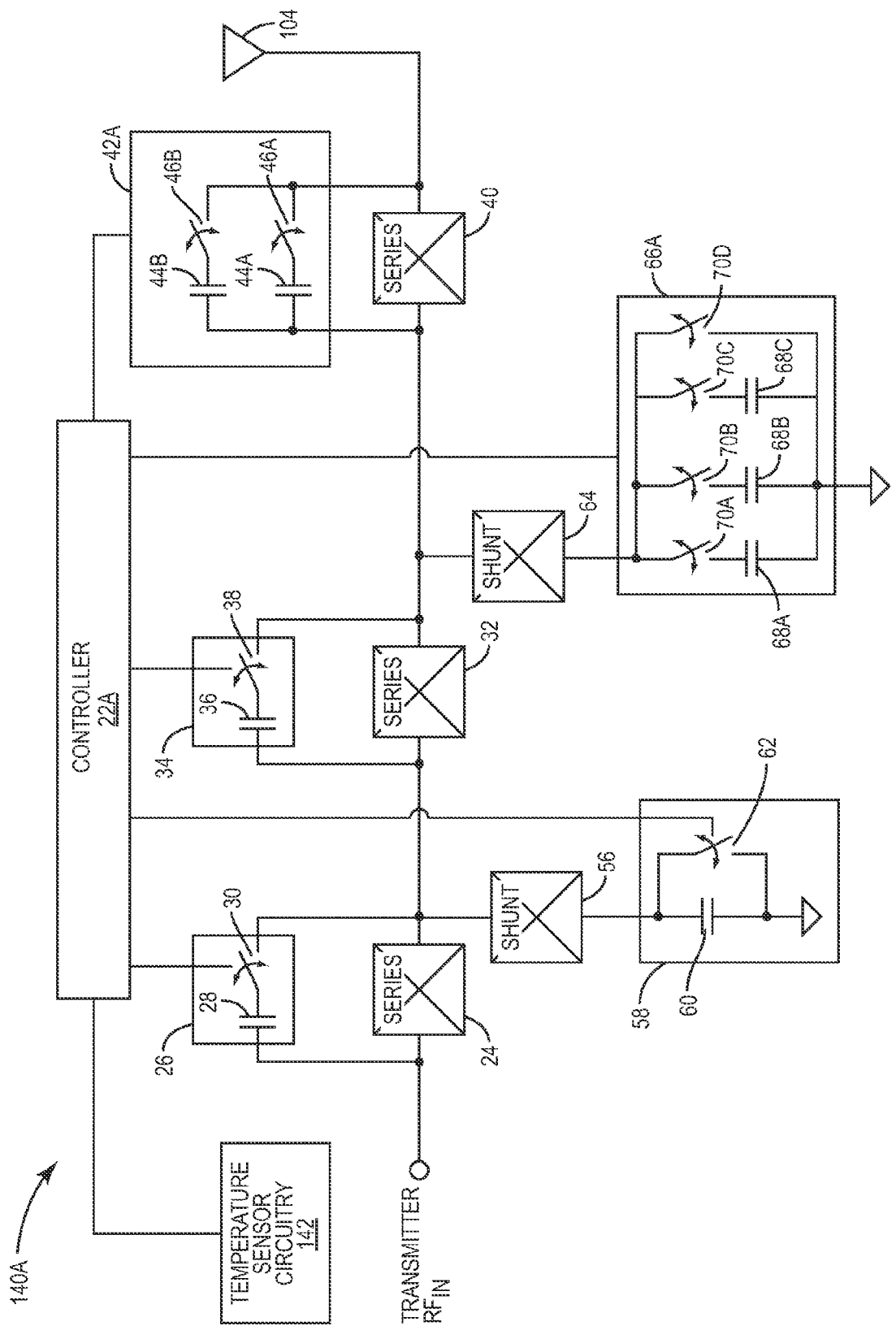
FIG. 16A depicts an embodiment of an example duplexer having an example programmable transmitter filter with active temperature compensation.

FIG. 16A depicts an embodiment of a programmable transmitter filter 140A with active temperature compensation that is similar to the programmable transmitter filter 18 of FIG. 8. FIG. 16A is discussed with continuing reference to FIG. 8 and FIG. 15A. Unlike the programmable transmitter filter 18 of FIG. 8, the programmable transmitter filter 140A with active temperature compensation replaces the third switchable reactive element 42 with a third switchable reactive element 42A. The third switchable reactive element 42A may be configured as a capacitor array further including a capacitor array having a first switch 46A in series with a first capacitor 44A and a second switch 46B in series with a second capacitor 44B. In addition, unlike the programmable transmitter filter 18 of FIG. 8, the programmable transmitter filter 140A with active temperature compensation replaces the second switchable series reactive device 66 with a second switchable series reactive device 66A. The second switchable series reactive device 66A may be configured as a capacitor array having a bypass path.

As depicted in FIG. 16A, the second switchable series reactive device 66A may include a first capacitor 68A in series with a first switch 70A, a second capacitor 68B in series with a second switch 70B, a third capacitor 68C in series with a third switch 70C, and a fourth switch 70D. In the bypass mode of operation, the fourth switch 70D is enabled, which bypasses the first capacitor 68A, the second capacitor 68B, and the third capacitor 68C. When the fourth switch 70D is disabled, the capacitance in series with the second shunt one-port resonator 64 is determined by the operational state of the first switch 70A, the second switch 70B, and the third switch 70C. The programmable transmitter filter 140A with active temperature compensation also replaces the controller 22 with a controller 22A configured to receive one or more temperature indications from temperature sensor circuitry 142. The temperature sensor circuitry 142 may be configured to provide one or more temperature indications to the controller 22A.

As an illustrative example of FIG. 15A, assuming that the receiver band is above the transmitter band and that the temperature indications indicate a falling temperature, the second temperature sensor circuitry 136B may be configured to progressively decrease the capacitance of the fourth switchable reactive element 128A to shift the lower edge of the pass band of the programmable receiver filter 130 to compensate for the falling temperature.

Alternatively, assuming the receiver band is below the transmitter band, the first temperature sensor circuitry 136A may be configured to shift the upper pass band of the programmable receiver filter 130A upward in response to a temperature indication that indicates the temperature of the duplexer is rising.

Returning to FIG. 16A, similar to the programmable receiver filter 130A with active temperature compensation, of FIG. 15A, the programmable transmitter filter 140A with active temperature compensation, of FIG. 16A, may be configured to shift the programmable transmitter pass band edge based upon the one or more temperature indications provided by the temperature sensor circuitry 142.

As an illustrative example, as shown in FIG. 16A, the temperature sensor circuitry 142 may provide a first temperature indication at a first temperature, a second temperature indication at a second temperature, and a third temperature indication at a third temperature to the controller 22A. In response to receipt of each of the temperature indications, assuming that the transmitter band is lower than the receiver band, the controller 22A may be configured to shift the upper edge of the pass band of the programmable transmitter filter 140A to compensate for the increasing temperature. Alternatively, if the temperature indications indicate a falling temperature, the controller 22A may be configured to shift the upper edge of the pass band of the programmable transmitter filter 140A to compensate for the falling temperatures.

As another illustrative example, assuming that the transmitter band is centered at a lower frequency than the receiver band, the upper edge of the pass band of the programmable transmitter filter 140A will tend to move higher in frequency as the temperature decreases. Accordingly, in response to receipt of a first temperature indication that indicates a temperature decrease, the controller 22A may be configured to shift the upper edge of the pass band of the programmable transmitter filter 140A to a lower frequency to compensate for the decrease in temperature.

As an example initial configuration of the programmable transmitter filter 140A with active temperature compensation, of FIG. 16A, assume that the second switchable series reactive device 66A may be configured such that the first switch 70A is enabled and that the second switch 70B, the third switch 70C, and the fourth switch 70D are disabled. In addition, assume that the third switchable reactive element 42A is initially configured such that the first switch 46A and the second switch 46B are disabled. In response to a first temperature indication that indicates the duplexer's temperature is below a first threshold temperature, the controller 22A may be configured to control the third switchable reactive element 42A to enable the first switch 46A while also enabling the second switch 70B of the second switchable series reactive device 66A. In response to receipt of the second temperature indication that indicates the temperature is lower than a second threshold temperature, the controller 22A may be further configured to enable the second switch 46B of the third switchable reactive element 42A while also enabling the third switch 70C of the second switchable series reactive device 66A. Upon receipt of the third temperature indication, the controller 22A may be further configured to enable the fourth switch 70D to effectively bypass all the capacitive elements of the second switchable series reactive device 66A. As an alternative example, the controller 22A may be further configured to control the various switches of the programmable transmitter filter 140A based upon a combination of the received temperature indications and the channel pair selection.

While the above illustrative example demonstrates a potential operation to progressively shift both pass band edges of the pass band of the programmable transmitter filter 140A based upon a falling temperature, a similar switching technique may be used to shift the edges of the pass band of the programmable receiver filter 130A of FIG. 15A. Likewise, similar switching techniques may be used by a controller 22A to adjust the pass band edges of the programmable receiver filter 130 and the edges of the pass band of the programmable transmitter filter 140 of FIG. 14, when the receiver band is lower in frequency than the transmitter band, as depicted in FIG. 13A. Alternatively, the programmable transmitter filter 140A of FIG. 16A may be configured similar to the programmable receiver filter 130A of FIG. 15A, where the first temperature sensor circuitry 136A and the second temperature circuitry 136B directly adjust the impedances used to shift the pass band edges of the programmable receiver filter 130A. In this case, the temperature sensor circuitry 142 may directly control one or more of the first switchable reactive element 26, the second switchable reactive element 34, the third switchable reactive element 42A, the first switchable series reactive device 58, and the second switchable series reactive device 66A. In addition to temperature compensation, the controller 22A may also base configuration of the programmable transmitter filter 140A upon a combination of the indicated temperature and the channel pair selection.

Figure 16B:
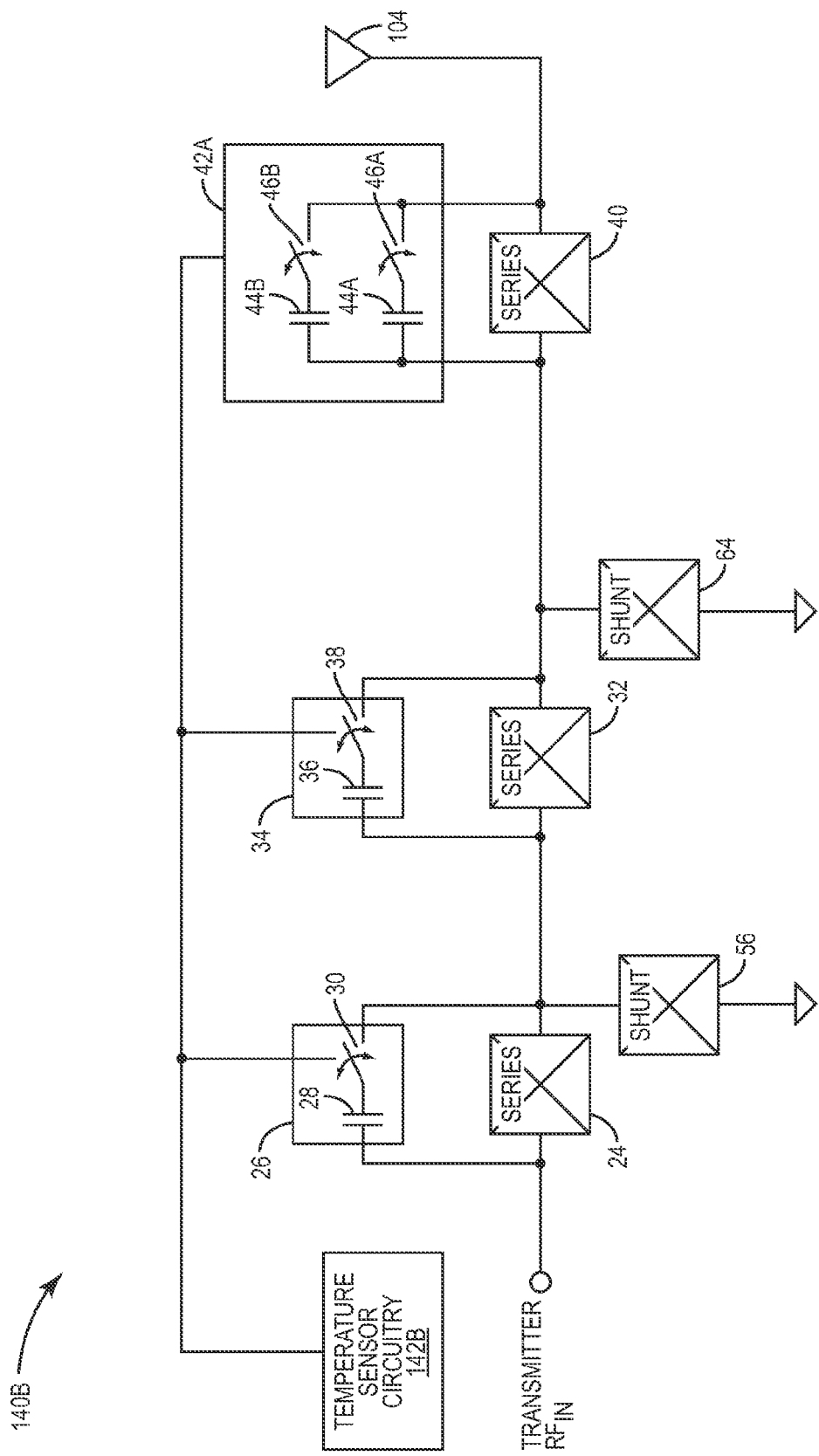
FIG. 16B depicts an embodiment of a programmable transmitter filter with active temperature compensation for a system where the pass band of the programmable receiver filter is located above the pass band of the programmable transmitter filter.

As an additional exemplary embodiment, FIG. 16B depicts a programmable transmitter filter 140B with active temperature compensation for a system where the pass band of the transmitter channel is located in a frequency band below the pass band of the receiver channel. The programmable transmitter filter 140B is similar to the programmable transmitter filter 140A with active temperature compensation of FIG. 16A. However, instead of the controller 22A governing the operation of the first switchable reactive element 26, the second switchable reactive element 34, and the third switchable reactive element 42A, the temperature sensor circuitry 142B may be configured to govern the operation of the first switchable reactive element 26, the second switchable reactive element 34, and the third switchable reactive element 42A in response to a temperature change of the duplexer. In addition, the programmable transmitter filter 140B also includes neither the first switchable series reactive device 58 nor the second switchable series reactive device 66A.

Accordingly, as an example operation of the programmable transmitter filter 140B, as the temperature of the programmable transmitter filter 140B increases, the temperature sensor circuitry 142B of FIG. 16B may be configured to selectively open the first switch 30 of the first switchable reactive element 26, the second switch 38 of the second switchable reactive element 34, the first switch 46A of the third switchable reactive element 42A, and the second switch 46B of the third switchable reactive element 42A to control the upper edge of the pass band of the programmable transmitter filter 140B to compensate for an increase in temperature of the duplexer.

Because the temperature sensor circuitry 142B may be configured to generate multiple control signals corresponding to different temperature thresholds, similar to the temperature sensor circuitry 142A, the upper edge of the pass band of the programmable transmitter filter 140B may be progressively moved to compensate for a temperature change of the duplexer.

As another exemplary embodiment, FIG. 16C depicts a programmable transmitter filter 140C with active temperature compensation for a system where the pass band of the transmitter channel is located in a frequency band below the pass band of the receiver channel. Unlike the programmable transmitter filter 140A of FIG. 16A, the programmable transmitter filter 140C does not include the first switchable reactive element 26, the second switchable reactive element 34, nor the third switchable reactive element 42A. Instead, the temperature sensor circuitry 142C interfaces with the controller 22A. The controller 22A governs the operation of the first switchable series reactive device 58 in series with the first shunt one-port resonator 56 and the second switchable series reactive device 66A in series with the second shunt one-port resonator 64.

The controller 22A of FIG. 16C is further configured to receive one or more temperature indications from the temperature sensor circuitry 142C. In response to detection that the temperature of the duplexer is increasing, the controller 22A progressively decreases the capacitance of the first switchable series reactive device 58 and the second switchable series reactive device 66A. Alternatively, in response to temperature indications that indicate that the temperature of the duplexer is decreasing, the controller 22A may be configured to progressively increase the capacitance of the first switchable series reactive device 58 and the second switchable series reactive device 66A to shift the pass band edge of the programmable transmitter filter 140C higher in frequency. Enabling the fourth switch 62 of the first switchable series reactive device 58, thereby shorting out the reactive device 60, is equivalent to increasing the total capacitance of the first switchable series reactive device 58 to an infinite value. Likewise, enabling the fourth switch 70D of the second switchable series reactive device 66A is equivalent to increasing the total capacitance of the second switchable series reactive device 66A to an infinite value. As an alternative example, as discussed relative to FIG. 16A, the programmable transmitter filter 140C may be configured such that the temperature sensor circuitry 148C directly controls the first switchable series reactive device 58 and the second switchable series reactive device 66A. As another alternative example, the controller 22A may be configured to shift the pass band edge of the programmable transmitter filter 140C based upon the one or more temperature indications received from the temperature sensor circuitry 142C and the channel pair selection.

Figure 16D:
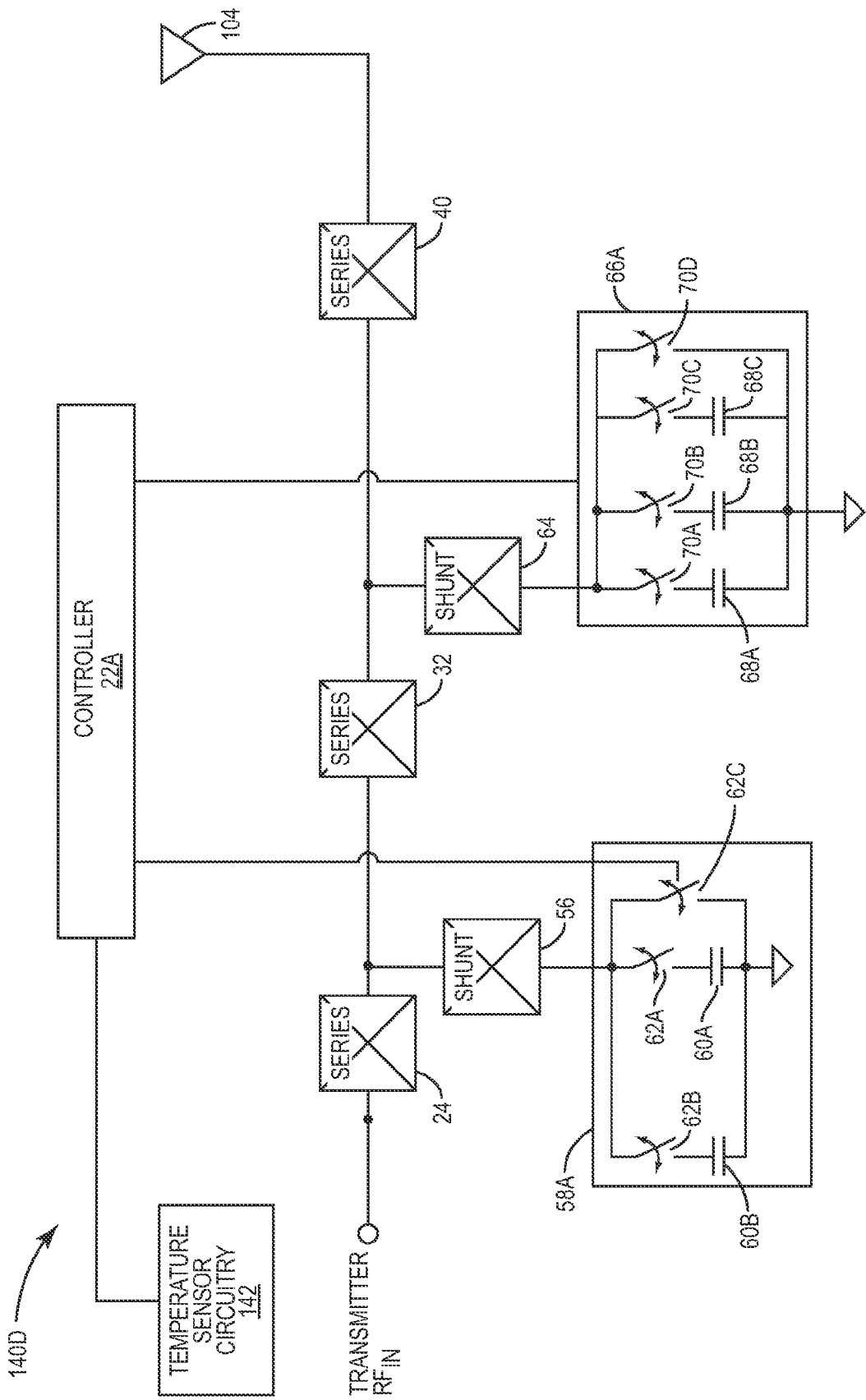
FIG. 16D depicts an embodiment of a programmable transmitter filter with active temperature compensation for a system where the pass band of the programmable receiver filter is located in a frequency band below the frequency band in which the pass band of the programmable transmitter filter is located.

As another embodiment of the programmable duplexer 10E, depicted in FIG. 14, that is temperature compensated, FIG. 16D depicts an embodiment of programmable transmitter filter 140D with temperature compensation for a system where the pass band of the programmable transmitter filter 140D is located in a frequency band located above a frequency band in which the pass band of the programmable receiver filter 130 is located. The programmable transmitter filter 140D with temperature compensation is similar in form and function to the programmable transmitter filter 140A with temperature compensation depicted in FIG. 16A except the first switchable reactive element 26, the second switchable reactive element 34, and the third switchable reactive element 42A have been removed from the programmable transmitter filter 140D with temperature compensation. Accordingly, the controller 22A may be configured to enable and disable the switches of the first switchable series reactive device 58A and the second switchable series reactive device 66A based on a temperature measurement or indication generated by the temperature sensor circuitry 142. In some embodiments, the controller 22A may be further configured to also enable and disable the switches of the first switchable series reactive device 58A and the second switchable series reactive device 66A based on both the temperature measurement or indication generated by the temperature sensor circuitry 142 and the channel pair selection. For example, as the temperature of the programmable transmitter filter 140D with temperature compensation increases, the controller 22 may be configured to disable one or more of the various switches of the first switchable series reactive device 58A and the second switchable series reactive device 66A to offset the tendency of the lower edge of the pass band of the programmable transmitter filter 140D with temperature compensation to decrease. In addition, as the temperature of the programmable transmitter filter 140D with temperature compensation decreases, the controller 22 may be configured to enable one or more of the various switches of the first switchable series reactive device 58A and the second switchable series reactive device 66A to offset the tendency of the lower edge of the pass band of the programmable transmitter filter 140D with temperature compensation to increase. In addition, the controller 22 may be configured to enable or disable one or more of the various switches of the first switchable series reactive device 58A and the second switchable series reactive device 66A to move the lower edge of the pass band of the programmable transmitter filter 140D with temperature compensation in response to a channel pair selection.

Figure 16E:
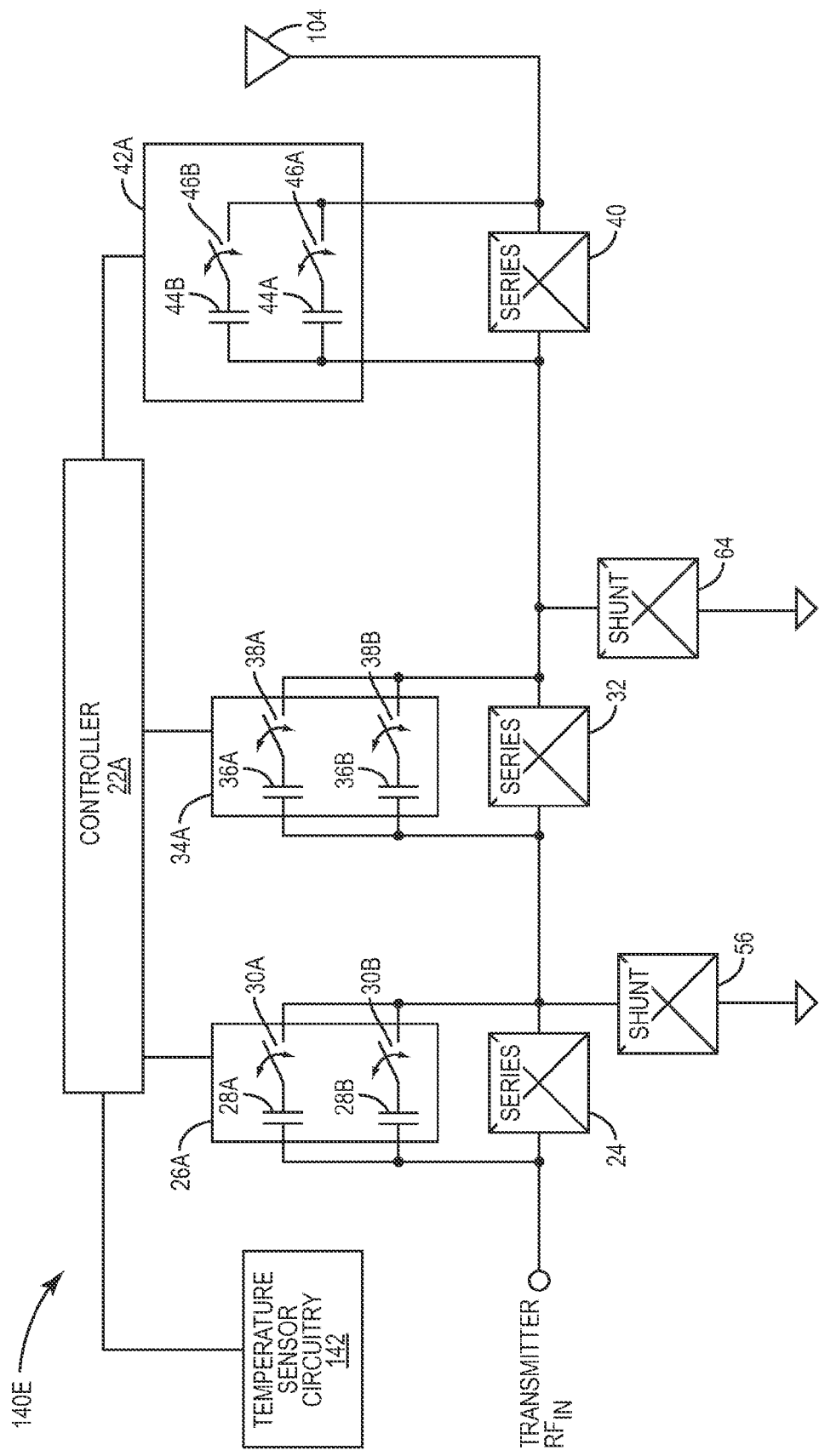
FIG. 16E depicts an embodiment of a programmable transmitter filter with active temperature compensation for a system where the pass band of the programmable transmitter filter is located in a frequency band above a frequency band in which the pass band of the programmable transmitter filter is located.

FIG. 16E depicts an embodiment a programmable transmitter filter 140E with active temperature compensation for a system where the pass band of the programmable transmitter filter 140E is located in a frequency band below a frequency band in which the pass band of the programmable receiver filter 130 is located. The programmable transmitter filter 140E with temperature compensation is similar in form and function to the programmable transmitter filter 140A with temperature compensation depicted in FIG. 16A except the first switchable reactive element 26 is replace by the first switchable reactive element 26A, the second switchable reactive element 34 is replaced by the second switchable reactive element 34A. In addition, the first switchable series reactive device 58 and the second switchable series reactive device 66A have been removed from the programmable transmitter filter 140E with temperature compensation such that the first shunt one-port resonator 56 and the second shunt one-port resonator 64 are tied to ground. The first switchable reactive element 26A includes a first capacitor 28A in series with a first switch 30A and a second capacitor 28B in series with a second switch 30B. The first switchable reactive element 26A is coupled in parallel with the first series one-port resonator 24 such that the first capacitor 28A in series with the first switch 30A and the second switch 30B in series with the second switch 30B are each coupled in parallel with the first series one-port resonator 24. The second switchable reactive element 34A includes a first capacitor 36A in series with a first switch 38A and a second capacitor 36B in series with a second switch 38B. The second switchable reactive element 34A is coupled in parallel with second series one-port resonator 32 such that the first capacitor 36A in series with the first switch 38A and a second capacitor 36B in series with a second switch 38B are coupled in parallel with the second series one-port resonator 32.

Accordingly, the controller 22A may be configured to enable and/or disable the first switch 30A and the second switch 30B of the first switchable reactive element 26A, the first switch 38A and the second switch 38B of the second switchable reactive element 34A, the first switch 46A and the second switch 46B of the third switchable reactive element 42A, and/or some combination thereof based on a temperature measurement or indication generated by the temperature sensor circuitry 142. In some embodiments, the controller 22A may be further configured to also to enable and/or disable the first switch 30A and the second switch 30B of the first switchable reactive element 26A, the first switch 38A and the second switch 38B of the second switchable reactive element 34A, the first switch 46A and the second switch 46B of the third switchable reactive element 42A, and/or some combination based on both the temperature measurement or indication generated by the temperature sensor circuitry 142 and the channel pair selection. For example, as the temperature of the programmable transmitter filter 140E with temperature compensation increases, the controller 22 may be configured to disable or open one or more of the first switch 30A and the second switch 30B of the first switchable reactive element 26A, the first switch 38A and the second switch 38B of the second switchable reactive element 34A, the first switch 46A and the second switch 46B of the third switchable reactive element 42A to offset the tendency of the upper edge of the pass band of the programmable transmitter filter 140E with temperature compensation to increase as the temperature decreases. In addition, as the temperature of the programmable transmitter filter 140E with temperature compensation decreases, the controller 22 may be configured to enable one or more of the first switch 30A and the second switch 30B of the first switchable reactive element 26A, the first switch 38A and the second switch 38B of the second switchable reactive element 34A, the first switch 46A and the second switch 46B of the third switchable reactive element 42A to offset the tendency of the upper edge of the pass band of the programmable transmitter filter 140E with temperature compensation to increase as the temperature decreases. In addition, the controller 22A may be configured to enable or disable one or more of the first switch 30A and the second switch 30B of the first switchable reactive element 26A, the first switch 38A and the second switch 38B of the second switchable reactive element 34A, the first switch 46A and the second switch 46B of the third switchable reactive element 42A, and/or some combination thereof programmable transmitter filter 140D with temperature compensation in response to a channel pair selection.

Figure 17:
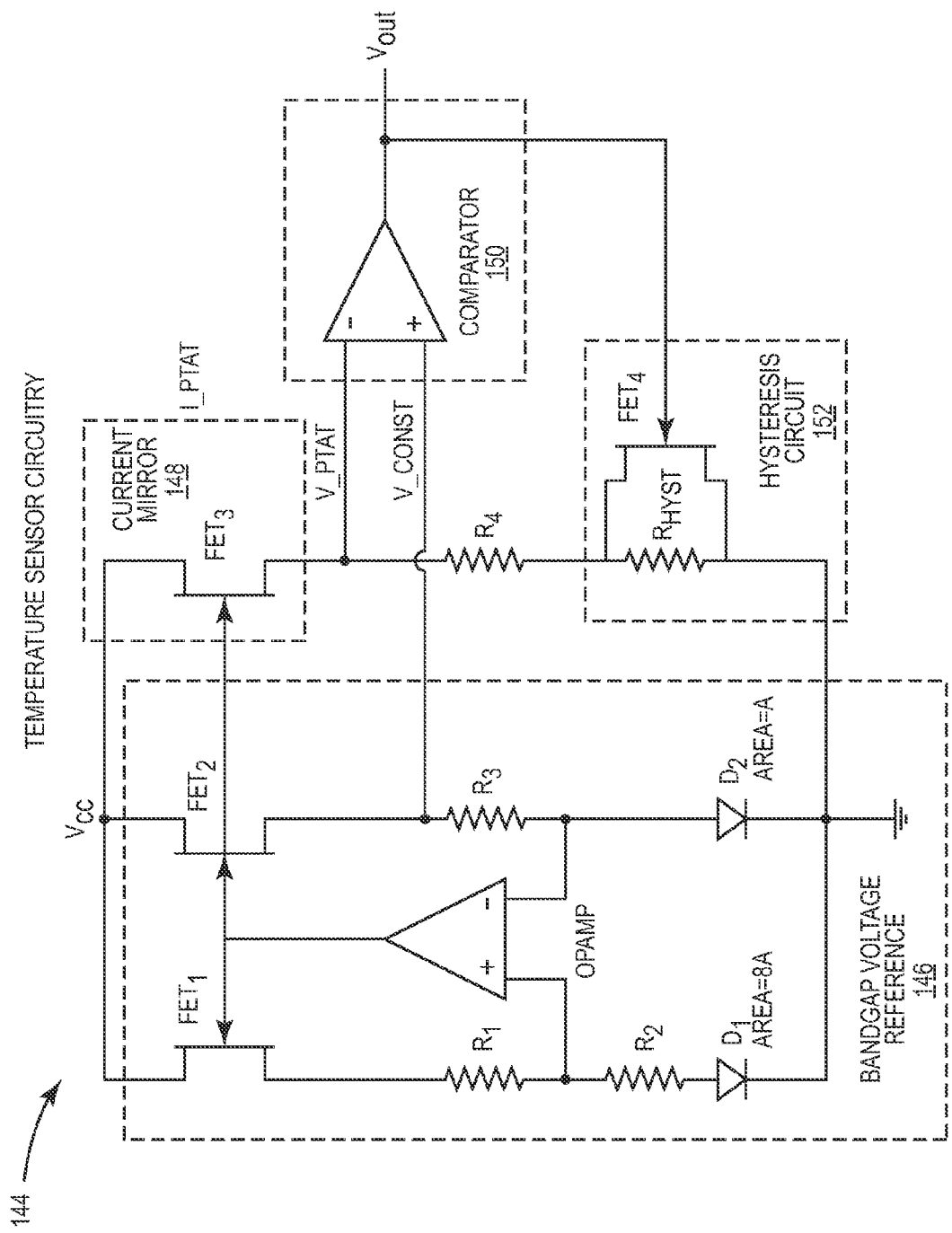
FIG. 17 depicts an exemplary embodiment of a temperature detection circuit based upon a band gap voltage reference and a proportional to absolute temperature voltage reference.

FIG. 17 depicts an exemplary embodiment of a temperature sensor circuitry 144 that may be used in an integrated circuit. The temperature sensor circuitry 144 may include a band gap voltage reference 146, a current proportional to absolute temperature current mirror 148, a comparator 150, and a hysteresis circuit 152.

The band gap voltage reference 146 creates a voltage which is independent of temperature. The band gap voltage reference 146 includes a first field effect transistor $FET_1$ and a second field effect transistor $FET_2$ configured to form a current mirror. The drain of each of the first field effect transistor $FET_1$ and second field effect transistor $FET_2$ are attached to a supply voltage $V_{CC}$. The source of the first field effect transistor $FET_1$ is coupled to a first resistor $R_1$, which is coupled in series with a second resistor $R_2$ and first diode $D_1$. The source of the second field effect transistor $FET_2$ is coupled to a third resistor $R_3$, which is coupled in series with a second diode $D_2$. The channel width of the first diode $D_1$ is approximately eight times larger than the channel width of the second diode $D_2$. An operational amplifier OPAMP includes an output coupled to the gates of the first field effect transistor $FET_1$ and the second field effect transistor $FET_2$, an inverting input coupled to the first resistor $R_1$ and the first diode $D_1$, and a non-inverting input coupled to the third resistor $R_3$ and the second diode $D_2$.

By setting the resistance of the first resistor $R_1$ and the resistance of the third resistor $R_3$ to be equal, and then carefully choosing the size of the second resistor $R_2$, the band gap voltage reference 146 may be configured to operate similarly to a Brokaw Cell. The band gap voltage reference 146 provides a band gap reference voltage V_CONST, which is constant over temperature.

The current mirror formed by the first field effect transistor $FET_1$ and the second field effect transistor $FET_2$ generate a current that is proportional to absolute temperature (IPTAT). The third field effect transistor $FET_3$ mirrors the current passing through the first field effect transistor $FET_1$ and the second field effect transistor $FET_2$. Because the current passing through the first field effect transistor $FET_1$, the second field effect transistor $FET_2$, and the third field effect transistor $FET_3$ at the top of the band gap voltage reference 146 is proportional to the band gap voltage drop across the diodes at the bottom of the circuit, the current output of the third field effect transistor $FET_3$ is proportional to absolute temperature. The current output of the third field effect transistor $FET_3$ may be directed through the fourth resistor $R_4$ to create a voltage proportional to absolute temperature V_PTAT that can be used to create a logic output from the comparator 150.

The comparator 150 includes an inverting input coupled to the output of the third field effect transistor $FET_3$, which provides a voltage proportional to absolute temperature V_PTAT. The comparator 150 further includes a non-inverting input configured to receive the band gap reference voltage V_CONST from the band gap voltage reference 146. The comparator 150 also includes a logic output that may be used to determine when the voltage proportional to absolute temperature V_PTAT exceeds or falls below the band gap reference voltage V_CONST.

By carefully choosing the value of R4, the voltage proportional to absolute temperature V_PTAT may be set to exceed the band gap reference voltage V_CONST at some predetermined threshold temperature. When the voltage proportional to absolute temperature V_PTAT exceeds the band gap reference voltage V_CONST, the logic output of the comparator 150 switches from "on" to "off." Alternatively, the inputs to the comparator 150 may be rearranged to configure the comparator 150 from "off" to "on" when the temperature-sensitive voltage exceeds the band gap reference voltage V_CONST. The logic output provided by the comparator 150 may be used to determine whether to open or close switches in order to include or exclude reactive elements in the tunable filter circuit. The hysteresis circuit 152 includes a fourth field effect transistor $FET_4$ having a gate coupled to the logic output provided by the comparator 150. The fourth field effect transistor $FET_4$ is coupled across a hysteresis resistor $R_{HYST}$, which is in series with the fourth resistor $R_4$. The hysteresis circuit 152 may be configured to prevent the temperature sensor circuitry 144 from rapidly switching on and off when the temperature is close to the threshold temperate. Feedback from the comparator 150 may be used to add a small amount of hysteresis so that the comparator 150 does not randomly switch between logic levels when the temperature of the band gap voltage reference 146 is very close to the threshold temperature. Portions of the temperature sensor circuitry 144 may be duplicated or further configured to provide multiple logic states for a variety of threshold temperatures. An additional logic circuit may provide multiple switch outputs to control the addition or subtraction of the reactive elements in series or parallel with the one-port resonators of FIG. 9.

As another alternative embodiment of the duplexer, the programmable receiver filter and/or the programmable transmitter filter of a duplexer may use a temperature dependent capacitor to shift the edge of the programmable receiver pass band or the edge of the programmable transmitter pass band. As an example, the programmable transmitter filter 18 depicted in FIG. 8 may include one or more temperature dependent capacitors. As another example, the programmable receiver filter 12 depicted in FIG. 9 may include one or more temperature dependent capacitors. Alternatively, the programmable receiver filter 12 and/or the programmable transmitter filter 18 may have a temperature dependent capacitor permanently in series or in parallel with one of the one-port resonators. In other words, the temperature dependent capacitor may not be in series or parallel with a switch such that it is always active.

Figure 18:
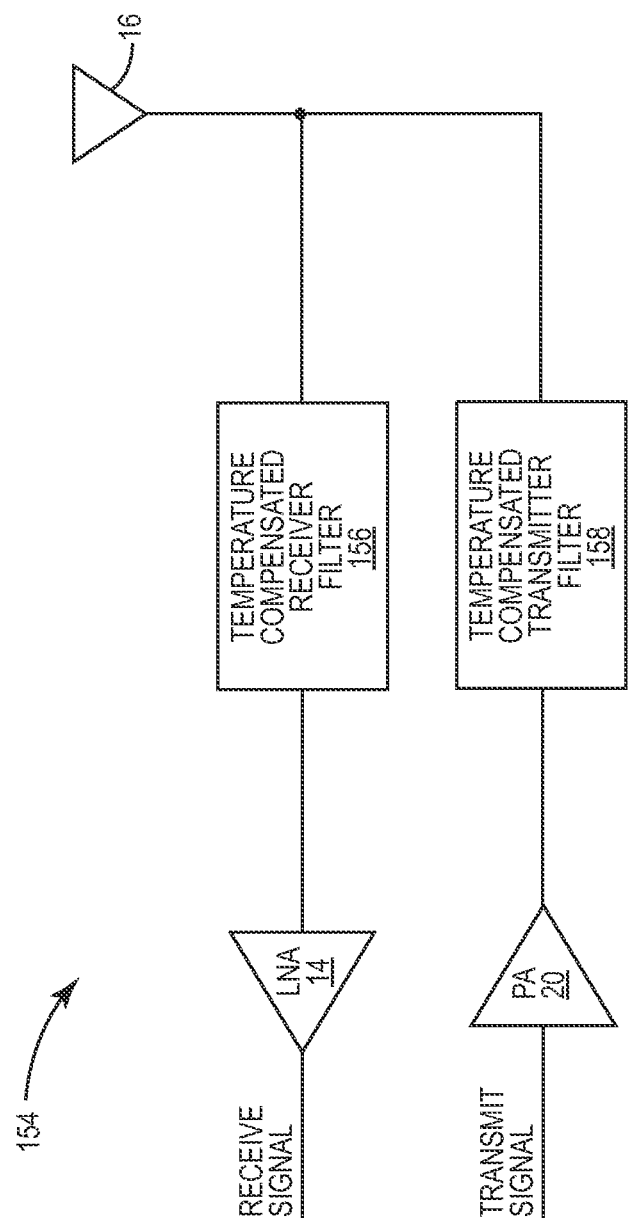
FIG. 18 depicts an exemplary embodiment of a temperature compensated receiver filter and transmitter filter of a duplexer.

In still another embodiment, depicted in FIG. 18, a temperature compensate front end duplexer 154 includes a temperature compensated receiver filter 156 and a temperature compensated transmitter filter. The input of the temperature compensated receiver filter 156 is coupled to the antenna 16 while the output of the temperature compensated receiver filter 156 is coupled to the low noise amplifier 14, which provides a receiver signal as an output. The output of the temperature compensated transmitter filter 158 is also coupled to the antenna 16. The input of the temperature compensated transmitter filter 158 is coupled to the output of the power amplifier 20, which receives the transmit signal to be broadcast.

Figure 19:
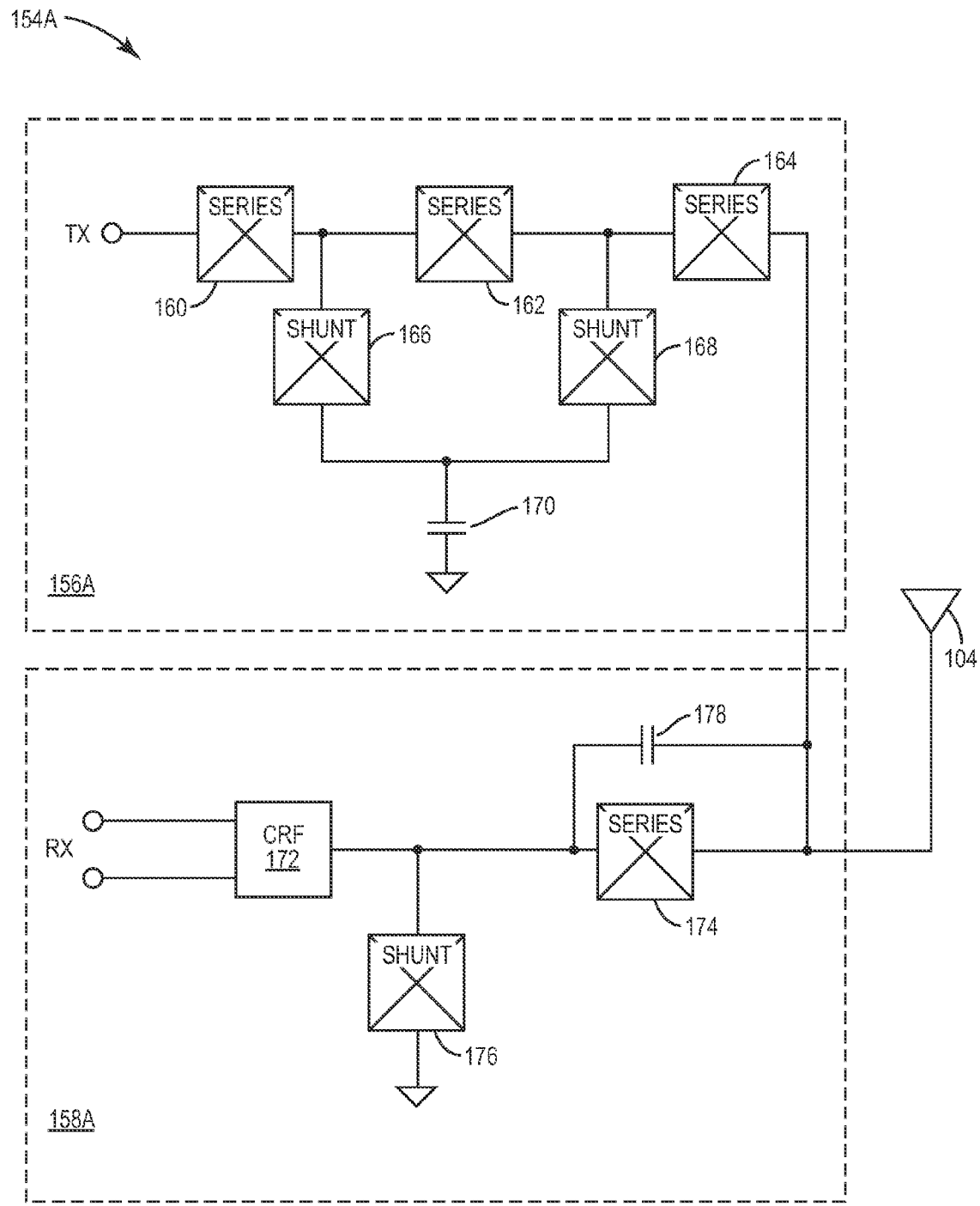
FIG. 19 depicts an exemplary embodiment of a temperature compensated duplexer having a temperature compensated receiver filter and a temperature compensated transmitter filter, where the transmitter channel is located in a lower frequency band than the receiver filter.

FIG. 19 depicts another embodiment of a temperature compensated duplexer 154A. The temperature compensated duplexer 154A of FIG. 19 includes a temperature compensated transmitter filter 156A and a temperature compensated receiver filter 158A, which are configured to operate in a system where the temperature compensated transmitter filter 156A is configured to operate at a higher frequency band than the temperature compensated receiver filter 158A.

The temperature compensated transmitter filter 156A includes a first series one-port resonator element 160, a second series one-port resonator element 162, a third series one-port resonator element 164, a first shunt one-port resonator element 166 and a second shunt one-port resonator element 168 arranged in series and parallel to form a ladder filter. The temperature compensated transmitter filter 156A further includes a first temperature sensitive capacitor 170 having a negative temperature coefficient of capacitance. Accordingly, as the temperature of the temperature compensated transmitter filter 156A increases, the first temperature sensitive capacitor 170 will decrease in capacitance, which will tend to shift the lower edge of the pass band of the temperature compensated transmitter filter 156A upward in frequency.

As further depicted in FIG. 19, the temperature compensated receiver filter 158A includes a coupled resonator filter 172, which provides a differential output to the receiver, (RX). The coupled resonator filter 172 is further coupled to a first series one-port resonator element 174, which is coupled to the antenna 104, and to the first shunt one-port resonator element 176. In addition, the temperature compensated receiver filter 158A includes a second temperature sensitive capacitor 178 having a negative temperature coefficient of capacitance. Accordingly, as the temperature increases, the capacitance of the second temperature sensitive capacitor 178 decreases. The lowering of the capacitance across the first series one-port resonator element 174 will shift the lower edge of the pass band of the temperature compensation receiver filter 158B higher in frequency as the temperature increases.

In some embodiments of the temperature compensated duplexer 154A, temperature compensated transmitter filter 156A may be further configured to operate as a programmable transmitter filter, as described in the above described embodiments. In other embodiments of the temperature compensated duplexer 154A, the temperature compensated transmitter filter 156A may be configured as a ladder filter. In still other embodiments of the temperature compensated duplexer 154A, the temperature compensated transmitter filter 156A may include a controller, where the controller is configured to modify the pass band of the temperature compensated transmitter filter 156A based upon the bandwidth requirements for at least one of the temperature compensated transmitter filter 156A, the temperature compensated receiver filter 158A, the channel pair selection, and/or a combination thereof. In still other embodiments of the temperature compensated duplexer 154A, the temperature compensated transmitter filter 156A may be further configured to include one or more temperature sensors or a controller configured to receive temperature indications from the one or more temperature sensors to further adjust the programmable transmitter pass band edge or bandwidth of the pass band of the temperature compensated transmitter filter 156A.

Furthermore, in some embodiments of the temperature compensated duplexer 154A, the temperature compensated receiver filter 158A may be further configured to operate as a programmable receiver filter, as described in the above described embodiments. In other embodiments of the temperature compensated duplexer 154A, the temperature compensated receiver filter 158A may be configured as a ladder filter. In still other embodiments of the temperature compensated duplexer 154A, the temperature compensated receiver filter 158A may include a controller, where the controller is configured to modify the pass band of the temperature compensated receiver filter 158A based upon the bandwidth requirements for at least one of the temperature compensated transmitter filter 156A, the temperature compensated receiver filter 158A, the channel pair selection, and/or a combination thereof. In still other embodiments of the temperature compensated duplexer 154A, the temperature compensated receiver filter 158A may be further configured to include one or more temperature sensors and/or a controller configured to receive temperature indications from the one or more temperature sensors to further adjust the programmable transmitter pass band edge or bandwidth of the pass band of the temperature compensated transmitter filter 156A.

Figure 20:
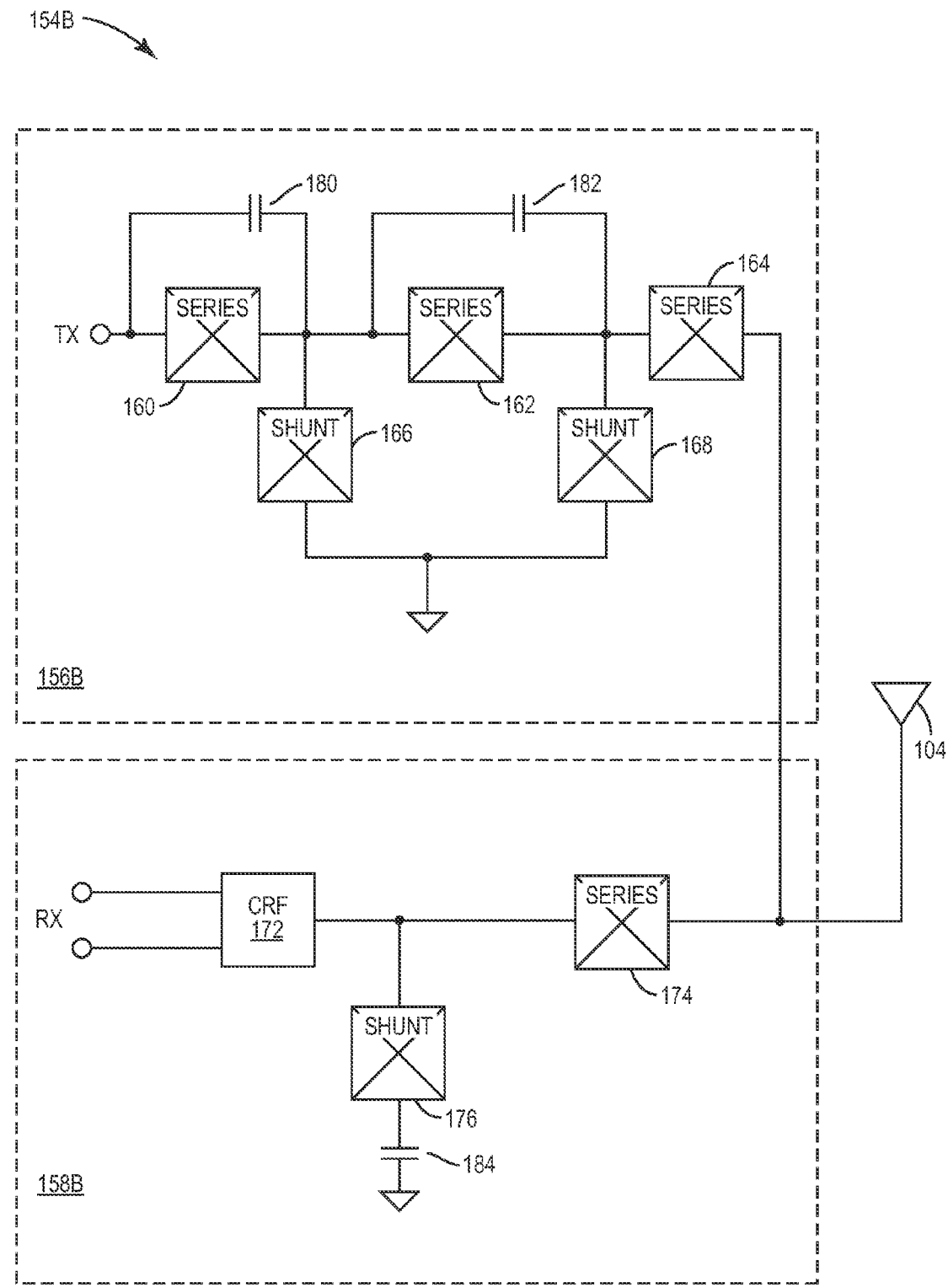
FIG. 20 depicts an exemplary embodiment of a temperature compensated receiver filter and transmitter filter of a duplexer, where the transmitter channel is located in a higher frequency band that the receiver filter.

FIG. 20 depicts another embodiment of a temperature compensated duplexer 154B where the pass band of the temperature compensated transmitter filter 156B is lower than the pass band of the temperature compensated receiver filter 158B. The temperature compensated duplexer 154B of FIG. 20 includes a temperature compensated transmitter filter 156B and a temperature compensated receiver filter 158B, which are configured to operate in a system where the temperature compensated transmitter filter 156B is configured to operate at a lower frequency band than the temperature compensated receiver filter 158B.

The temperature compensated transmitter filter 156B includes a first series one-port resonator element 160, a second series one-port resonator element 162, a third series one-port resonator element 164, a first shunt one-port resonator element 166 and a second shunt one-port resonator element 168 arranged in series and parallel to form a ladder filter. The temperature compensated transmitter filter 156B further includes a third temperature sensitive capacitor 180 having a negative temperature coefficient of capacitance in parallel with the first series one-port resonator element 160. In addition, the temperature compensated transmitter filter 156B further includes a fourth temperature sensitive capacitor 182 having a negative temperature coefficient of capacitance in parallel with the second series one-port resonator element 162.

Accordingly, as the temperature of the temperature compensated duplexer 154B increases, the upper edge of the pass band of the temperature compensated transmitter filter 156B will tend to decrease. To counteract the effect of the increasing temperature of the temperature compensated duplexer 154B, the first temperature sensitive capacitor 170 will decrease in capacitance, which will tend to shift the upper edge of the pass band of the temperature compensated transmitter filter 156B higher in frequency.

As further depicted in FIG. 20, the temperature compensated receiver filter 158B includes a coupled resonator filter 172, which provides a differential output to the receiver, RX. The coupled resonator filter 172 is further coupled to a first series one-port resonator element 174, which is coupled to the antenna 104, and to the first shunt one-port resonator element 176. In addition, the temperature compensated receiver filter 158B includes a fifth temperature sensitive capacitor 184 in series with the first shunt one-port resonator element 176. The fifth temperature sensitive capacitor 184 has a negative temperature coefficient of capacitance. Accordingly, as the temperature increases, the capacitance of the fifth temperature sensitive capacitor 184 decreases. The lowering of the capacitance in series with the first shunt one-port resonator element 176 shifts the lower edge of the pass band of the temperature compensated receiver filter 158B higher in frequency.

In some embodiments of the temperature compensated duplexer 154B, temperature compensated transmitter filter 156B may be further configured to operate as a programmable transmitter filter, as described in the above described embodiments. In other embodiments of the temperature compensated duplexer 154B, the temperature compensated transmitter filter 156B may be configured as a ladder filter. In still other embodiments of the temperature compensated duplexer 154B, the temperature compensated transmitter filter 156B may include a controller, where the controller is configured to modify the pass band of the temperature compensated transmitter filter 156B based upon the bandwidth requirements for at least one of the temperature compensated transmitter filter 156B, the temperature compensated receiver filter 158B, the channel pair selection, and/or a combination thereof. In still other embodiments of the temperature compensated duplexer 154B, the temperature compensated transmitter filter 156B may be further configured to include one or more temperature sensors or a controller configured to receive temperature indications from the one or more temperature sensors to further adjust the programmable transmitter pass band edge or bandwidth of the pass band of the temperature compensated transmitter filter 156B.

Furthermore, in some embodiments of the temperature compensated duplexer 154B, the temperature compensated receiver filter 158B may be further configured to operate as a programmable receiver filter, as described in the above described embodiments. In other embodiments of the temperature compensated duplexer 154B, the temperature compensated receiver filter 158B may be configured as a ladder filter. In still other embodiments of the temperature compensated duplexer 154B, the temperature compensated receiver filter 158B may include a controller, where the controller is configured to modify the pass band of the temperature compensated receiver filter 158B based upon the bandwidth requirements for at least one of the temperature compensated transmitter filter 156B, the temperature compensated receiver filter 158B, the channel pair selection, and/or a combination thereof. In still other embodiments of the temperature compensated duplexer 154B, the temperature compensated receiver filter 158B may be further configured to include one or more temperature sensors and/or a controller configured to receive temperature indications from the one or more temperature sensors to further adjust the programmable transmitter pass band edge or bandwidth of the pass band of the temperature compensated transmitter filter 156B.

Figure 21:
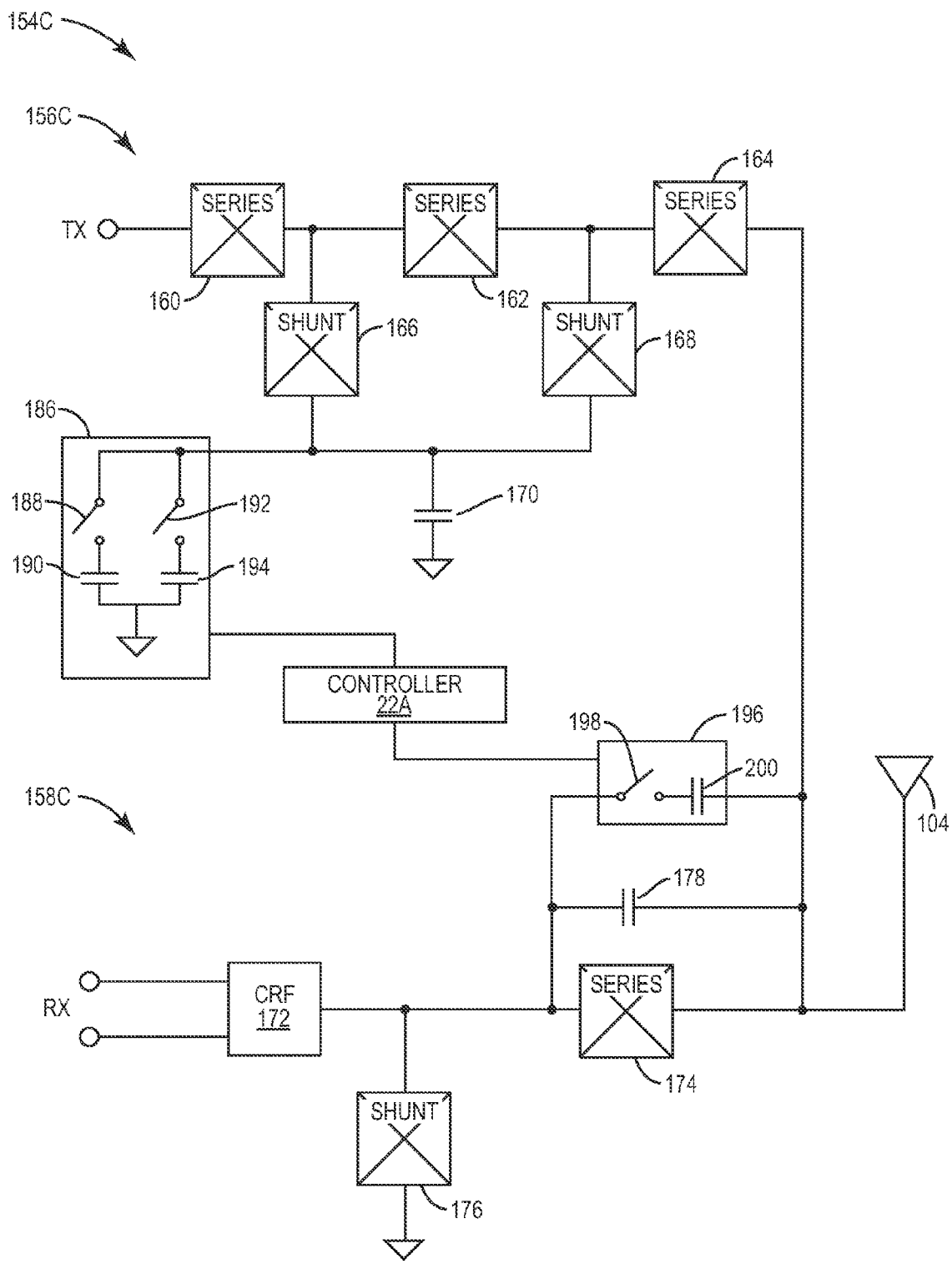
FIG. 21 depicts an exemplary embodiment of a temperature compensated programmable duplexer having a temperature compensated programmable receiver filter and a temperature compensated programmable transmitter filter, where the transmitter channel is located in a lower frequency band than the receiver filter.

As another exemplary embodiment of the temperature compensated duplexer 154A depicted in FIG. 19, FIG. 21 depicts a the programmable duplexer 154C with passive temperature compensation that may include a programmable transmitter filter 156C with passive temperature compensation and a programmable receiver filter 158C with passive temperature compensation. The programmable duplexer 154C with passive temperature compensation may be similar in form and function to the temperature compensated duplexer 154A except the programmable duplexer 154C with passive temperature compensation may further include the controller 22A. As will be described, the controller 22A is configured to change the lower edge of the pass band of the programmable transmitter filter 156C with passive temperature compensation and the upper edge of the pass band of the programmable receiver filter 158C with passive temperature compensation. Accordingly, the programmable duplexer 154C with passive temperature compensation may be configured such that the pass band of the programmable transmitter filter 156C with passive temperature compensation is in a frequency band that is above the frequency band in which the pass band of the programmable receiver filter 158C with passive temperature compensation is located.

The programmable transmitter filter 156C with passive temperature compensation is similar in form and function to the temperature compensated transmitter filter 156A depicted in FIG. 19; however, the programmable transmitter filter 156C with passive temperature compensation further includes a capacitor array 186 coupled in parallel with the first temperature sensitive capacitor 170. The capacitor array 186 includes a first switch 188 in series with a first capacitor 190 and a second switch 192 in series with a second capacitor 194. The controller 22A is in communication with the capacitor array 186 and configured to control the first switch and the second switch based on the channel pair selection. As previously discussed above regarding various embodiments of the duplexer 10 depicted in FIG. 1, the controller 22A may control the capacitor array 186 in order to increase the total capacitance in series with the first shunt one-port resonator element 166 and the second shunt one-port resonator element 168 to move the lower edge of the pass band of the programmable transmitter filter 156C with passive temperature compensation down in frequency. Alternatively, the controller 22A may control the capacitor array 186 to decrease the total capacitance in series with the first shunt one-port resonator element 166 and the second shunt one-port resonator element 168 in order to move the lower edge of the pass band of the programmable transmitter filter 156C with passive temperature compensation up in frequency. For example, the controller 22A may be configured to open the first switch 188 and the second switch 192 in order to lower the capacitance in series with the first shunt one-port resonator element 166 and the second shunt one-port resonator element 168. As previously described, the first temperature sensitive capacitor 170 is configured to have a negative temperature coefficient to substantially match and counteract the temperature characteristics of the first shunt one-port resonator element 166 and the second shunt one-port resonator element 168.

FIG. 21 further depicts that the programmable receiver filter 158C with passive temperature compensation may be similar in form and function to the temperature compensated receiver filter 158A depicted in FIG. 19; however, the programmable receiver filter 158C with passive temperature compensation may further include a switchable reactive element 196 coupled in parallel with the second temperature sensitive capacitor 178. The switchable reactive element 196 includes a third switch 198 in series with a capacitor 200. The controller 22A is in communication with the switchable reactive element 196 and configured to control the third switch 198 based on the channel pair selection.

As previously discussed above regarding various embodiments of the duplexer 10 depicted in FIG. 1, the controller 22A may enable or close the third switch 198 in order to increase the total capacitance in parallel with the first series one-port resonator element 174 in order to move the upper edge of the pass band of the programmable receiver filter 158C with passive temperature compensation down in frequency. Alternatively, the controller 22A may disable or open the third switch 198 to decrease the total capacitance in parallel with the first series one-port resonator element 174 in order to move the upper edge of the pass band of the programmable transmitter filter 156C with passive temperature compensation up in frequency in response to a channel pair selection. As previously described, the second temperature sensitive capacitor 178 is configured to have a negative temperature coefficient to substantially match and counteract the temperature characteristics of the series one-port resonator element 174.

Figure 22:
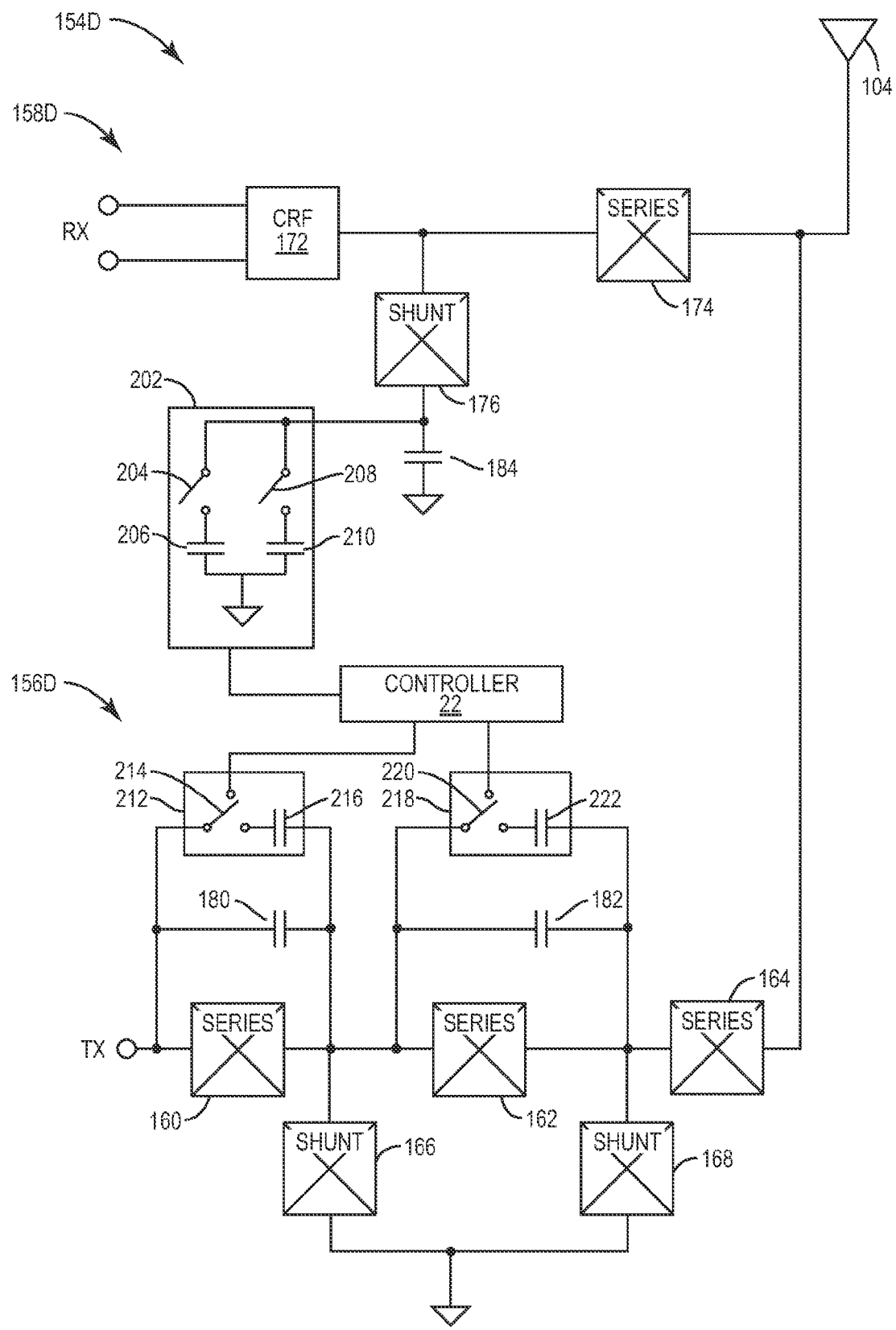
FIG. 22 depicts an exemplary embodiment of a programmable duplexer having a temperature compensated programmable receiver filter and a temperature compensated programmable transmitter filter, where the temperature compensated programmable transmitter channel is located in a higher frequency band than the temperature compensated programmable receiver filter.

As another exemplary embodiment of the temperature compensated duplexer 154B depicted in FIG. 20, FIG. 22 depicts a programmable duplexer 154D with passive temperature compensation that may include a programmable transmitter filter 156D with passive temperature compensation and a programmable receiver filter 158D with passive temperature compensation. The programmable duplexer 154D with passive temperature compensation may be similar in form and function to the temperature compensated duplexer 154B depicted in FIG. 20 except the programmable duplexer 154D with passive temperature compensation may further include the controller 22A. The controller 22A may be configured to control the upper edge of the pass band of the programmable transmitter filter 156D with passive temperature compensation and the lower edge of the pass band of the programmable receiver filter 158D with passive temperature compensation.

The programmable receiver filter 158D with passive temperature compensation may be similar in form and function to the temperature compensated receiver filter 158B depicted in FIG. 20; however, the programmable receiver filter 158D with passive temperature compensation may further include a capacitor array 202 coupled in parallel with the fifth temperature sensitive capacitor 184. The capacitor array 202 may include a first switch 204 coupled in series with a first capacitor 206 and a second switch 208 coupled in series with a second capacitor 210. The controller 22A may be in communication with the capacitor array 202 and configured to control the first switch 204 and the second switch 208 based on the channel pair selection. As previously discussed above regarding various embodiments of the duplexer 10 depicted in FIG. 1, the controller 22A may enable or close the first switch 204 and the second switch 208 and/or a combination thereof in order to increase the total capacitance in series with the first shunt one-port resonator element 176 in order to shift the lower edge of the pass band of the programmable receiver filter 158D with passive temperature compensation down in frequency. Alternatively, the controller 22A may disable or open the first switch 204, the second switch 208, and/or some combination thereof to decrease the total capacitance in series with the first shunt one-port resonator element 176 in order to move the lower edge of the pass band of the programmable receiver filter 158D with passive temperature compensation up in frequency. As previously described, the fifth temperature sensitive capacitor 184 has a negative temperature coefficient and may be substantially matched to the temperature characteristics of the first shunt one-port resonator element 176 such that the change in capacitance of the fifth temperature sensitive capacitor 184 counteracts temperature sensitivity of the first shunt one-port resonator element 176.

In addition, the programmable transmitter filter 156D with passive temperature compensation may be similar in form and function to the temperature compensated transmitter filter 156B depicted in FIG. 20; however, the programmable transmitter filter 156D with passive temperature compensation may further include first switchable reactive element 212 in parallel with the first series one-port resonator element 160 and the third temperature sensitive capacitor 180. The first switchable element is in communication with the controller 22A and includes a first switch 214 and a first capacitor 216. In addition, the programmable transmitter filter 156D with passive temperature compensation may further include a second switchable reactive element 218 in parallel with the second series one-port resonator element 162 and the fourth temperature sensitive capacitor 182. The second switchable reactive element 218 is in communication with the controller 22A and includes a second switch 220 and a second capacitor 222.

As previously discussed above regarding various embodiments of the duplexer 10 depicted in FIG. 1, the controller 22A may control the first switch 214 and the second switch 220 in order to increase the total capacitance in parallel with the first series one-port resonator element 160 and the second series one-port resonator element 162, respectively. The controller 22A may enable or close the first switch 214, the second switch 220, and/or some combination thereof to shift the upper edge of the pass band of the programmable temperature compensated transmitter filter higher in frequency. Alternatively, the controller 22A may disable or open the first switch 214, the second switch 220, and/or some combination thereof to shift the upper edge of the pass band of the programmable temperature compensated transmitter filter to a lower frequency in response to a channel pair selection. As previously described, the third temperature sensitive capacitor 180 and the fourth temperature sensitive capacitor 182 each have a negative temperature coefficient and may be substantially matched the temperature characteristics of the first series one-port resonator element 160 and the second series one-port resonator element 162 so as to counteract the temperature sensitivity of the first series one-port resonator element 160 and the second series one-port resonator element 162.

As yet another alternative embodiment, some embodiments of the programmable receiver filter 130 and the programmable transmitter filter 140 will use temperature sensitive capacitors having a negative temperature coefficient to provide temperature compensation and permit only the edge of the pass band proximate to the transition band or the pass band as a whole of the programmable receiver filter 130 and the programmable transmitter filter 140 to be temperature compensated. However, in this case, some embodiment of the switchable series reactive device in series with the shunt one-port resonator may not include a switch to short the shunt one-port resonator to ground because doing so would remove the temperature compensation provided by temperature sensitive capacitors. Instead, the switchable series reactive device may be a capacitor array configured such that the effective capacitance of the capacitor array when all the switches of the capacitor array are closed is sufficient to obtain the desired shift in the lower edge of the pass band of the programmable receiver filter 130 or the programmable transmitter filter 140.

With respect to the first temperature sensitive capacitor 170, the second temperature sensitive capacitor 178, the third temperature sensitive capacitor 180, the fourth temperature sensitive capacitor 182, and the fifth temperature sensitive capacitor 184, in some embodiments, the first temperature sensitive capacitor 170, the second temperature sensitive capacitor 178, the third temperature sensitive capacitor 180, the fourth temperature sensitive capacitor 182, and the fifth temperature sensitive capacitor 184, may include one or more temperature sensitive reactive elements that are combined to provide a desired temperature sensitivity characteristic or profile in order to compensate for the temperature characteristics of the shunt one-port resonator elements and the series one-port resonator elements that are employed in the various embodiments of duplexer 10 depicted in FIG. 1.

For example, while the overall temperature sensitivity of each of the first temperature sensitive capacitor 170, the second temperature sensitive capacitor 178, the third temperature sensitive capacitor 180, the fourth temperature sensitive capacitor 182, and the fifth temperature sensitive capacitor 184 may be characterized as a negative temperature coefficient, in some embodiments, the desired temperature change profile for each of the first temperature sensitive capacitor 170, the second temperature sensitive capacitor 178, the third temperature sensitive capacitor 180, the fourth temperature sensitive capacitor 182, and the fifth temperature sensitive capacitor 184 may be obtained by using one or more temperature sensitive reactive components in combination. For example, the first temperature sensitive capacitor may be a combination of more than one temperature sensitive capacitor.

As an example, the temperature sensitive reactive element may be a capacitor that includes a negative temperature coefficient such that that capacitance of the temperature sensitive capacitor decreases as the temperature of the capacitor increases and the capacitance of the temperature sensitive capacitor increases as the temperature of the capacitor decreases. Moreover, the temperature coefficient may be selected to provide a desired rate of change in the capacitance value versus temperature within a temperature range of interest. For example, the negative temperature coefficient may include a temperature sensitivity over a particular temperature range that offsets a temperature sensitivity of a one-port resonator. Some embodiments of the duplexer 10 may include more than one temperature sensitive capacitor where the negative temperature coefficient of each temperature sensitive capacitor is matched to offset a temperature sensitivity of a particular series and/or shunt one-port resonator or more than one series and/or shunt one-port resonator. In some embodiments, more than one temperature sensitive capacitor may be placed in parallel or in series to provide an effective capacitance in series and/or in parallel with a one-port resonator. In some embodiments, the temperature coefficients of the more than one temperature sensitive capacitor may be placed in parallel or series where each of the temperature sensitive capacitors may not be equal. For example, in some embodiments, a first temperature sensitive capacitor may have a negative temperature coefficient while a second temperature sensitive capacitor has a positive temperature coefficient such that the overall temperature coefficient is negative. However, the multiple temperature sensitive capacitors may provide a more complex temperature sensitivity function that more closely matches the temperature sensitivity of the one-port resonator. In other embodiments, the multiple temperature sensitive capacitors may be placed in series with each other, in parallel with each other, or a combination thereof to offset the sensitivity of the receiver filter or the transmitter filter as a whole, one or more of the one-port resonators, a coupled resonator filter, or some combination thereof. Similarly, in some embodiments, the duplexer 10 may further include one or more switchable reactive elements in parallel or series with a temperature sensitive capacitor.

As an example, the temperature sensitive capacitors may provide temperature compensation while the one or more switchable reactive elements permit a controller or processor to control one or more of the edges of a pass band of at least one of the transmitter filter and/or the receiver filter. In some embodiments, the frequency pass band of the programmable transmitter filter may be above the frequency pass band of the programmable receiver filter, while in other embodiments, the frequency pass band of the programmable receiver filter may be above the frequency pass band of the transmitter filter. Moreover, in some embodiments of the duplexer depicted in FIG. 1, at least one of the programmable receiver filter and the programmable transmitter filter may include a temperature sensitive characteristic to substantially provide temperature compensation over a desired temperature range. In this case, either the edge of the frequency pass band or the pass band of at least one of the programmable receiver filter and the programmable transmitter filter may be further adjusted to maintain a desired transition band between the programmable receiver filter and the programmable transmitter filter.

Figure 23:
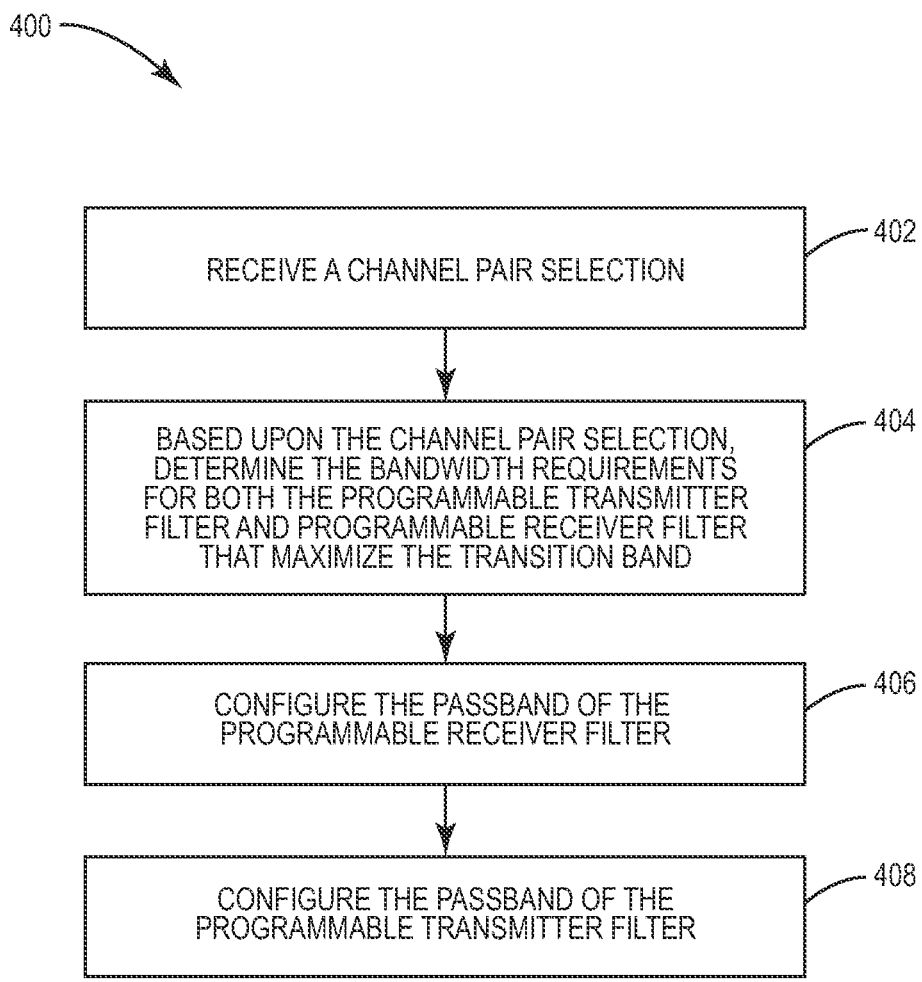
FIG. 23 depicts an operation for controlling the pass band of the programmable receiver filter and programmable transmitter filter as well the location of the pass band of the programmable receiver filter relative to the pass band of programmable transmitter filter within a frequency pass band of a duplexer of a communication device.

FIG. 23 depicts an operation 400 for controlling the pass band of the programmable receiver filter and programmable transmitter filter. In addition, in some embodiments, FIG. 23 depicts alternative embodiments of the operation 400 for controlling the pass band of the programmable receiver filter and programmable transmitter filter as well the location of the pass band of the programmable receiver filter relative to the pass band of the programmable transmitter filter within a frequency pass band of a duplexer of a communication device. The operation 400 will be described with continuing reference to the programmable duplexer 10E of FIG. 14, for the sake of convenience and not by way of limitation. Accordingly, various combinations of the various embodiments of the programmable receiver filter 130, depicted in FIGS. 15A-E, and the various embodiments of the programmable transmitter filter 140, depicted in FIGS. 16A-E may be described in combination. In addition, as will be discussed, in some embodiments of operation 400, the features described with respect to the temperature compensated duplexer 154 depicted in FIG. 18 as well as the various embodiments of the temperature compensated receiver filter 156 and the various embodiments of the temperature compensated transmitter filter 158, depicted in FIG. 19-22, may be combined with the various combinations of the features and functions of the various combinations of the various embodiments of the programmable receiver filter 130, depicted in FIGS. 15A-E, and the various embodiments of the programmable transmitter filter 140, depicted in FIGS. 16A-E. Moreover, although not depicted in FIGS. 15A-15E, or FIGS. 19-22, some embodiments of the programmable receiver filter 130 may be similar to the exemplary embodiment of the programmable receiver filter 12, depicted in FIG. 9, that includes arrays of reactive devices in parallel with series one-port resonators and in series with.

As discussed previously, the controller 22A may be configured to identify a channel pair selection provided for communication between the communication device and a base station. Based upon the identified channel pair selection, the controller 22A may be further configured to adjust at least one of the pass band edges of the programmable transmitter pass band, the edge of the programmable receiver pass band, and a combination thereof based upon the identified channel pair selection.

As an example operation 400, depicted in FIG. 23, the controller 22A may receive a channel pair selection, (Step 402). In some embodiments of the operation 400, the controller 22A may further receive one or more temperature measurements or indications from temperature sensor circuitry 136. In addition, in some embodiments of operation 400 the controller 22A may also receive an indication or be configured to determine whether the programmable duplexer 10E further includes a feature to permit the pass band of the programmable receiver filter 130 and the pass band of the programmable transmitter filter 140 to be selectively located in a frequency band relative such that the programmable duplexer 10E may operate in a communication network where the pass band of the receiver filter may be either above or below the pass band of the transmitter filter. As an example, in some embodiments of the duplexer 10, the programmable receiver filter 130 and the programmable transmitter filter may include one or more switchable reactive elements or capacitor arrays that may be configured to adjust the location of the frequency band in which the pass band of the programmable receiver filter relative to the location of the frequency band in which the pass band of the programmable transmitter filter 140. In addition, based at least upon the channel pair selection, the controller 22A may further determine the bandwidth requirements for both the programmable transmitter filter 140 and the programmable receiver filter 130 that maximize the transition band, (Step 404). In some alternative embodiments of the operation 400, the controller 22A may further determine the bandwidth requirements for both the programmable receiver filter 130 and the programmable transmitter filter 140, depicted in FIG. 14, based on at least the channel pair selection, the one or more temperature measurements or indications received from one or more temperature sensor circuits, the location of the pass band of the programmable receiver filter 130 and the programmable transmitter filter 140, and/or some combination thereof. In still other embodiments, the controller 22A may further determine which of the edges of the pass band of the programmable receiver filter 130 and which of the edges of the pass band the programmable transmitter filter 140 are proximate to each other to form the transition band of the programmable duplexer 10E based on a determination of the location of the pass band of the programmable receiver filter 130 relative to the location of the pass band of the programmable transmitter filter 140. Based on the determination of which of the edges of the programmable receiver filter 130 and which of the edges of the programmable transmitter filter 140 form the transition band of the duplexer, the controller 22A may be further configured to determine whether to move only one of or both of the edge of the pass band of the programmable receiver filter 130 and one or both of the edges of the pass band of the programmable transmitter filter 140. For example, in some embodiments, the controller 22A may only configure the edge of the pass band of the programmable receiver filter 130 and the edge of the pass band of the programmable transmitter filter 140 that form the transition band of the programmable duplexer 10E based on the channel pair selection and/or the channel pair selection and a temperature measurement or indication related to the temperature of the programmable duplexer 10E.

In those cases where the temperature sensor circuit directly controls a switchable reactive element or a temperature sensitive reactive element, such as a capacitor having a negative temperature coefficient provide temperature compensation for the programmable duplexer 10E, the controller 22A may determine whether to adjust the edge of the pass band of only one of the programmable receiver filter 130 and the programmable transmitter filter 140, selectively adjust the edge of the pass band of only one of the programmable receiver filter 130 and the programmable transmitter filter 140, adjust the pass band of only one of the programmable receiver filter 130 and the programmable transmitter filter 140, adjust the pass band of each of the of the programmable receiver filter 130 and the programmable transmitter filter 140, or some combination thereof based on a channel pair selection and/or a relative location of the pass band of each of the programmable receiver filter 130 and the programmable transmitter filter 140. In some embodiments, the controller 22A, may determine which of the edges of the pass band of the programmable receiver filter 130 and the programmable transmitter filter 140 to adjust based on a bandwidth requirement for the programmable receiver filter 130, the a bandwidth requirements of the programmable transmitter filter 140, and/or some combination thereof. Alternatively, in some embodiments, the further determination may be based on at least the channel pair selection, the one or more temperature measurements or indications from various temperature sensor circuits, and/or some combination thereof. In alternatively embodiments, the programmable duplexer 10E may have one temperature sensor circuit that may be used to shift one or more of the edges of the pass band of the programmable receiver filter 130 and the edges of the pass band of the programmable transmitter filter 140.

Thereafter, based on the bandwidth requirements of at least one of the programmable transmitter filter 140 and the programmable receiver filter 130, the controller 22A may configure the switchable reactive elements of the programmable receiver filter 130 to provide the appropriate pass band by adjusting at least one edges of the pass band of the programmable receiver filter 130, (Step 406). In some embodiments, the controller 22A may determine that an adjustment of the at least one of the edges of the pass band the programmable receiver filter 130 is not required based on the previously described determinations, in which case the controller 22A may not adjust the programmable receiver filter 130. The controller 22A may be further configured to adjust the switchable reactive elements of the programmable transmitter filter 140 to provide the appropriate pass band by adjusting at least one of the edges of the pass band of the programmable transmitter pass band, (Step 408). However, in some cases, the controller 22A may determine that the programmable transmitter filter 140 does not need to be adjusted based on the previously described determinations. Alternatively, with respect to the Step 406 and the Step 408, in some cases, the controller 22A may determine to adjust only one of the edges of only one of the programmable receiver filter 130 and the programmable transmitter filter 140.

In some alternative embodiments, as discussed relative to the various embodiments of the programmable transmitter filter 140 and the programmable receiver filter 130, depicted in FIG. 14, the controller 22A may configure the programmable duplexer 10E to locate the programmable transmitter pass band of the programmable transmitter filter 140 and programmable pass band of the programmable receiver filter 130 relative to one another in the Step 408 and the Step 406, respectively. For example, in Step 408, the controller 22A may configure the programmable duplexer 10E to locate the pass band of the programmable transmitter filter 140 in a frequency band that is above the frequency band in which the pass band of the programmable receiver filter 130 is located. Alternatively, in the Step 408, the controller 22A may configure the programmable duplexer 10E to locate the pass band of the programmable transmitter filter 140 in a frequency band that is below the frequency band in which the pass band of the programmable receiver filter 130 is located. Similarly, in Step 406, the controller 22A may configure the programmable duplexer 10E to locate the pass band of the programmable receiver filter 130 in a frequency band that is above the frequency band in which the pass band of the programmable transmitter filter 140 is located. Alternatively, in the Step 406, the controller 22A may configure the programmable duplexer 10E to locate the pass band of the programmable receiver filter 130 in a frequency band that is below the frequency band in which the pass band of the programmable transmitter filter 140 is located.

As an example, in the case where the location of the frequency band of the programmable receiver filter 130 and the location of the frequency band of the programmable transmitter filter 140 may be configured, the controller 22A may determine whether the pass band of the programmable transmitter filter 140 is to be positioned in a frequency band above or below a frequency band in which the pass band of the receiver filter is located. As an example, the controller 22A may toggle control each of the configurable series one-port resonator elements, the configurable shunt one-port elements, and the configurable resonator filter element to switch the relative location of the pass band of the programmable transmitter filter 140 with respect to the pass band of the programmable receiver filter 130.

In still other embodiments, where one or more of the temperature sensitive reactive elements, such as a temperature sensitive capacitor having a negative temperature coefficient, provide some or all of the temperature compensation of programmable duplexer 10E depicted in FIG. 14, the respective controller 22A may be configured to position the pass band and/or one or both of the edges of the pass band of the programmable receiver filter 130 and programmable transmitter filter 140 or the pass band. Although the operation 400 has been described relative to the programmable duplexer 10E of FIG. 14, this is by way of convenience and not by way of limitation. Accordingly, the various features and functions described with respect to each of the embodiments of the duplexer 10 of FIG. 1 may be applied to the various embodiments of the programmable duplexer 10E as described herein.

Those skilled in the art will recognize improvements and modifications to the embodiments of the present disclosure. All such improvements and modifications are considered within the scope of the concepts disclosed herein and the claims that follow.

What is claimed is:

1. A programmable duplexer of a communication device comprising:
   a receiver filter including a radio frequency receiver input and a radio frequency receiver output, the receiver filter configured to pass signals about a receiver pass band between the radio frequency receiver input and the radio frequency receiver output while attenuating signals outside of the receiver pass band, wherein the receiver pass band includes a programmable receiver pass band edge;
   a transmitter filter including a radio frequency transmitter input and a radio frequency transmitter output, the transmitter filter configured to pass signals about a transmitter pass band between the radio frequency transmitter input and the radio frequency transmitter output while attenuating signals outside the transmitter pass band, wherein the transmitter pass band includes a programmable transmitter pass band edge;
   temperature sensor circuitry configured to generate one or more temperature indications associated with the programmable duplexer; and
   a controller in communication with the temperature sensor circuitry and at least one of the receiver filter and the transmitter filter, wherein the controller is configured to receive the one or more temperature indications associated with the programmable duplexer and adjust at least one of the programmable receiver pass band edge and the programmable transmitter pass band edge based upon the one or more temperature indications.

2. The programmable duplexer of claim 1 wherein:
   the transmitter filter includes a ladder filter having a first series one-port resonator, a second series one-port resonator, a third series one-port resonator, a first shunt one-port resonator, and a second shunt one-port resonator; and
   a switchable reactance circuit is coupled in parallel with one of the first series one-port resonator, the second series one-port resonator, and the third series one-port resonator; and
   the controller is in communication with the switchable reactance circuit, and the controller is further configured to govern the switchable reactance circuit based upon the one or more temperature indications to adjust the programmable transmitter pass band edge.

3. The programmable duplexer of claim 2 wherein the switchable reactance circuit is a capacitor array.

4. The programmable duplexer of claim 1 wherein:
   the receiver filter of the programmable duplexer includes a one-port resonator arranged in series with a coupled resonator filter, and a switchable reactance circuit, wherein the switchable reactance circuit is coupled in parallel with the one-port resonator;
   the controller is in communication with the switchable reactance circuit, and the controller is further configured to govern the switchable reactance circuit based upon the one or more temperature indications to adjust the programmable receiver pass band edge.

5. The programmable duplexer of claim 1 wherein:
   the receiver filter of the programmable duplexer includes a one-port resonator arranged in shunt with a coupled resonator filter, and a switchable reactance circuit, wherein the switchable reactance circuit is coupled in series with the one-port resonator; and
   the controller is in communication with the switchable reactance circuit, and the controller is further configured to govern the switchable reactance circuit based upon the one or more temperature indications to adjust the programmable receiver pass band edge.

6. The programmable duplexer of claim 1 wherein:
   the transmitter filter includes a plurality of one-port resonators arranged in series and in shunt to form a ladder filter; and a switchable reactance circuit is coupled in series with one or more of the shunt one-port resonators; and the controller is in communication with the switchable reactance circuit, and the controller is further configured to control the switchable reactance circuit based upon the one or more temperature indications to adjust the programmable transmitter pass band edge.

7. The programmable duplexer of claim 6 wherein the switchable reactance circuit is a capacitor array.

8. The programmable duplexer of claim 1 wherein:
the transmitter filter includes a ladder filter including a first series one-port resonator, a second series one-port resonator, a third series one-port resonator, a first shunt one-port resonator, and a second shunt one-port resonator; and wherein a switchable reactance circuit is coupled in parallel with one of the first series one-port resonator, the second series one-port resonator, and the third series one-port resonator; and
the temperature sensor circuitry includes a control output in communication with the switchable reactance circuit, and wherein the temperature sensor circuitry is configured to control the switchable reactance circuit based upon a threshold temperature.

9. The programmable duplexer of claim 8 wherein:
the switchable reactance circuit includes a switch coupled in series with a capacitor; and
wherein the temperature sensor circuitry is configured to selectively control the switch based upon the threshold temperature.

10. The programmable duplexer of claim 1 wherein:
the receiver filter of the programmable duplexer includes a one-port resonator arranged in shunt with a coupled resonator filter, and a switchable reactance circuit, wherein the switchable reactance circuit is coupled in series with the one-port resonator; and
the temperature sensor circuitry includes a control output in communication with the switchable reactance circuit, and wherein the temperature sensor circuitry is configured to control the switchable reactance circuit based upon a threshold temperature.

11. The programmable duplexer of claim 10 wherein the switchable reactance circuit includes a switch coupled in parallel with a capacitor; and
the temperature sensor circuitry is configured to selectively close the switch based upon the threshold temperature.

12. The method of claim 11 wherein:
the receiver filter of the programmable duplexer includes a one-port resonator arranged in parallel with a coupled resonator filter, and at least one switchable reactive element, wherein the at least one switchable reactive element is coupled in parallel with the one-port resonator; and
adjusting the programmable receiver pass band edge of the receiver filter of the programmable duplexer based upon the first temperature indication further comprises:
controlling the at least one switchable reactive element based upon the first temperature indication to adjust the programmable receiver pass band edge of the receiver filter.

13. The method of claim 12 wherein the at least one switchable reactive element is a capacitor array.

14. The method of claim 11 wherein:
the transmitter filter of the programmable duplexer includes a one-port resonator arranged in series with a coupled resonator filter, and at least one switchable reactive element, wherein the at least one switchable reactive element is coupled in parallel with the one-port resonator; and
adjusting the programmable transmitter pass band edge of the transmitter filter of the programmable duplexer based upon the first temperature indication further comprises:
controlling the at least one switchable reactive element based upon the first temperature indication to adjust the programmable transmitter pass band edge of the transmitter filter.

15. The method of claim 14 wherein the at least one switchable reactive element is a capacitor array.

16. The method of claim 11 wherein adjusting the programmable receiver pass band edge of the receiver filter of the programmable duplexer based upon the first temperature indication further comprises:
identifying a channel pair selection provided for communication between the communication device and a base station; and
adjusting the programmable receiver pass band edge of the receiver filter of the programmable duplexer based upon a combination of the channel pair selection and the first temperature indication.

17. The method of claim 16 further comprising:
generating a second temperature indication associated with the programmable duplexer; and
wherein adjusting the programmable receiver pass band edge of the receiver filter based upon the combination of the channel pair selection and the first temperature indication further comprises:
adjusting the programmable receiver pass band edge of the receiver filter is based upon the first temperature indication and the second temperature indication.

18. The method of claim 11 wherein adjusting the programmable pass band edge of one of the receiver filter and the transmitter filter based upon the first temperature indication further comprises:
receiving the first temperature indication at a switchable reactive circuit from the temperature sensor circuitry; and
adjusting a state of the switchable reactive circuit in response to the first temperature indication.

19. The method of claim 11 wherein the transmitter filter includes a plurality of one-port resonators arranged in series and in shunt to form a ladder filter, and a switchable reactive circuit, wherein the switchable reactive circuit is coupled in parallel with at least one of the series plurality of one-port resonators; and
wherein adjusting the programmable transmitter pass band edge of the transmitter filter of the programmable duplexer based upon the first temperature indication further comprises:
controlling the switchable reactive circuit of the transmitter filter to adjust the programmable transmitter pass band edge of the transmitter filter based upon the first temperature indication;
generating a second temperature indication associated with the programmable duplexer;
controlling the switchable reactive circuit of the transmitter filter to adjust the programmable transmitter pass band edge of the transmitter filter based upon a combination of the first temperature indication and the second temperature indication.

20. The method of claim 19 wherein the switchable reactive circuit is a capacitor array.

21. The method of claim 11 further comprising:
generating a second temperature indication associated with the programmable duplexer; and
adjusting the programmable transmitter pass band edge of the transmitter filter of the programmable duplexer based upon the second temperature indication.

22. The method of claim 21 wherein adjusting the programmable transmitter pass band edge of the transmitter filter of the programmable duplexer based upon the second temperature indication further comprises:
identifying a channel pair selection provided for communication between the communication device and a base station; and
adjusting the programmable transmitter pass band edge of the transmitter filter based upon a combination of the channel pair selection and the second temperature indication.

23. The method of claim 11 further comprising:
identifying a channel pair selection provided for communication between the communication device and a base station; and
wherein adjusting the programmable pass band edge of at least one of the receiver filter and the transmitter filter based upon the first temperature indication further comprises:
adjusting the programmable pass band edge of the at least one of the receiver filter and the transmitter filter based upon a combination of the channel pair selection and the first temperature indication associated with the programmable duplexer.

24. The method of claim 11 wherein adjusting the programmable transmitter pass band edge of the transmitter filter of the programmable duplexer based upon the first temperature indication further comprises:
identifying a channel pair selection provided for communication between the communication device and a base station;
adjusting the programmable transmitter pass band edge of the transmitter filter of the programmable duplexer based upon a combination of the channel pair selection and the first temperature indication.

25. The method of claim 24 further comprising:
generating a second temperature indication associated with the programmable duplexer; and
wherein adjusting the programmable transmitter pass band edge of the transmitter filter based upon the combination of the channel pair selection and the first temperature indication further comprises:
adjusting the programmable transmitter pass band edge of the transmitter filter is based upon the first temperature indication and the second temperature indication.

26. The method of claim 11 wherein the receiver filter includes a plurality of one-port resonators arranged in series and in shunt to form a ladder filter, and a switchable reactive circuit, wherein the switchable reactive circuit is coupled in series with at least one of the plurality of shunt one-port resonators; and
wherein adjusting the programmable receiver pass band edge of the receiver filter of the programmable duplexer based upon the first temperature indication further comprises:
controlling the switchable reactive circuit of the receiver filter to adjust the programmable receiver pass band edge of the receiver filter based upon the first temperature indication;
generating a second temperature indication associated with the programmable duplexer;
controlling the switchable reactive circuit of the receiver filter to adjust the programmable receiver pass band edge of the receiver filter based upon a combination of the first temperature indication and the second temperature indication.

27. The programmable duplexer of claim 1 wherein the transmitter filter includes a switchable reactance circuit coupled to the temperature sensor circuitry, and wherein the switchable reactance circuit is configured to be enabled in response to a temperature indication of the one or more temperature indications generated by the temperature sensor circuitry.

28. The programmable duplexer of claim 1 wherein:
the transmitter filter includes a ladder filter including a first series one-port resonator, a second series one-port resonator, a third series one-port resonator, a first shunt one-port resonator, and a second shunt one-port resonator; and wherein a switchable reactance circuit is coupled in series with one or more of the first series one-port resonator, the second series one-port resonator, and the third series one-port resonator; and
the temperature sensor circuitry includes a control output in communication with the switchable reactance circuit, and wherein the temperature sensor circuitry is configured to control the switchable reactance circuit based upon a threshold temperature.

29. The programmable duplexer of claim 28 wherein:
the switchable reactance circuit includes a switch coupled in parallel with a capacitor; and
wherein the temperature sensor circuitry is configured to selectively control the switch based upon the threshold temperature.

30. The programmable duplexer of claim 1 wherein:
the receiver filter of the programmable duplexer includes a one-port resonator arranged in shunt with a coupled resonator filter, and a switchable reactance circuit, wherein the switchable reactance circuit is coupled in parallel with the one-port resonator; and
the temperature sensor circuitry includes a control output in communication with the switchable reactance circuit, and wherein the temperature sensor circuitry is configured to control the switchable reactance circuit based upon a threshold temperature.

31. The programmable duplexer of claim 30 wherein the switchable reactance circuit includes a switch coupled in series with a capacitor; and
the temperature sensor circuitry is configured to selectively close the switch based upon the threshold temperature.

32. A method of controlling a programmable duplexer of a communication device comprising:
generating a first temperature indication associated with the programmable duplexer;
providing the first temperature indication to a controller; and
adjusting a programmable pass band edge of at least one of a receiver filter and a transmitter filter via the controller and based upon the first temperature indication.

33. The method of claim 32 wherein:
the receiver filter of the programmable duplexer includes a one-port resonator arranged in shunt with a coupled resonator filter, and at least one switchable reactive element, wherein the at least one switchable reactive element is coupled in series with the one-port resonator; and
adjusting the programmable receiver pass band edge of the receiver filter of the programmable duplexer based upon the first temperature indication further comprises:

controlling the at least one switchable reactive element based upon the first temperature indication to adjust the programmable receiver pass band edge of the receiver filter.

34. The method of claim 33 wherein the at least one switchable reactive element is a capacitor array.

* * * * *